(12) United States Patent
Lin et al.

(10) Patent No.: US 9,450,667 B2
(45) Date of Patent: Sep. 20, 2016

(54) METHOD FOR DEVICE TO DEVICE COMMUNICATION AND BASE STATION AND USER EQUIPMENT USING THE SAME

(71) Applicant: Industrial Technology Research Institute, Hsinchu (TW)

(72) Inventors: Ting-Yu Lin, New Taipei (TW); Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 27 days.

(21) Appl. No.: 13/831,984

(22) Filed: Mar. 15, 2013

(65) Prior Publication Data

US 2013/0242866 A1    Sep. 19, 2013

Related U.S. Application Data

(60) Provisional application No. 61/612,406, filed on Mar. 19, 2012.

(51) Int. Cl.
| | |
|---|---|
| H04B 7/26 | (2006.01) |
| H04W 76/02 | (2009.01) |
| H04W 76/04 | (2009.01) |

(52) U.S. Cl.
CPC .............. *H04B 7/26* (2013.01); *H04W 76/023* (2013.01); *H04W 76/02* (2013.01); *H04W 76/043* (2013.01)

(58) Field of Classification Search
CPC ............ H04W 76/046; H04W 76/02; H04W 76/023; H04B 7/26
USPC ........ 370/328, 338, 389, 310, 329; 709/228, 709/227
See application file for complete search history.

(56) References Cited

U.S. PATENT DOCUMENTS

| | | |
|---|---|---|
| 6,904,055 B2 | 6/2005 | Pichna et al. |
| 7,877,106 B2 | 1/2011 | Periyalwar et al. |
| (Continued) | | |

FOREIGN PATENT DOCUMENTS

| | | |
|---|---|---|
| CN | 101772199 | 7/2010 |
| EP | 1229442 | 3/2007 |
| (Continued) | | |

OTHER PUBLICATIONS

Yu et al, "Resource Sharing Optimization for Device-to-Device Communication Underlaying Cellular Networks", IEEE Transactions on Wireless Communications, Aug. 2011, vol. 10, p. 2752-p. 2763.

(Continued)

*Primary Examiner* — Habte Mered
*Assistant Examiner* — Rownak Islam
(74) *Attorney, Agent, or Firm* — Jianq Chyun IP Office

(57) ABSTRACT

A method for device to device communication, a control node using the same, and a user equipment using the same has been proposed. For the proposed method, a control node first establishes with a caller device a connection during which an ID of the callee and an establishment cause indicating caller is transmitted to the control node. A control node then informs the call to a callee device by establishing with the callee device a connection during which a D2D ID of the callee and an establishment cause indicating callee is transmitted to the control node. When the control node finds a caller device linked with a caller establishment cause and a D2D ID of the callee, the control node automatically trigger D2D communication between the caller device and the callee device.

44 Claims, 56 Drawing Sheets

(56) References Cited

U.S. PATENT DOCUMENTS

| | | | |
|---|---|---|---|
| 8,577,363 | B2 | 11/2013 | Wijting et al. |
| 8,730,917 | B2 | 5/2014 | Xie |
| 2003/0054863 | A1* | 3/2003 | Lee et al. .................. 455/566 |
| 2006/0160544 | A1* | 7/2006 | Sun .................. H04W 8/18 455/456.1 |
| 2006/0168343 | A1 | 7/2006 | Ma et al. |
| 2009/0016232 | A1* | 1/2009 | Kwon .................. H04W 76/023 370/252 |
| 2009/0017807 | A1* | 1/2009 | Kwon et al. .................. 455/416 |
| 2010/0009675 | A1* | 1/2010 | Wijting .................. H04W 72/02 455/426.1 |
| 2011/0098043 | A1* | 4/2011 | Yu .................. H04W 60/00 455/435.1 |
| 2011/0106837 | A1 | 5/2011 | Walton et al. |
| 2011/0258313 | A1* | 10/2011 | Mallik .................. H04W 8/005 709/224 |
| 2011/0258327 | A1* | 10/2011 | Phan .................. H04W 16/10 709/227 |
| 2011/0317569 | A1 | 12/2011 | Kneckt et al. |
| 2012/0002592 | A1* | 1/2012 | Yang .................. H04B 7/155 370/315 |
| 2012/0011247 | A1 | 1/2012 | Mallik et al. |
| 2013/0005377 | A1* | 1/2013 | Wang .................. H04W 72/0406 455/509 |
| 2013/0195026 | A1 | 8/2013 | Johnsson et al. |
| 2014/0235234 | A1 | 8/2014 | Jang et al. |

FOREIGN PATENT DOCUMENTS

| | | |
|---|---|---|
| TW | I351196 | 10/2011 |
| WO | 2010145144 | 12/2010 |
| WO | 2011109941 | 9/2011 |

OTHER PUBLICATIONS

Vigato et al., "Joint Discovery in Synchronous Wireless Networks", IEEE Transactions on Communications, Aug. 2011, vol. 59, p. 2296-p. 2305.

Corson et al., "Toward Proximity-Aware Internetworking", IEEE Wireless Communications, Dec. 2010, vol. 17, p. 26-p. 33.

Wu et al., "FlashLinQ: A Synchronous Distributed Scheduler for Peer-to-Peer Ad Hoc Networks", Forty-Eighth Annual Allerton Conference, Oct. 2010, p. 514-p. 521.

Fodor et al., "Design Aspects of Network Assisted Device-to-Device Communications", IEEE Communications Magazine, Mar. 2012, vol. 50, p. 577-p. 583.

3GPP Service and System Aspects Working Group1., "Study on Proximity-based Services", Rel-12 Working Item, SP-110638, Mar. 2013, p. 1-p. 13.

"Office Action of Taiwan Counterpart Application", issued on Jan. 22, 2015, p. 1-p. 23, in which the listed reference was cited.

"Office Action of US Counterpart Application", issued on Oct. 23, 2014, p. 1-p. 24, in which the listed references were cited.

"Office Action of U.S. Counterpart Application", issued on Mar. 4, 2015, p. 1-p. 29, in which the listed references were cited.

"Office Action of China Counterpart Application," issued on Sep. 14, 2015, p. 1-p. 11, in which the listed references were cited.

"Office Action of related U.S. Appl. No. 13/832,090," issued on Nov. 27, 2015, p. 1-p. 20, in which the listed reference was cited.

* cited by examiner

METHOD FOR DEVICE TO DEVICE COMMUNICATION AND BASE STATION AND USER EQUIPMENT USING THE SAME

CROSS REFERENCE TO RELATED APPLICATION

This application claims the priority benefits of U.S. provisional application Ser. No. 61/612,406, filed on Mar. 19, 2012. The entirety of the above-mentioned patent application is hereby incorporated by reference herein and made a part of this specification.

TECHNICAL FIELD

The present disclosure generally relates to a method for device to device communication, a control node using the same, and a user equipment using the same.

BACKGROUND

Wireless technologies have brought about conveniences and benefits to many people's daily lives as devices such as cell phones, notebooks, and tablet PCs, have enabled users to communicate with each other from just about any location and to make resources on the internet more easily accessible. Among various wireless technologies, Device-to-Device (D2D) communication has drawn more and more attention since D2D communication, unlike the traditional cellular communication system, does not require information exchanges to always pass through a base station and a core network upon transmission as users communicating in a D2D mode could make direct link establishment and transmission between devices. In this way, D2D communication could enhance wireless communication in several ways.

One such way could be related to network resource utilization for which D2D communication would fare better than a conventional cellular communication system in general. While a conventional cellular communication requires resources allocated for both uplink (UL) and downlink (DL), D2D communication could only require resources allocated for a direct link. Also for a convention cellular system, resources are dedicated to a device within the coverage of a cell for a particular point in time; whereas for D2D communication, resources could be allocated to different pairs of devices at a particular point in time as long as each pair of devices would cause no interferences between other pairs of devices engaging in D2D communication.

Since a conventional cellular communication system requires a base station to deliver UL and DL data from one device to another while D2D communication has one direct link, D2D communication would result in less data transmission overall. In a conventional cellular communication system, there would be uplink and downlink radio links transmission delay as well as the transmission delay in the core network and even other networks. However, in D2D communication, only one radio link transmission delay would exist normally.

Because of the improved resource utilization and the reduced transmission delay in D2D communication as previous mentioned, both network providers and consumers would benefit from D2D communication. Efficient resource utilization in D2D communication could translate to more users served by the network providers, and the benefit of having less round trip delay could include uninterrupted conversations and more pleasant feelings during a conversation.

Methods of D2D connection establishment could be roughly divided into two categories. One category would be to establish D2D connections by devices themselves, and the other category is to establish D2D connections with the assistance of a network. For the former category, one device may send a signal to detect neighboring devices, and then a nearby device may receive the detection signal. After device synchronizations and coordination are finished, devices may communicate with each other directly, and thus D2D communication is established by devices themselves. As for the latter category, devices would synchronize with each other with the help of the network, or otherwise the devices could also synchronize with each other by using default parameters or by negotiating parameters agreeable to both devices through the network. Once the network assisted synchronization and coordination is finished, a direct communication between devices could be performed under the guidance of the network.

Unlike a conventional cellular communication system in which devices could communicate regardless of the distances between them, D2D communication would less likely allow communications over long distances. For this reason, the aforementioned D2D connection establishment method may require a device to possess a foreknowledge of the presence of other devices nearby as well as explicit indications as to whether these devices have activated their D2D communication capabilities. Otherwise, a blind initiation to attempt D2D communications would not only consume the battery power of the device itself but also waste radio resources of the network. Therefore, when one wants to communicate with another user without knowing the proximity of such user, the person usually would make a normal call through the conventional cellular communication means. However, in many situations, people could practically be right by each other but at the same time not being aware of such fact and thus may dial another user in proximity through the conventional cellular communication means without using the D2D communication.

In order to solve the problem, a method has to be proposed for a device to automatically perform D2D communication if such capability exists and is activated in the device without making mandatory the foreknowledge of the proximities of other devices or the explicit indications for whether other devices and would be capable and willing to participate in D2D communications.

SUMMARY OF THE DISCLOSURE

Accordingly, the present disclosure is directed to a method for device to device (D2D) communication a base station using the same and a user equipment (UE) using the same.

The present disclosure directs to a control node which includes elements of a transmitter and a receiver for respectively transmitting and receiving wireless data, a storage medium for storing information of at least a first device and a second device, and a processing circuit coupled to the transmitter, the receiver, and the storage medium and the processing circuit is configured for executing the functions including receiving from a first device a caller indicator and an identification (ID) of a second device, receiving from the second a callee indicator and an ID of the second device, searching for the first device with the caller indicator and the ID of the second device, and arranging a device to device (D2D) communication between the first device and the second device based on the caller indicator, the callee indicator, and the ID of the second device when a first condition has been satisfied.

The present disclosure directs to a method for device to device (D2D) communication, adapted for a control node in a network to arrange for D2D communication between a first device and a second device, and the method includes the steps of receiving from the second device a callee indicator and an identification (ID) of the second device, finding a first device associated with a caller indicator and the ID of the second device, and if the first device is found, arranging the D2D communication between the first device and the second device.

The present disclosure directs to a method of device to device (D2D) communication in a wireless network between a first device initiating a communication session with a second device, and the method includes the steps of the first device establishing with the network a first connection during which a caller indicator and an identification (ID) of the second device are transmitted to the network, the second device establishing with the network a second connection during which a callee indicator and an ID of the second device are transmitted to the network after the network authorizes the communication session, at least one of the first device and the second device receiving from the network a first information to perform D2D communication, and the first device and the second device performing D2D communication with each other based on the first information.

In order to make the aforementioned disclosure comprehensible, preferred embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the disclosure, and are incorporated in and constitute a part of this specification. The drawings illustrate embodiments of the invention and, together with the description, serve to explain the principles of the disclosure.

DETAILED DESCRIPTION OF DISCLOSED EMBODIMENTS

Figure 1A:
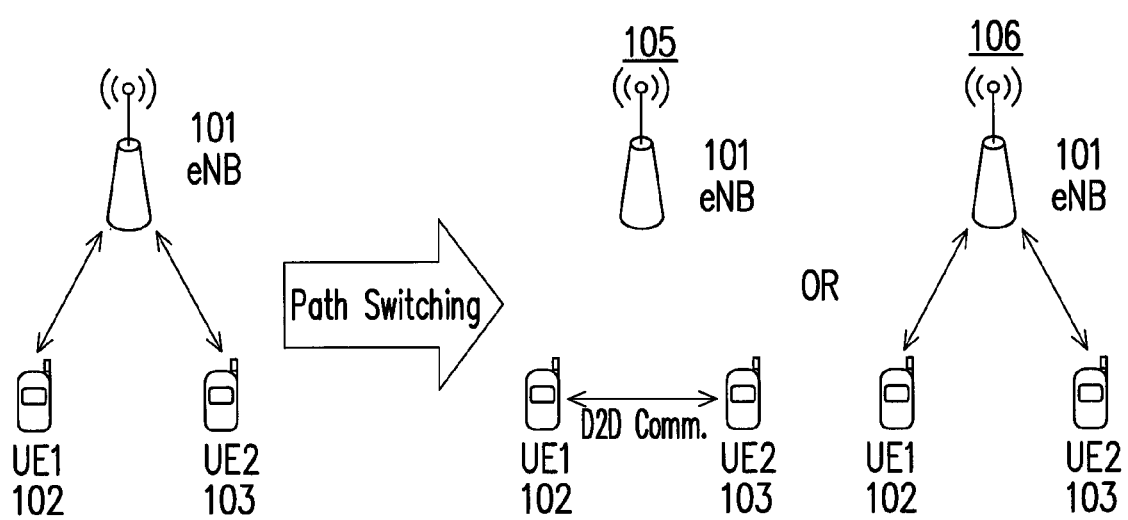
FIG. 1A illustrates a concept of path switching in a non mobile scenario in accordance with one of the exemplary embodiments of the present disclosure.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A control node in this disclosure would be referred to as a base station (BS) or an eNB. It should be noted that the references of such are merely exemplary and therefore do not serve as limitations to the type of control nodes as it would be apparent to those skilled in the art that other types of control node could be selected to achieve network control purposes such as an advanced base station (ABS), a base transceiver system (BTS), an access point, a home base station, a relay station, a repeater, an intermediate node, an intermediary, and/or satellite-based communication base stations.

The control node may also be referred to entities such as a Mobility Management Entity (MME), a Serving Gateway (S-GW), a Packet Data Network Gateway (PDN-GW), a Serving GPRS Support Node (SGSN), a Gateway GPRS Support Node (GGSN), a Mobile Switching Center (MSC), and a Home Subscriber Server (HSS) or a node maintaining a database related to subscriber information.

From the hardware perspective, a control node may also be referred to as an apparatus including at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform procedures related to the proposed method in accordance with exemplary embodiments of the present disclosure. Also, the processing circuit may optionally be coupled to a memory circuit to store programming codes, device configurations, a codebook, buffered or permanent data, and etc. . . . . . The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may also be referred to as an apparatus which includes at least but not limited to a transmitter circuit, a receiver circuit, an analog-to-digital (A/D) converter, a digital-to-analog (D/A) converter, a processing circuit, one ore more antenna units, and optionally a memory circuit. The memory circuit may store programming codes, device configurations, buffered or permanent data, codebooks, and etc. . . . . The processing circuit may also be implemented with either hardware or software. The function of each element of a UE is similar to a control node and therefore detailed descriptions for each element will not be repeated.

FIG. 1A illustrates a concept of path switching in a non mobile scenario in accordance with one of the exemplary embodiments of the present disclosure. After UE1 102 and UE2 103 establish network authorizations from a communication system through the eNB 101, the communication. The communication system would be capable of selecting the data traffic session of the UE1 102 and UE2 103 between a conventional infrastructure path 106 and a D2D Communication path 105. In the conventional infrastructure path 106, UE1 102 and UE 103 exchange data through a network as and the eNB 101 delivers the data exchanges in between. In the D2D communication path 105, UE1 102 and UE2 103 exchange data directly with minimal interaction with the eNB 101.

One of the purposes of the present disclosure is for the users (e.g. UE1 102 UE2 103) to not perceive the switching of data traffic sessions between the D2D communication path and infrastructure path as the establishment of the data traffic sessions as well as the transition between the paths are performed automatically and under the control of the network. However, it also should be noted that users in general may have options of activating and deactivating D2D communication at will. In the case that should a user chooses to deactivate D2D communication, the data traffic session would be conducted through the conventional infrastructure path 106.

Figure 1B:
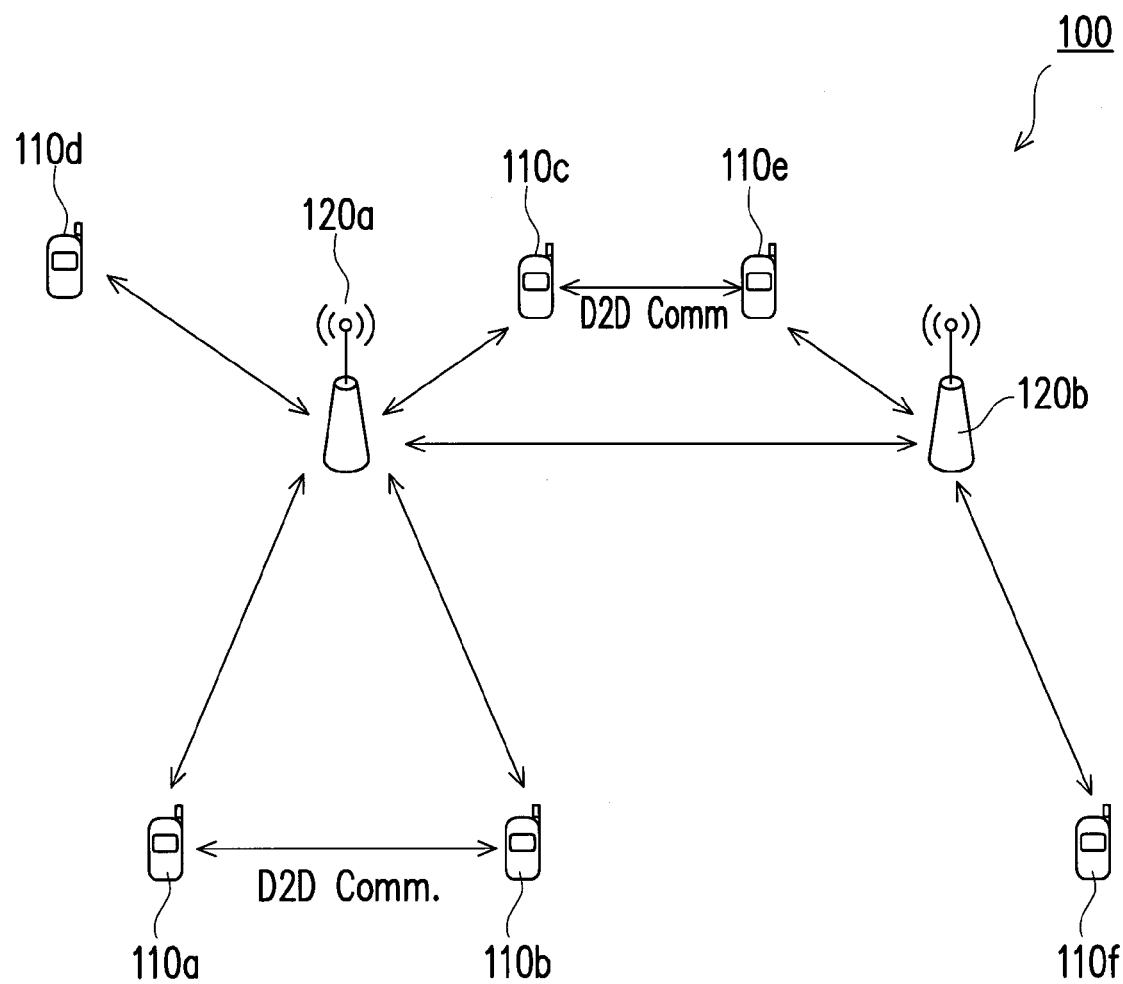
FIG. 1B illustrates an exemplary communication system in a scenario without device mobility in accordance with the present disclosure.

FIG. 1B illustrates in accordance with the present disclosure an exemplary communication network 100 in which the network provides wireless services to a plurality of UEs 110a~110f through control nodes 120a 120b in a scenario without device mobility. It should be noted that the numbers of devices and their exact arrangements for FIG. 1B and for the remaining figures, if applicable, are merely exemplary and are not construed as limitations as a person skilled in the art could alter the quantities and the exactly arrangement in accordance with the spirit of the present disclosure. Control nodes 120a and 120b in the wireless network 100 may each serve a number of devices (i.e. control node 120a serves UE 110a~110d, and control node 120b serves UE 110e~f). UE 110a and UE 110b could establish an intra-eNB D2D communication under the eNB 120a, and UE 110c and 110e could communicate across two eNBs 120a 102b. In both cases, the UEs 110a-110b and 110c-110f which engage in D2D communication would not actually perceive that the communication is actually D2D as the switching of data traffic sessions is controlled automatically by the network 100. One of the proposes of the present disclosure is to propose a method to automatically perform D2D communication when users make calls or other service requests in close proximity or in radio range with other users.

Figure 2A:
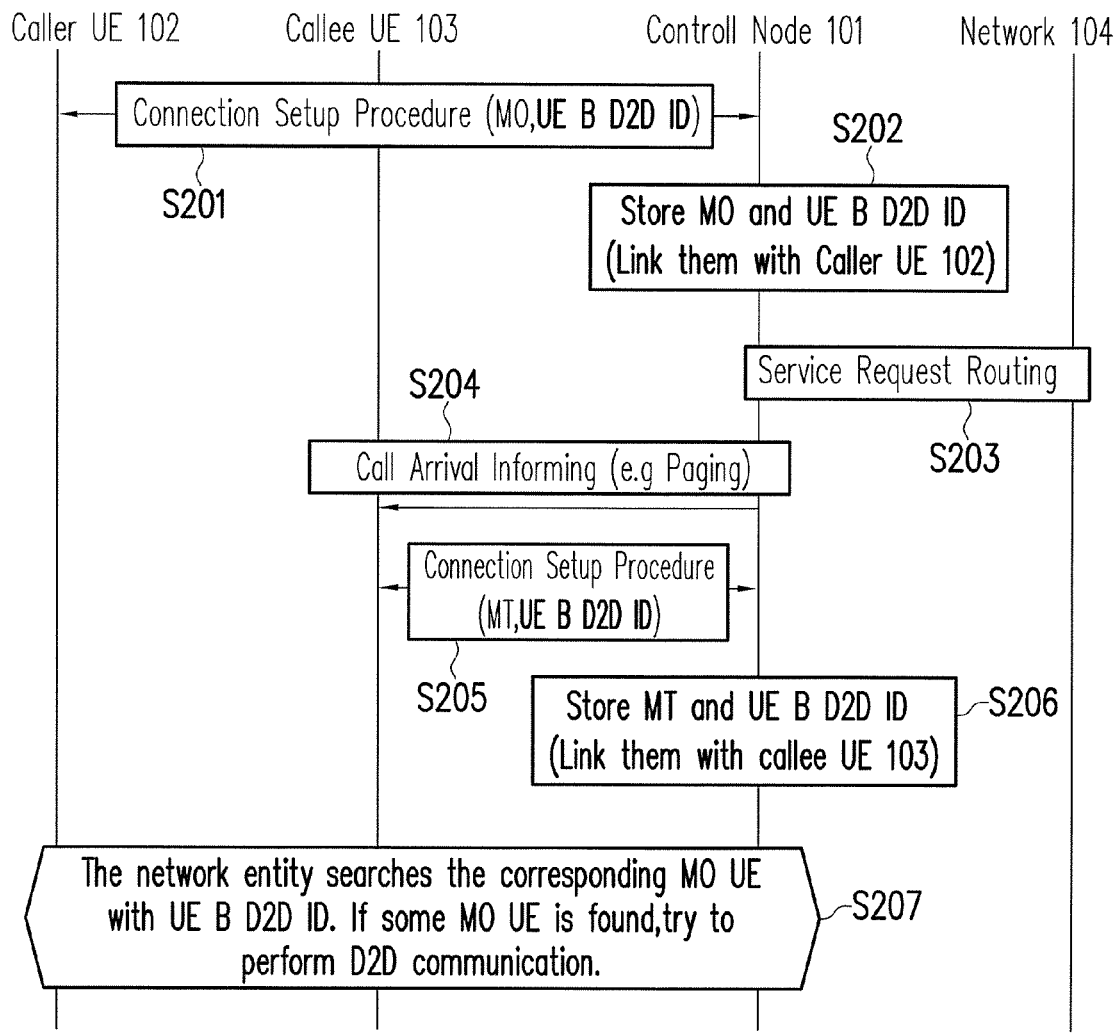
FIG. 2A illustrates a process for automatic D2D communication trigger in accordance with one of the exemplary embodiments of the present disclosure.

FIG. 2A is a flow chart illustrating the process for automatic D2D communication trigger in accordance with one of the exemplary embodiments of the present disclosure. For an exemplary purpose, FIG. 2A shows an interaction among a caller UE 102, a callee UE 103, a control node 101, and a network 104. It is assumed in FIG. 2A that the UE 102 and the UE 103 are served by the same control node 101. In general, when a UE wants to communicate with at least one other UE, these UEs would be attached to a network through a base station. The network could then decide whether to arrange the subsequent communication according to a conventional cellular communication procedure or to implement the proposed D2D method including variants of the proposed D2D method. Assuming that the caller UE 102 calls the callee UE 103, the D2D communication could be implemented according to an exemplary embodiment as follows.

In step S201, the caller UE 102 performs a connection setup procedure by transmitting data which may include a connection establishment cause (i.e. mobile originating call (MO)) and a D2D identification (ID) of the callee UE 103. The data with the establishment cause and the D2D ID could be an independent message or could be embedded in a message intended for other purposes. In step S202, in response to the connection setup procedure of S201 being performed, the control node 101 would then store the connection establishment causes indicating MO and the D2D ID of the callee UE 103 and link these information with the caller UE 102. After the connection between the caller UE 102 and the control node 101 have been established, the caller UE 102 would use the connection to send a service request of the UE 102 to the network 104. The service request could be routed through other network nodes before arriving at the control node 101. In step S203, the service request routing is made as the authorization for network and spectrum usage is performed, and upon granting of the service request, the network 104 would transmit to the control node 101 data including information related to authorization and resource allocation. In response to step S203, assuming that the service request routing has been successful, in step S204 the control node 101 would inform (e.g. paging) the callee UE 103 that the call UE 103 has a call coming.

The callee UE 103 would connect to the network 104 through the control node 101 in order to respond, and hence in step S205, the callee UE 103 establishes a connection with the control node 101 in order to respond to the request. During the connection establishment of the callee UE 103 in step S205, the callee UE 103 would send the D2D ID of the callee UE 103 and an establishment cause (e.g. mobile terminating access (MT)) to the control node 101 either through an independent message or by embedding the D2D ID of the callee UE 103 and the establishment cause in a message intended for another purpose. In step S206, in response to connection setup procedure with the UE 103 being performed, the control node 101 stores the information include the establishment cause (e.g. MT) and the D2D ID of the callee UE 103 and links the information with the callee UE 103. In step S207, the control node 101 searches among stored information of the control node 101 to locate a device with an establishment cause indicating a caller (e.g. mobile originating) and a corresponding D2D ID which is the ID of the callee 103. After the caller UE 102 is found by the control node 101, the control node 101 would then automatically arrange for a D2D communication between the caller UE 102 and the callee UE 103.

Figure 2B:
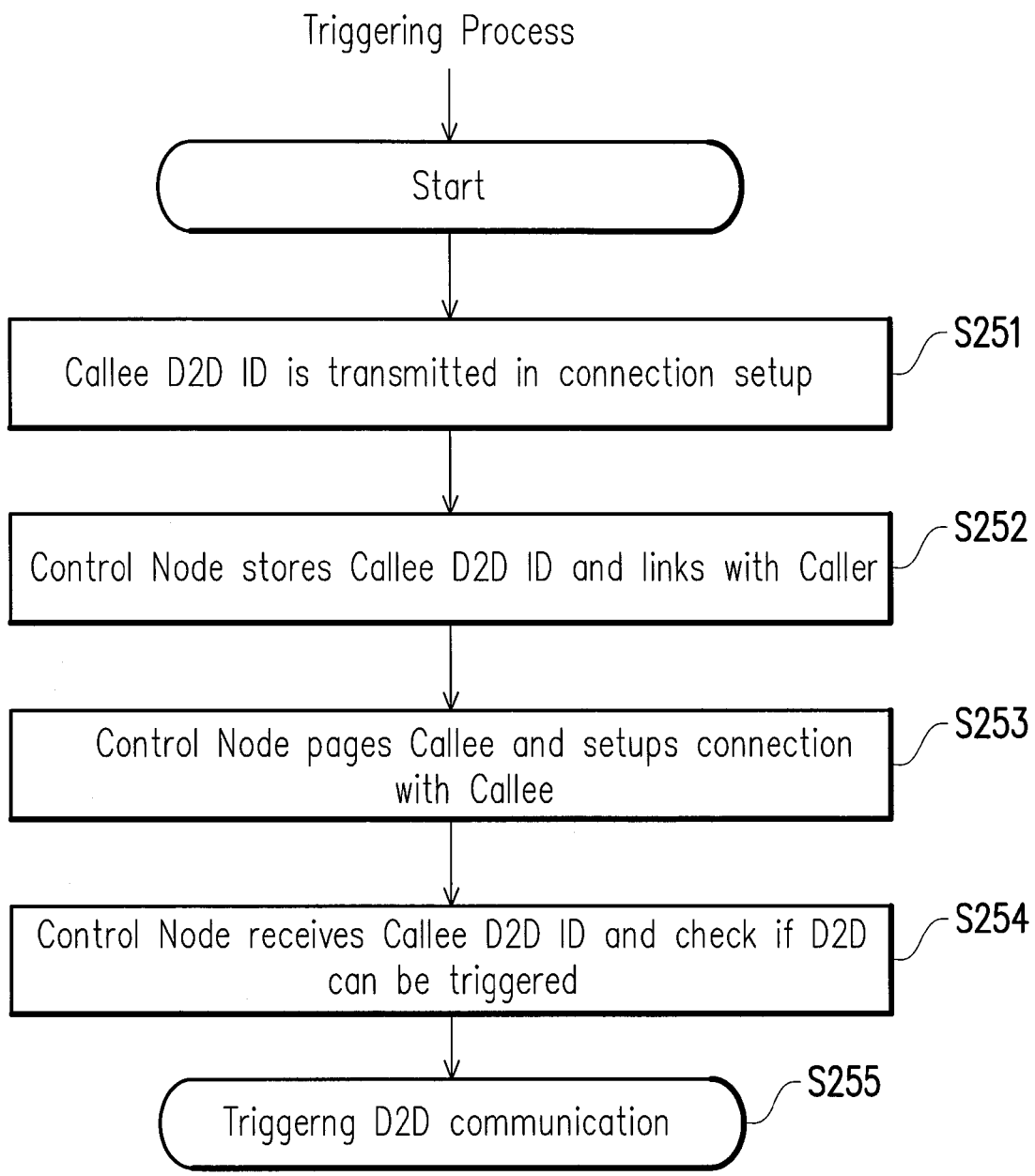
FIG. 2B illustrates a D2D triggering process in accordance with one of the exemplary embodiments of the present disclosure.

FIG. 2B illustrates the automatic D2D triggering procedure from the view point of the control node 101. In step S251, the control node 101 receives a callee D2D ID during a connection establishment setup. In step S252, the control node 101 stores the callee D2D ID and links the stored callee D2D ID with the caller UE 102. In step S253, in response to a service request routing to the network 104 being complete, the control node 101 pages the callee UE 103 which establishes a connection setup with the control node 101. In step S254, the control node 101 receives the callee D2D ID from the callee 103, finds the caller with the callee D2D ID from the stored information of the control node 101, and then determine whether D2D could be triggered between the caller 102 and the callee 103 and triggers the D2D communication in step S255 if the control node 101 could do so.

In general, a control node could search its database to trigger D2D communications in different ways. The control node may search its database when it receives a callee ID from a device and the device is a callee. Also, a control node may search its database every time it receives a callee ID from a device.

It should be noted that in general the establishment cause sent from a device to a control node would inform the control node that whether the device is a caller or callee in order for the control node to have the necessary information to couple between a caller and a callee. Therefore, a person of ordinary skills in the art may apply any format or value for the establishment cause as long as the establishment indicates whether a device is a caller or a callee.

Also the caller/callee mentioned herein may be a phone call requester/responder or a Packet-Switch (PS) service requester/responder or a Circuit-Switch (CS) service requester/responder or other service requester/responder.

Figure 2C:
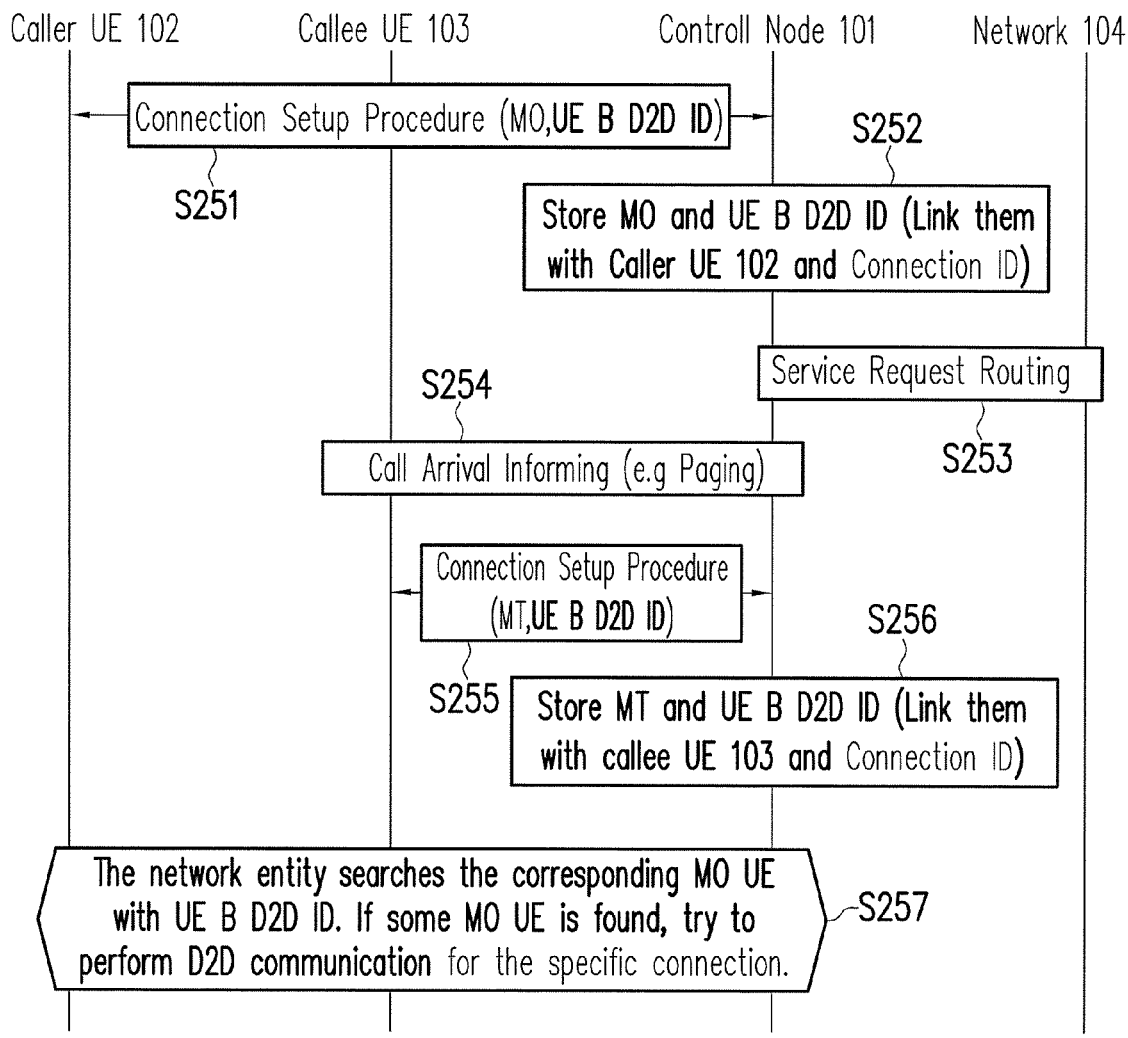
FIG. 2C illustrates automatic D2D communication trigger for specific connections in accordance with one of the exemplary embodiments of the present disclosure.

FIG. 2C illustrates automatic D2D communication trigger for specific connections in accordance with one of the exemplary embodiments of the present disclosure. The procedure of FIG. 2C is similar to the procedure of FIG. 2A except for the connection ID which is not present in FIG. 2A.

In step S251, the caller UE 102 performs a connection setup procedure by transmitting data which may include a MO and a D2D ID of the callee UE 103. The data with the establishment cause and the D2D ID could be an independent message or could be embedded in a message intended for other purposes. In step S252, in response to the connection setup procedure of S251 being performed, the control node 101 stores the MO connection establishment cause and the D2D ID of the callee UE 103, and the control node 101 links these information with a connection ID of caller UE 102. After the connection between the caller UE 102 and the control node 101 have been established, the caller UE 102 in step S253 uses the connection to send the service request of the UE 102 to the network 104. In response to step S253, assuming that the service request routing has been successful, in step S254 the control node 101 would page the callee UE 103 for an incoming call. The callee UE 103 would connect to the network 104 through the control node 101 in order to respond, and hence in step S255, the callee UE 103 establishes a connection with the control node 101 in order to respond to the request. During the connection establishment of the callee UE 103 in step S256, the callee UE 103 would send the D2D ID of the callee UE 103 and an establishment cause (e.g. mobile terminating access (MT)) to the control node 101 either through an independent message or through embedded a message intended for another purpose. In step S256, in response to a connection setup procedure between the eNB 101 and the UE 103 being performed, the control node 101 stores the information including the MT and the D2D ID of the callee UE 103 and links these information with the connection ID of the callee UE 103.

Next, in step S257, the control node 101 searches among stored information of the control node 101 to locate a device with an establishment cause indicating a caller (e.g. mobile originating) and a corresponding D2D ID which is the ID of the callee 103. As the caller UE 102 being found by the control node 101, the control node 101 would then automatically arrange for a D2D communication between the caller UE 102 and the callee UE 103 as the arrangement is only for a specific connection. In this way, it is not necessary for UE 102 and UE 103 to communicate in D2D mode for all of their connections. While the eNB 101 may arrange D2D communication for some connection establishment types, other connection establishment types may be arranged through non D2D related means such as the cellular system.

The connection establishment herein may be a control signaling connection establishment or a data connection establishment or a logical connection establishment or an other network layer connection establishment. Moreover, the control signaling connection establishment may be LTE signaling radio bearer (SRB) setup. The data connection setup may be LTE dedicated radio bearer (DRB) setup or LTE EPS bearer setup. The connection establishment may also be application connection setup, such as Session Initiation Protocol (SIP) connection setup.

In one exemplary embodiment, a caller device would send a callee ID only when caller device supports D2D communication, and therefore the sending of the callee ID may implicitly indicates that whether a caller device at that point in time supports D2D communication or not.

Although in FIG. 2A, the caller UE 102 and the callee UE 103 are served by the same control node 101, it may also be served by different control nodes. In general when a caller UE and a callee UE are served by different control nodes, the control nodes may share stored information with each other through direct or indirect communications and thus could search not only the stored information but also the shared information among each other to find the caller and the callee devices. Thus, automatic D2D communication could still be performed even if two devices are served by different control nodes.

Figure 3A:
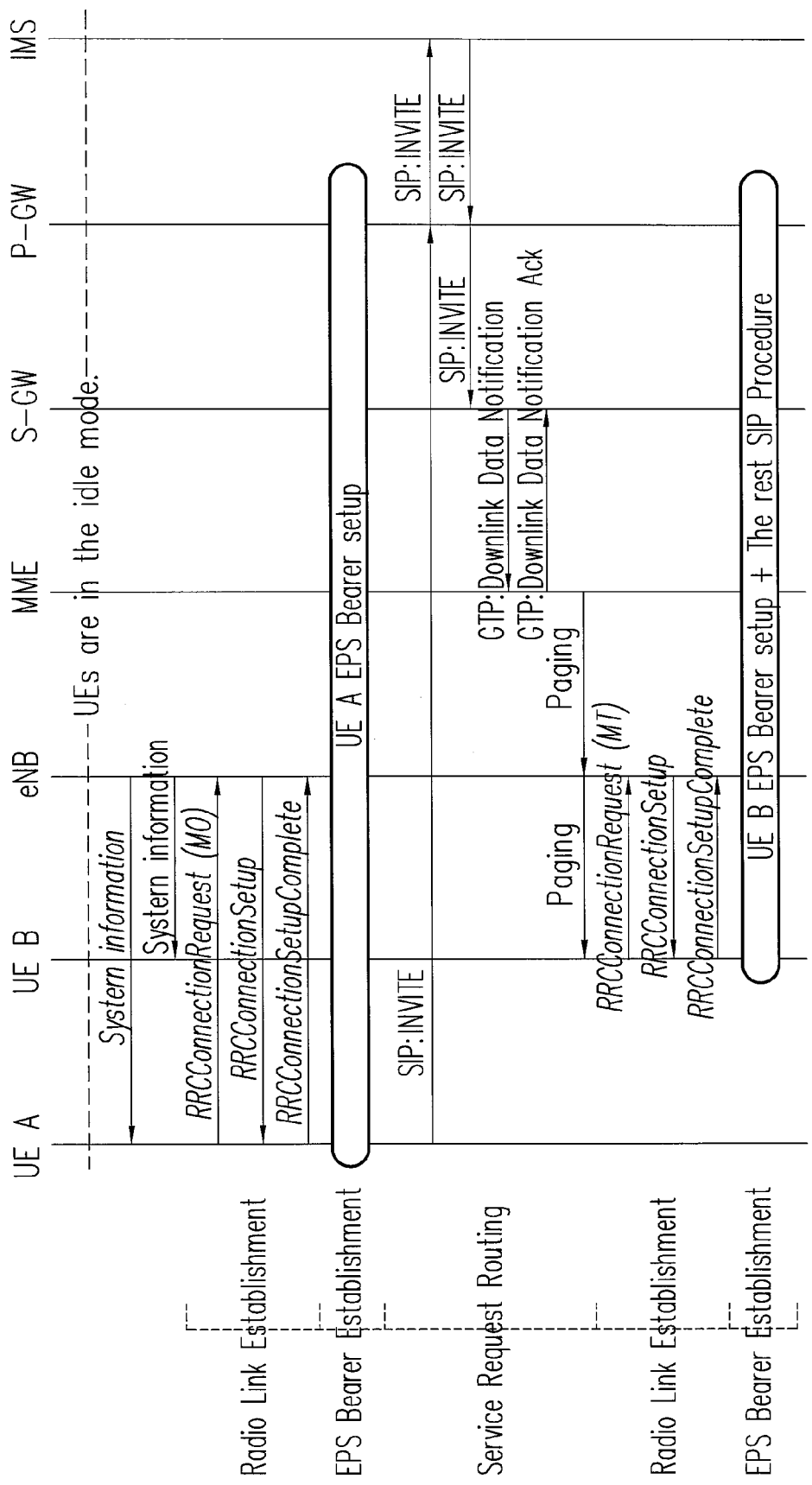
FIG. 3A illustrates a conventional communication procedure from a connection idle scenario.
Figure 3B:
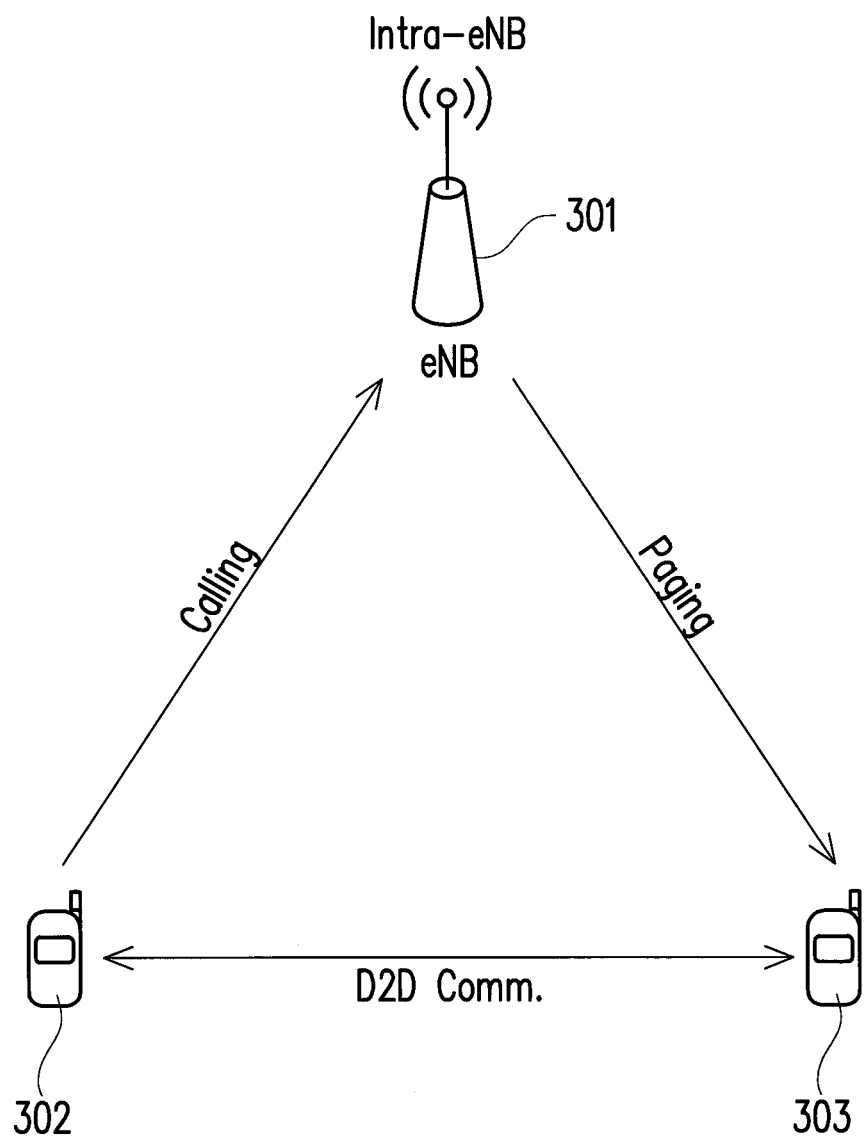
FIG. 3B illustrates Intra-eNB D2D communication in accordance with one of the exemplary embodiments of the present disclosure.
Figure 3C:
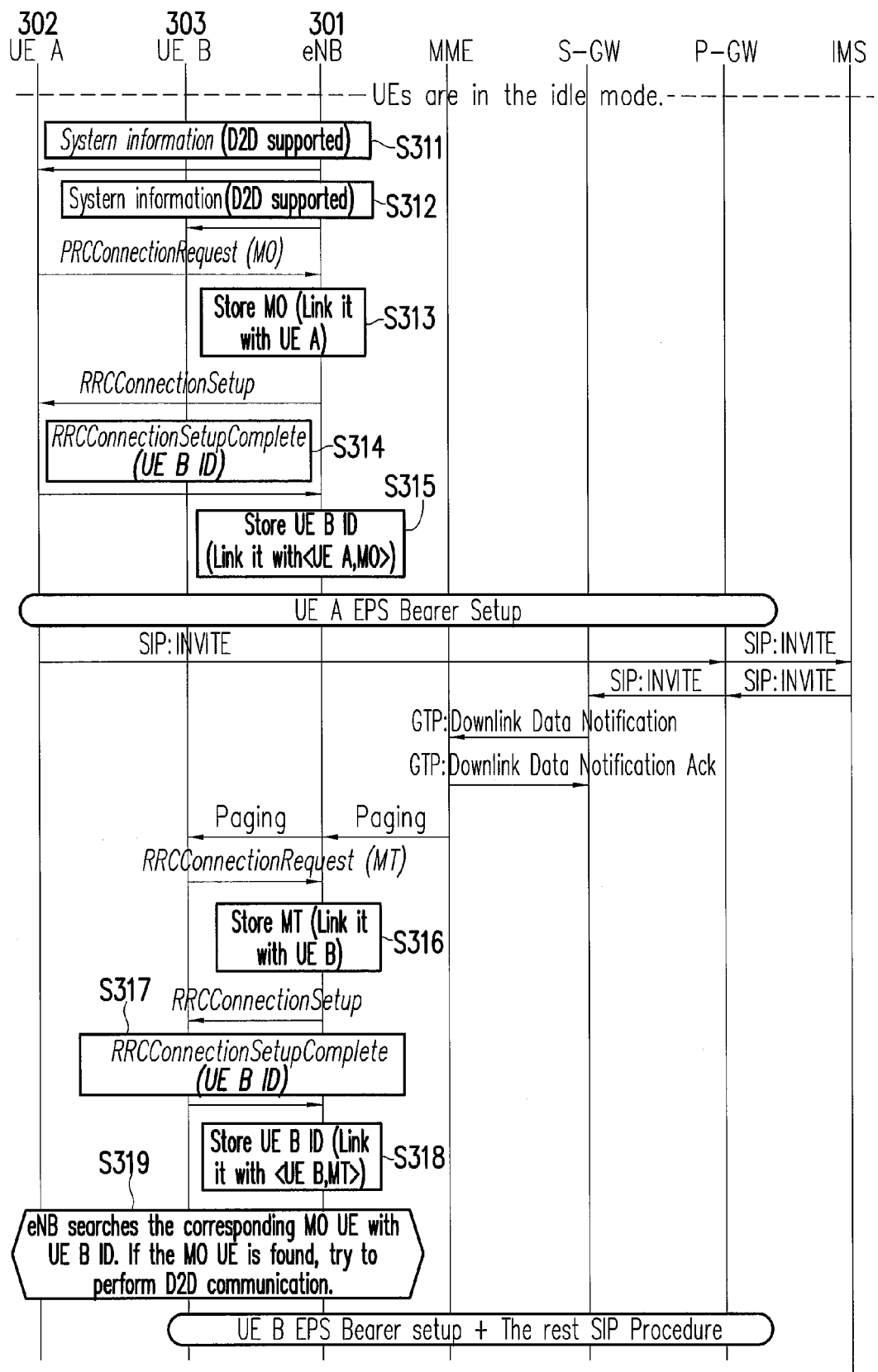
FIG. 3C illustrates D2D connection trigger from a connection idle scenario in accordance with one of the exemplary embodiments of the present disclosure.

One application of FIG. 2C may be applied to the current LTE or the current LTE-A system as illustrated by FIG. 3A-FIG. 3C. FIG. 3A is a communication establishment procedure of a conventional LTE/LTEA system. Assuming that UE A calls UE B in a LTE/LTE-A network, a conventional communication procedure typically includes a radio link establishment procedure and a EPS bearer establishment procedure to establish UE A as an EPS bearer, and a service request routing procedure associated with UE A. A conventional communication procedure also typically include and a radio link establishment procedure and an EPS bearer establishment procedure to establish UE B as an EPS bearer, and a service request routing procedure associated with UE B.

FIG. 3B illustrates an intra-eNB D2D communication setup between a caller UE 302, a callee UE 303, and a control node 301 in accordance with one of the exemplary also be an ID assigned by an application server external to the network. The D2D ID may also be the mobile station integrated services digital network number (MSISDN), IP address, international mobile subscriber identity (IMSI), or the composition SAE-temporary mobile subscriber identity (S-TMSI). A list of options are listed in Table 1 below:

TABLE 1

D2D ID Options

|  | App ID | MSISDN | IMSI | IP address | C-RNTI | S-TMSI |
|---|---|---|---|---|---|---|
| Layer Management Node | Application UE/IMS | L3 (CS) MSC/HSS/ MS-USIM | GTP MME/S-GW/ P-GW/HSS | Transport UE/P-GW | L1/L2 UE & eNB | L3 UE/MME (eNB) |
| Length | N/A | max: 15 digits | 6~21 digits | 4~16 bytes | 16 bits | 40 bits |
| Usage | Public ID | Public ID | Globally unique private ID | Dynamic globally unique ID. (Routing) | Unique ID within a cell. | Unique ID within a MME group | embodiments of the present disclosure. It is assumed that both the caller UE 302 and the callee UE 303 are serviced by the same network through the same eNB 301. Similar to embodiment of FIGS. 2A and 2B, the UE A initiates a communicate request by calling the eNB 301, and the eNB 301 would then page the callee UE 303 to inform the callee UE 303 that it has been called. The eNB 301 may then facilitate the D2D communication between the caller UE 302 and the callee UE 303.

FIG. 3C illustrates implementing D2D communication in an existing LTE/LTE A system in accordance with one of the exemplary embodiments of the present disclosure. The exemplary embodiment of FIG. 3C is built upon a typical existing communication procedure such as the one in FIG. 3A so that a complete overhaul of a communication system is not required to order to accommodate D2D communication in the existing LTE/LTE A system. The radio link establishment of UE A 302 could be implemented as followings. In step S311, the eNB 301 may broadcast or unicast system information to the caller UE A 302 which indicates that the communicate system supports D2D communication. In step S302, the eNB 301 transmits system information which indicates that the communication system supports D2D communication to the callee UE B 303. Assuming that both UE A 302 and UE B 303 are in the RRC_IDLE mode, UE A 302 would establish a RRC connection with the eNB 301 first by transmitting RRCConnectionRequest which includes a MO establishment cause. In step S313, the eNB 301 stores the MO and links the MO with the UE A 302. After eNB 301 transmits the RRCConnectionSetup to UE A 302, in step S314 the UE A 302 may in response transmit the RRCConnectionSetupComplete which includes the D2D ID of the UE B 303. After receiving the D2D ID of the UE B 303, in step S315 the eNB 301 stores the D2D ID of the UE B 303 and links the D2D ID of the UE B 303 with UE A 302 and the MO.

In another exemplary embodiment, the D2D ID of the UE B 303 does not necessarily need to be in RRCConnectionSetupComplete but could be embedded in another message. In another exemplary embodiment, the D2D ID of the UE A 302 could be sent along with the D2D ID of the UE B 303. Also, it should be noted that the D2D ID of the UEs in general could be implemented based on a number of different options. For example the D2D ID could be cell radio network temporary identifier (C-RNTI). The D2D ID could After the RRC connection establishment of UE A 302 is complete, the EPS bearer establishment and the service request routing for UE A 302 proceed as the procedures in FIG. 3A. The request may be routed through other network nodes, such as S-GW, P-GW, etc., and then arrives at the eNB 301 which then informs UE B 303 that the UE B 303 is being called. The UE B 303 then establishes a RRC connection with eNB 301 in order to respond to the request. After serving the RRC connection request, the eNB 301 would in step S316 store the RRC establishment cause (e.g. MT). Afterwards, the eNB 301 would respond by transmitting RRCConnection setup to the UE B 303. The UE B 303 may in step S 317 transmit RRCConnectionSetupComplete which includes a D2D ID of the UE B 303. In response to receiving the RRCConnectionSetupComplete, the eNB 301 in step S318 may store the D2D ID of eNB 301 and link the D2D ID with the UE B 303 and MT. In another exemplary embodiment, the establishment cause (e.g. MT) or the D2D ID may also be embedded in a different message other than RRCConnectionSetupComplete or be sent as an independent message. In step S319, the eNB 301 then searches the stored information of the eNB 301 to find whether there is a device whose establishment cause indicates that it is a caller (e.g. mobile originating) and the corresponding ID (the callee ID) is the ID of the UE B 303. The control node or eNB 301 will find that UE B 303 is just the device being sought and then would try to arrange for the D2D communication to automatically occur between UE A 302 and UE B 303. And then, the EPS bearer setup for UE B 303 and the rest of the SIP procedure as FIG. 3A would proceed.

The aforementioned embodiment of FIG. 3C applies to the circumstance when the caller UE A 302 and the callee UE B 303 are in the idle mode and thus are not RRC connected with the eNB 301. Therefore, during the RRC connection process, the callee D2D ID is carried over to eNB 301 in order for the D2D communication to be automatically triggered. However, in the case that the caller UE A 302 is already in RRC connected mode and would like to initiate a phone call, a different embodiment could be required. For the case in which the UE A 302 is already in the RRC connected mode, the information necessary to trigger an automatic D2D communication could be carried in the radio bearer setup procedure.

Figure 4A:
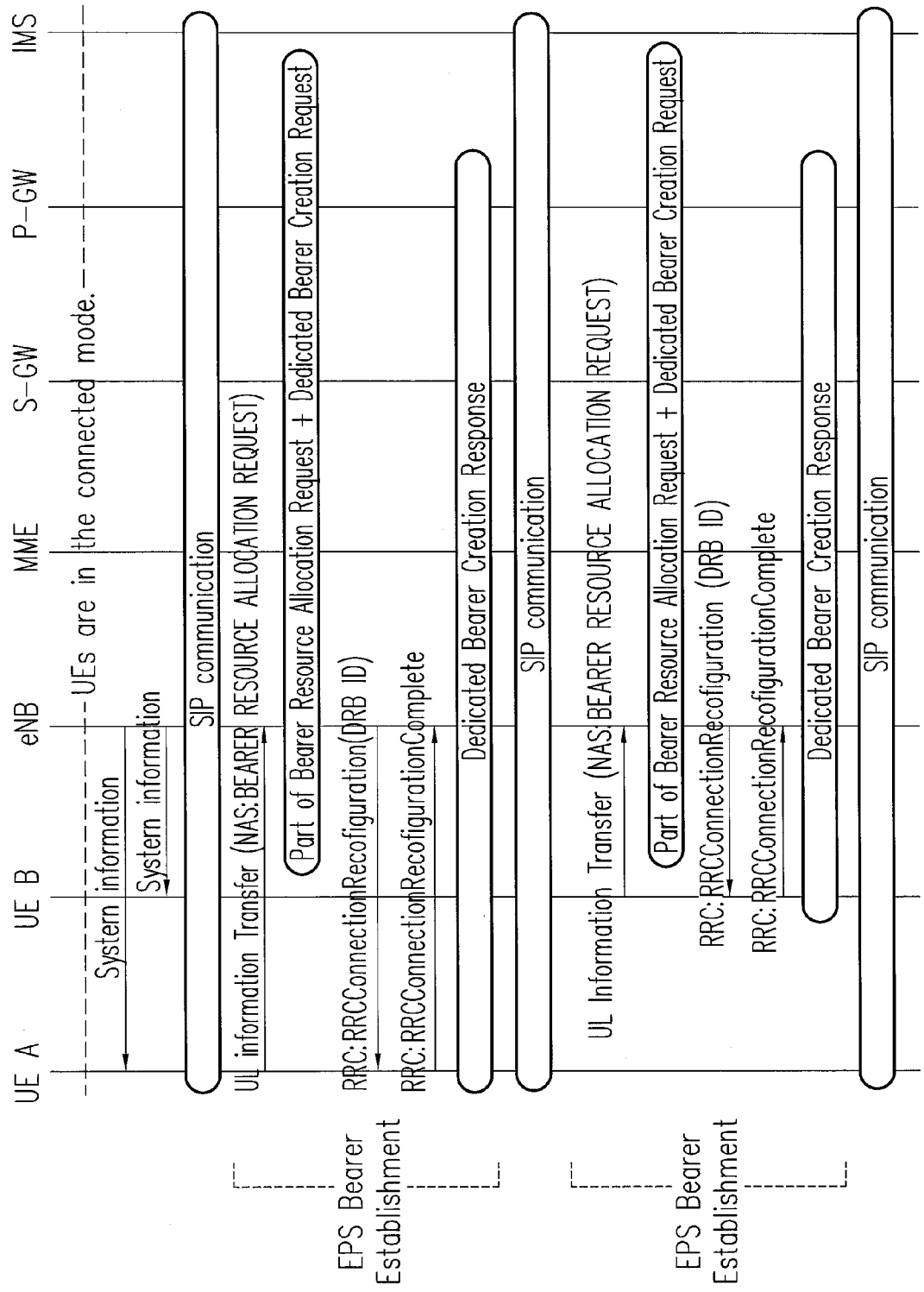
FIG. 4A illustrates a conventional communication procedure in a RRC connected scenario.

FIG. 4A illustrates a conventional communication procedure known by persons skilled in the art in a scenario in which UE A and UE B are already in RRC connected mode for LTE/LTE A. The conventional procedure would include a procedure to setup EPS bearer establishment for UE A and a procedure to setup EPS bearer establishment for UE B.

Figure 4B:
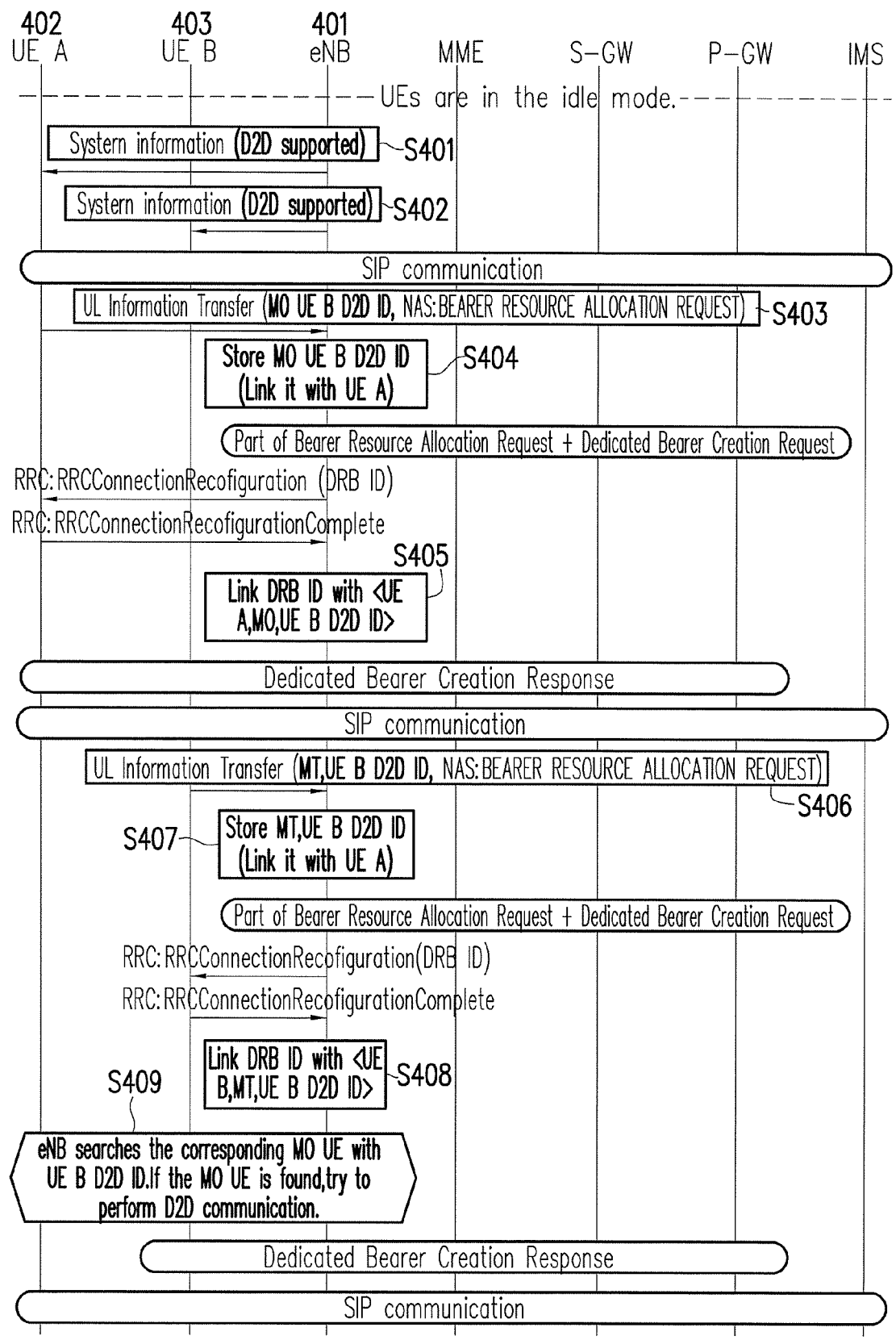
FIG. 4B illustrates D2D connection trigger by eNB in a RRC connected scenario in accordance with one of the exemplary embodiments of the present disclosure.

FIG. 4B illustrates D2D connection trigger by an eNB in a RRC connected scenario in accordance with one of the exemplary embodiments of the present disclosure. The exemplary embodiment of FIG. 4B could be implemented in different ways and is built upon FIG. 4A so that a complete overhaul of a communication system is not required to order to accommodate D2D communication in the existing LTE/LTE A system. Assuming that UE A 402 and UE B 403 are served by the same eNB 401, the concept of FIG. 3B here would also apply.

In step S401 and S402, the eNB 401 respectively transmits to both UE A 402 and UE B 403 system information which would indicate that the communication system would support D2D mode of communication. When UE A 402 wants to communicate with UE B 403 and both of them are in the RRC connected mode, the UE A 402 would request to establish a radio/EPS bearer, which is an instance of a specific connection as previously described for FIG. 2C. During the radio/EPS bearer establishment of UE A 402, the UE A 402 in step S403 may send the ID of UE B 403, the callee, and an establishment cause such as MO to the eNB 401 via either an independent RRC message or embedded in another RRC message such as the RRC UL Information Transfer as illustrated in FIG. 4B. When the eNB 401 receives the ID of UE B 403 and MO, the eNB 401 in step S404 stores the MO establishment cause and ID of UE B 403. The eNB 401 then sends RRCConnectionsReconfiguration which contains a dedicated radio bearer (DRB) ID for UE A 402, and UE A 402 responds by transmitting RRCConnectionReconfigurationComplete. In step S405, the eNB 401 links these stored information to the dedicated radio bearer ID of UE A 402.

During the radio/EPS bearer establishment of UE B 403, UE B in step S406 may send the D2D ID and the MT establishment cause to the eNB either through an independent RRC message or by embedding D2D ID and MT in another message such as UL Information Transfer. When the eNB 401 receives the D2D ID of the UE B 403 and the establishment cause, the MT, the eNB 401 in step S407 stores the D2D ID of the UE B 403 and the establishment cause with UE B 403. In step S408, eNB 401 links the stored information to the DRB ID of UE B 403. Then, in step S409, the eNB 401 searches the stored information of the eNB 401 to find whether there is a UE with a radio bearer, and the establishment cause of the UE indicates that the UE is a caller (e.g. mobile originating) having transmitted a corresponding callee D2D ID which is the ID of the UE B 403. When the eNB 401 have found the established radio bearer of UE A 401, the eNB 401 would automatically try to perform D2D communication for the corresponding established radio bearers of UE A 402 and UE B 403.

Although in FIG. 4B, the D2D ID of the UE B 403 is carried in a RRC message, RRC UL Information Transfer, the ID may also be carried in another message, e.g. RRCConnectionReconfigurationComplete, or another RRC message. Also in general, in addition to the callee D2D ID being transmitted, the caller D2D may also be transmitted by the caller UE so that eNB may have more information to perform a UE search and to check whether D2D could be performed.

Figure 4C:
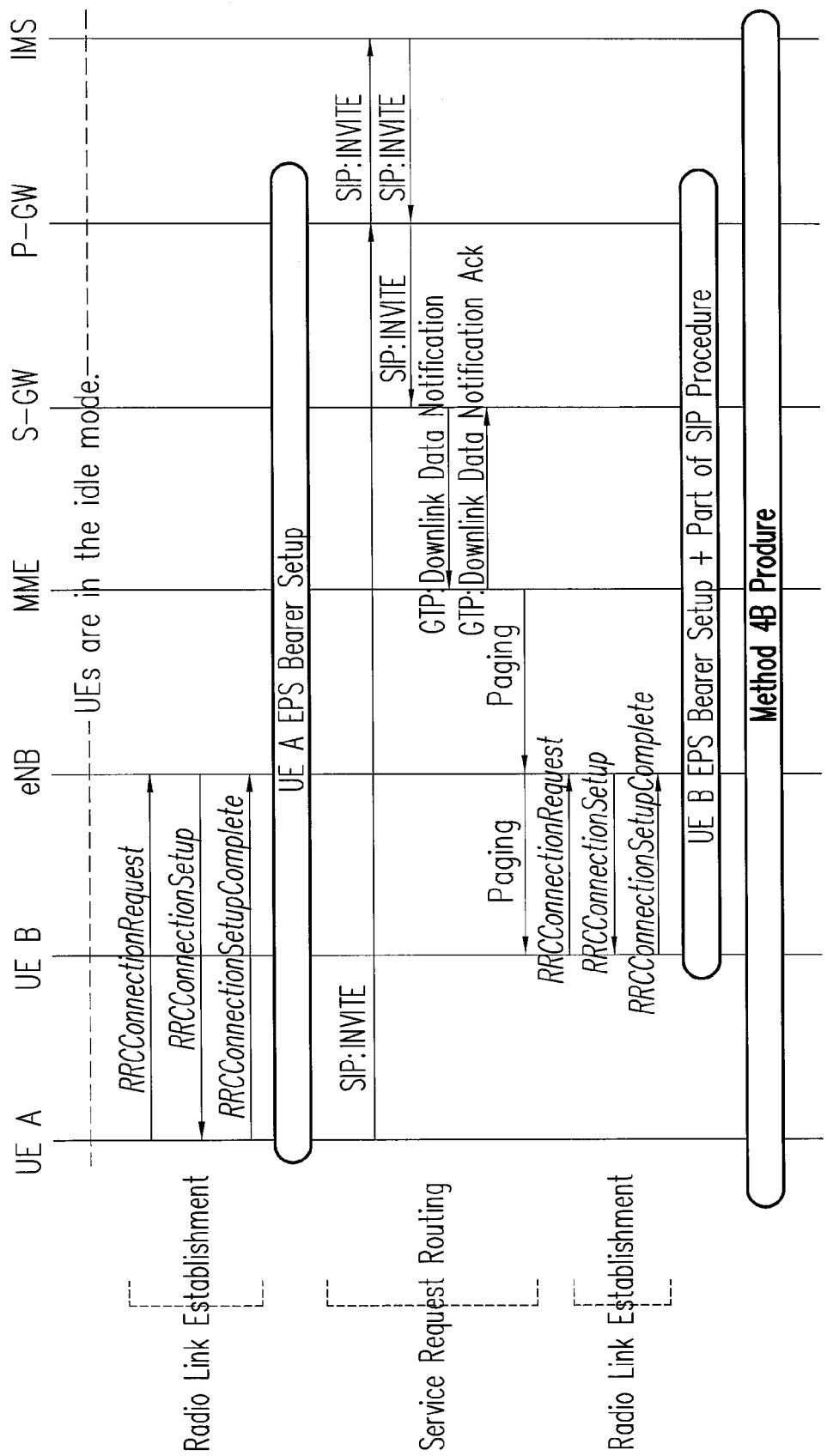
FIG. 4C illustrates applying the embodiment of FIG. 4B after radio link establishment in the idle mode in accordance with one of the exemplary embodiments of the present disclosure.

While FIG. 3C may be applied to UEs in RRC idle mode, FIG. 4B may be applied to UEs in RRC connected mode. However, if one or both of the two UEs are originally in RRC idle mode, one or both UEs could enter RRC connected mode first and then apply the procedure in FIG. 4B. FIG. 4C shows an example in which two UEs originally in the RRC idle mode would follow the radio link establishment procedure as illustrated in FIG. 4C and enter RRC connected mode to perform the procedure of FIG. 4B. In this way, the procedure of FIG. 4B may also be applied to UEs in the RRC idle mode. Regardless whether candidate D2D UEs are in connected mode or in an idle mode, the callee D2D ID would be carried to an eNB the during radio bearer establishment for in order for the automatic D2D trigger to be arranged by the eNB.

Figure 5A:
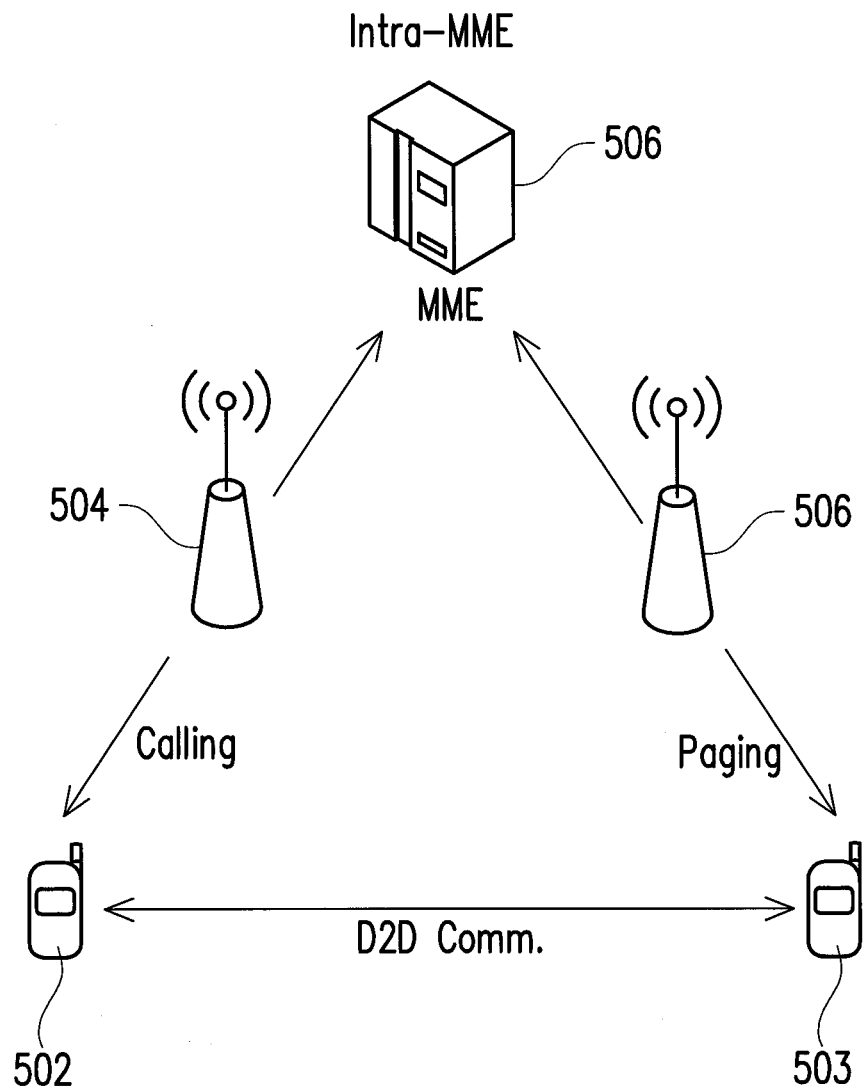
FIG. 5A illustrates intra-MME D2D communication in accordance with one of the exemplary embodiments of the present disclosure.
Figure 5B:
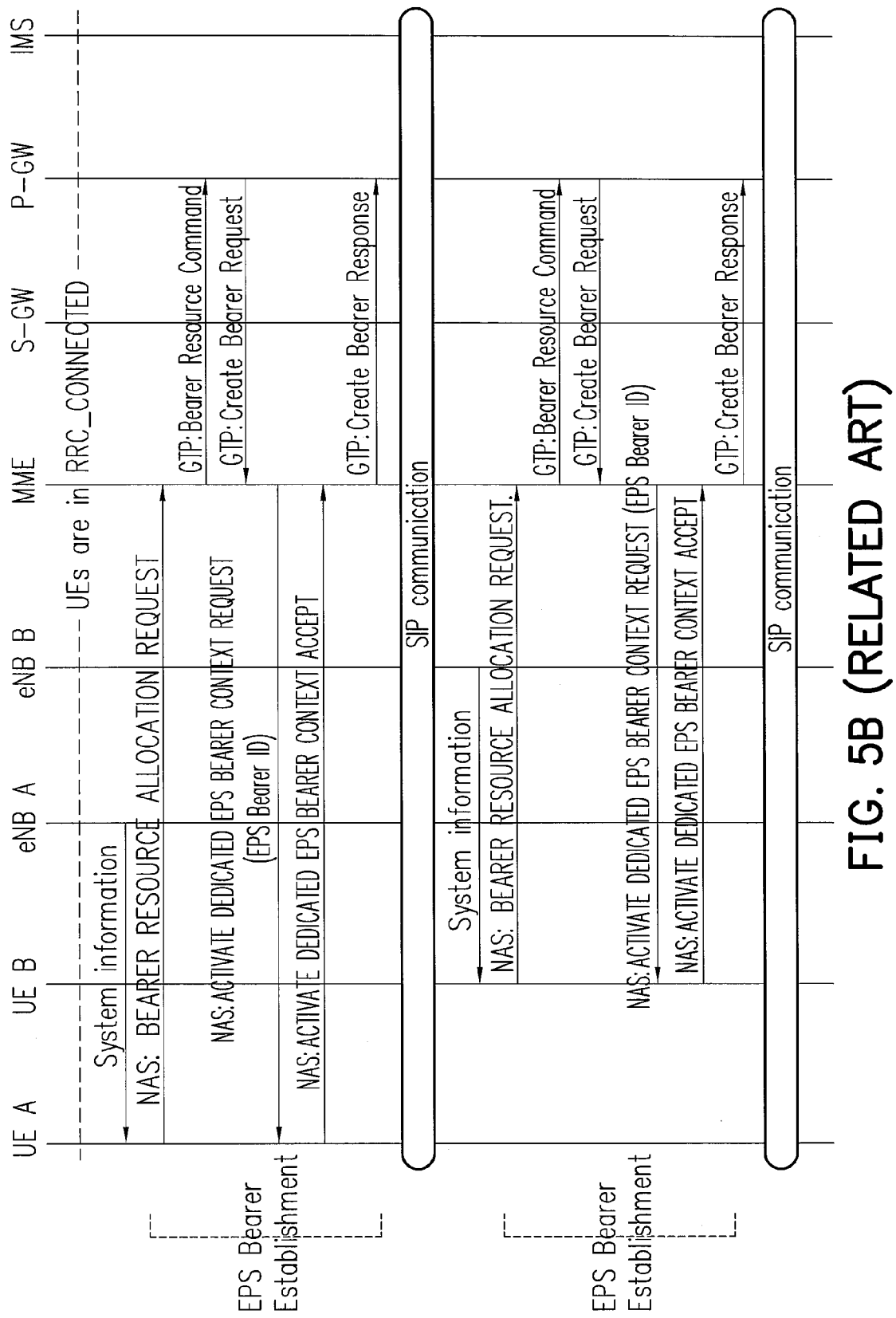
FIG. 5B illustrates a convention communication procedure for a normal call setup in connected cases.
Figure 5C:
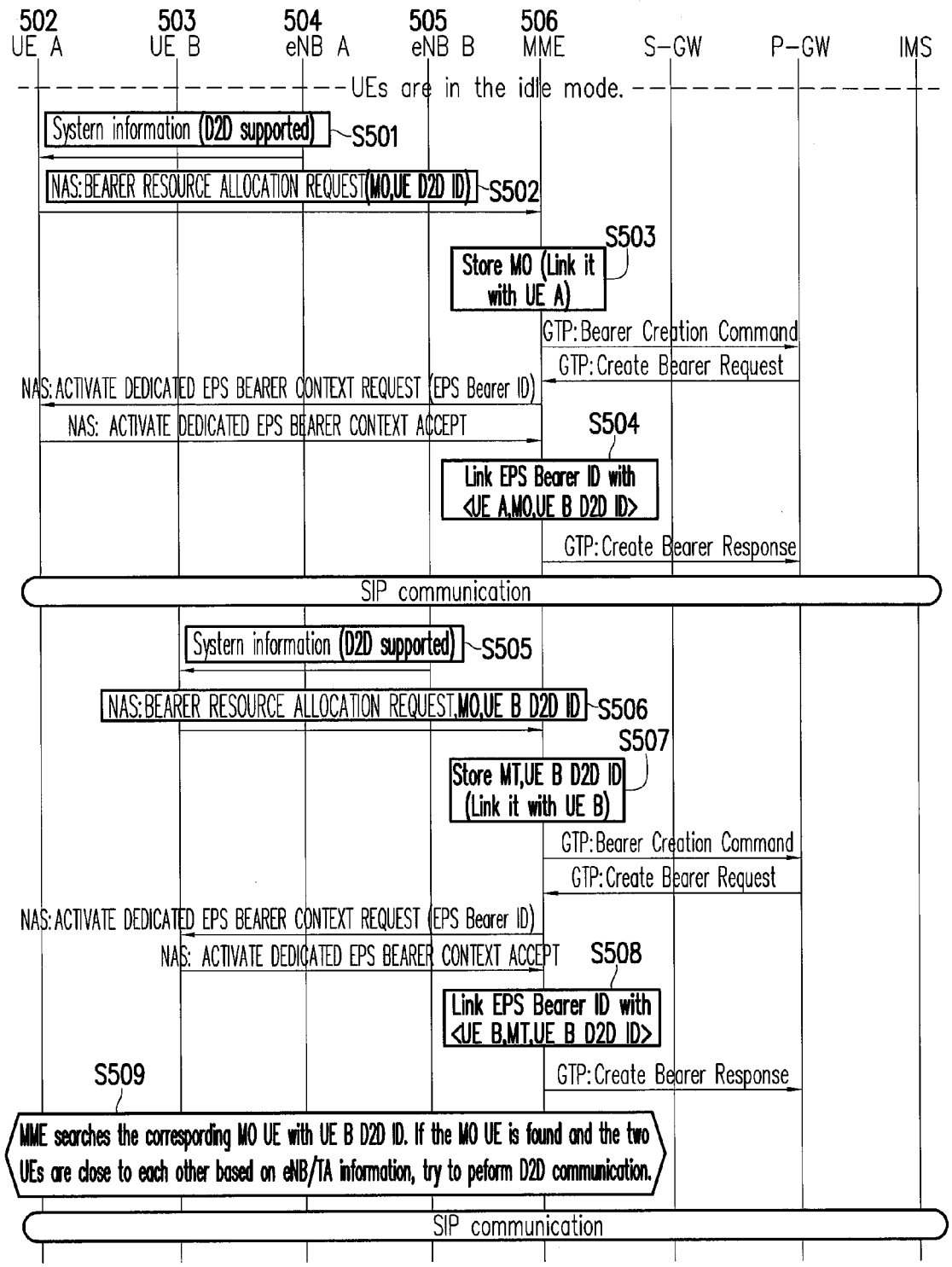
FIG. 5C illustrates D2D Connection Trigger by MME in accordance with one of the exemplary embodiments of the present disclosure.

For the circumstance in which the caller and the callee UEs are situated within each other's radio range but are served by two different eNBs, the existing LTE/LTE A system could be further modified to accommodate D2D communications for UEs served by different control nodes. One solution could be to adopt a MME for the role of a control node. FIG. 5A illustrates intra-MME D2D communication in accordance with one of the exemplary embodiments of the present disclosure. In the exemplary scenario a UE 502 is served by the eNB 504, and another UE 503 is served by the eNB 505. Assuming that the UE 502 calls the UE 503, a modification could be made to an existing LTE/LTE system such that the MME 506 could automatically arrange D2D communication based on information carried during specific connection establishments. FIG. 5B illustrates a conventional communication procedure for a normal call setup in connected cases when UEs are served by different eNBs. A proposed modification of FIG. 5B is illustrated by FIG. 5C, and an exemplary embodiment is proposed as follows.

Assuming that UE A 502 and UE B 503 are already in a RRC connected state. In step S501, the eNB A 503 which services UE A 502 transmits system information which would indicate that D2D communication is supported through a connection with eNB A 504. Also in step S505, eNB B 505 would similarly transmit system information including an indication for D2D capability to UE B 503. When the UE A 502 calls UE B 503, the caller UE 502 may request to establish an EPS bearer, i.e. a specific connection. During the EPS bearer establishment of UE A 502, in step S502, UE A 502 may send the D2D ID of UE B 503 and an establishment cause such as mobile originating to the MME 506 either through an individual NAS message or by embedding the D2D ID and the establishment cause in another NAS message such as NAS Bearer Resource Allocation Request. When the MME 506 receives the MO and D2D ID of UE B 503, in step S503 the MME 506 stores D2D ID of UE B 503 and the establishment cause. In step S504, the MME 506 links the stored D2D ID of UE B 503 and the establishment cause with UE A 502 and the established EPS bearer ID of UE A 502.

Similarly, the callee UE 503 would request to establish an EPS bearer by following a similar procedure. During the EPS bearer establishment of the callee UE 503, the callee UE 503 in step S506 may send its D2D ID and an establishment cause such as MT to the MME 506 either through an individual NAS message or by embedding the D2D ID of UE B 503 and the establishment cause in another NAS message such as NAS Bearer Resource Allocation Request. When the MME 506 receives D2D ID of UE B 503 and the establishment cause, in step S507 the MME 506 stores D2D ID of UE B 503 and the establishment cause. In step S508, the MME 506 and links the stored D2D ID of UE B 503 and the establishment cause (e.g. MT) with the callee UE 503 and the established EPS bearer ID of the callee UE 506.

Then, in step S509 the MME 506 searches the stored information to find whether there is a UE with a EPS bearer which contains an establishment cause indicating that the UE is a caller (e.g. mobile originating) and the corresponding callee ID being the ID of the UE 503. If such a UE and its EPS bearer are found and/or the two UEs 502 503 are close to each other based on eNB and/or tracking area (TA) and/or other location information, the MME 506 would try to arrange D2D communication for the corresponding EPS bearers of UE 502 and UE 503.

Although in FIG. 5C, the ID of UE B 503 is carried in a NAS message, NAS Bearer Resource Allocation Request, the ID of UE B 503 may also be carried in other modified messages by persons skilled in the art. Also, in addition to the callee ID being carried, the caller ID may also be carried in NAS messages or other messages to a MME so that the MME may have more information to perform UE searches and to check whether D2D could be performed at a later time.

Also similar to FIG. 4B, FIG. 5C may be applied when UEs in the RRC idle mode. If one or both of the two UEs are originally in RRC idle mode, the same concept as FIG. 4C could be applied so that they could enter RRC connected mode first and then apply procedures of FIG. 5C. In this way, the procedure of FIG. 5C may also be applied to UEs in the RRC idle mode. Also, it should be noted that the embodiment of FIG. 5C could be applied regardless whether the UEs are served by the same eNB or by different eNBs.

Figure 6A:
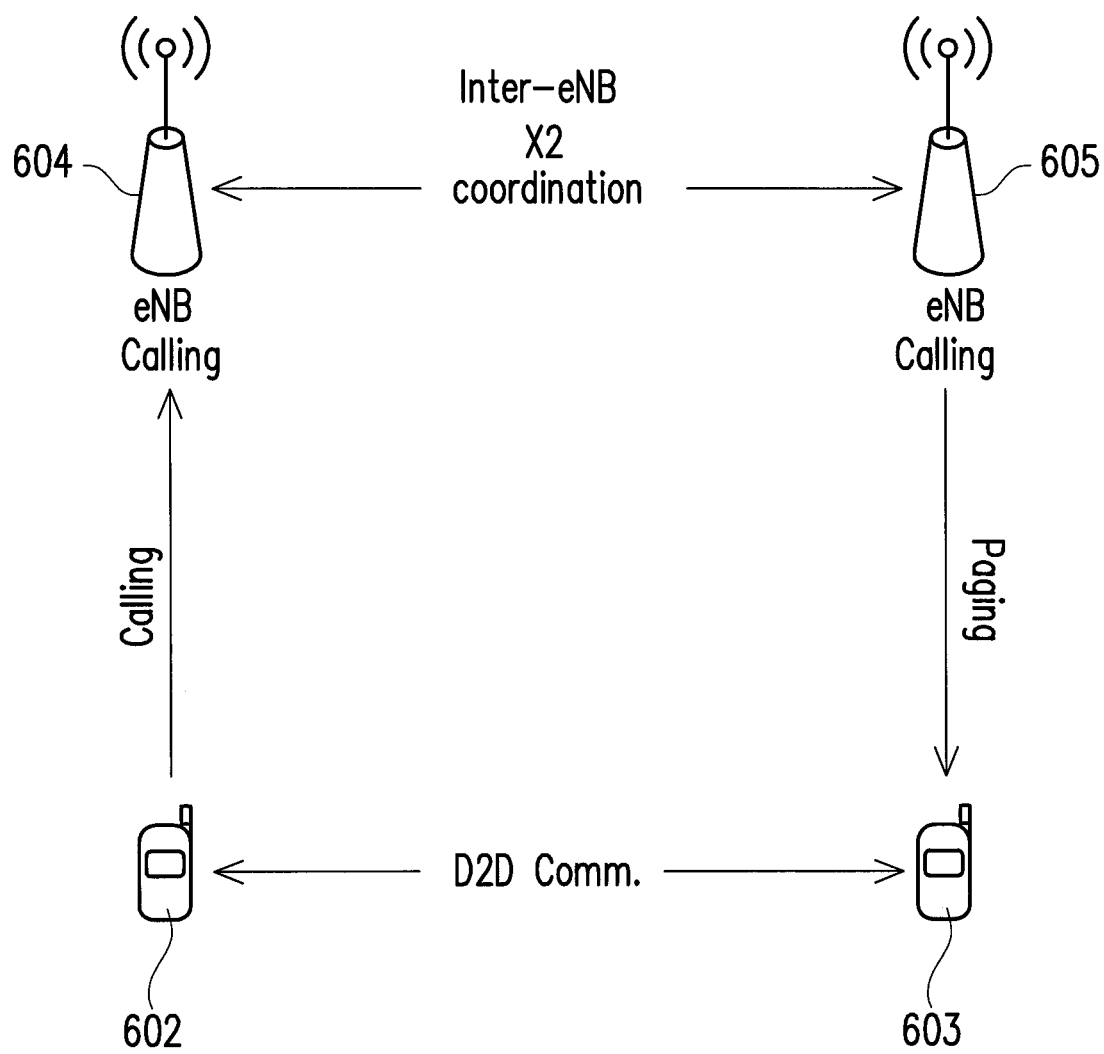
FIG. 6A illustrates Inter-eNB D2D communication in accordance with one of the exemplary embodiments of the present disclosure.

Besides FIG. 5C, in the case that UEs are served by different eNBs, there is another method to perform automatic D2D communication without directly involving a MME. FIG. 6A illustrates Inter-eNB D2D communication in accordance with one of the exemplary embodiments of the present disclosure. In FIG. 6A, UE 602 is served by eNB 604 and UE 603 is served by eNB 605. Assuming that UE 602 calls UE 603, UE 602 would first establish a connection with eNB 604 and then use the connection to request services from the serving network. After service request is accomplished, the eNB 605 would page the UE 603 to inform that the UE 603 is being called by the UE 602. One of the differences from previous embodiments is that two eNBs would coordinate between each other through an interface such as X2 interface to obtain necessary information to decide whether proper conditions exist to automatically trigger D2D connections.

Figure 6B:
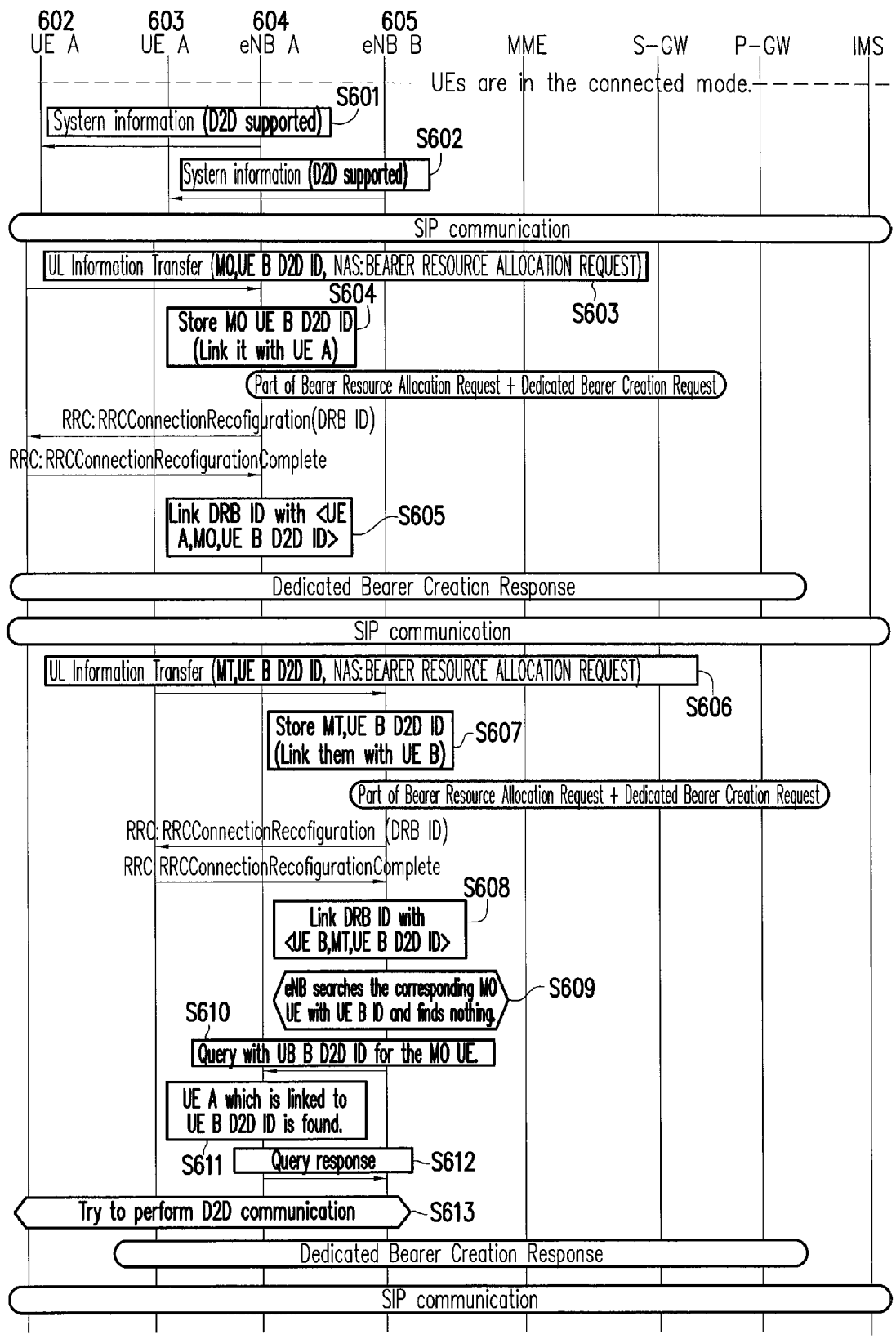
FIG. 6B illustrates D2D connection trigger by eNB coordination in accordance with one of the exemplary embodiments of the present disclosure.

A specific embodiment is shown in FIG. 6B by illustrates D2D connection trigger by eNB coordination in accordance with one of the exemplary embodiments of the present disclosure. The procedures of FIG. 6B is similar to FIG. 4B except that an eNB may query or/and share stored information, such as callee IDs, radio bearer IDs, and establishment causes with other eNBs either directly or indirectly through other nodes so that the eNB may search not only its own stored information but also the information stored by other eNBs through sharing.

In steps S601 and S602, the eNB A 604 and eNB B 605 transmits system information which indicates that D2D mode of communication is supported by the serving network respectively to UE A 602 and UE B 603. In step S603, UE A establishes a radio bearer by transmitting data such as UL Information Transfer which includes a MO and D2D ID of UE B 603 to eNB A 604. In response to receiving UL Information Transfer, in step S604 eNB A 604 stores the MO and D2D ID of UE B 603 and links such information with UE A 603. Next, the eNB A exchanges RRC Connection Reconfiguration messages with UE A 602 and in step S605 links the DRB ID of UE A 602 with the stored MO and the corresponding D2D ID of the UE B 603.

In step S606 UE B 603 also establishes a radio bearer by transmitting UL Information Transfer which includes a MT establishment cause and the D2D ID of the UE B 603 to eNB B 605. In response to receiving the UL Information Transfer, in step S607 the eNB B 605 stores the MT establishment cause and the D2D ID of the UE B 603 and links them with UE B 603. After exchanges of RRC Connection Reconfiguration between eNB B 605 and UE B 603, in step S608 the eNB B 605 links the DRB ID of UE B 603 with the MT and the D2D ID of UE B 603.

Next in step S609, the eNB B 605 searches for the calling UE from the stored information of eNB B 605 by looking for a UE having a MO establishment cause and a corresponding D2D ID being the D2D ID of the UE B 603. However, such information would not be found by the eNB B 605 since they would not be stored in eNB B 605 but somewhere else in another eNB. In step S610, the eNB B transmits a query to other eNBs including eNB A 604 for a UE having a MO establishment cause and a corresponding D2D ID of the UE B 603. In step S611, the eNB A 604 searches from its own stored information and locates the caller UE A 602. In step S612, eNB A 604 transmits to eNB B 605 a query response through the X2 interface. In response to receiving the query response, in step S613 the eNB A 604 and the eNB B 605 would attempt to arrange for D2D communication between UE A 602 and UE B 603.

According to another embodiment, one variation for the embodiment of FIG. 6B is that the MO establishment cause and the D2D ID of the UE B 603 could be delivered through RRCConnectionReconfigurationComplete or another message. Also D2D ID of the UE A 602 could also be delivered along with the D2D ID of the UB B 603. Also the D2D ID could be implemented based on other IDs as listed in Table 1.

The procedure of FIG. 6B would allow some DRBs using D2D communication while other DRBs using non-D2D based cellular communications. Also a procedure similar to FIG. 4C could be applied so that the procedure of FIG. 6B could be applied regardless whether the UEs are originally idle or connected.

Figure 7A:
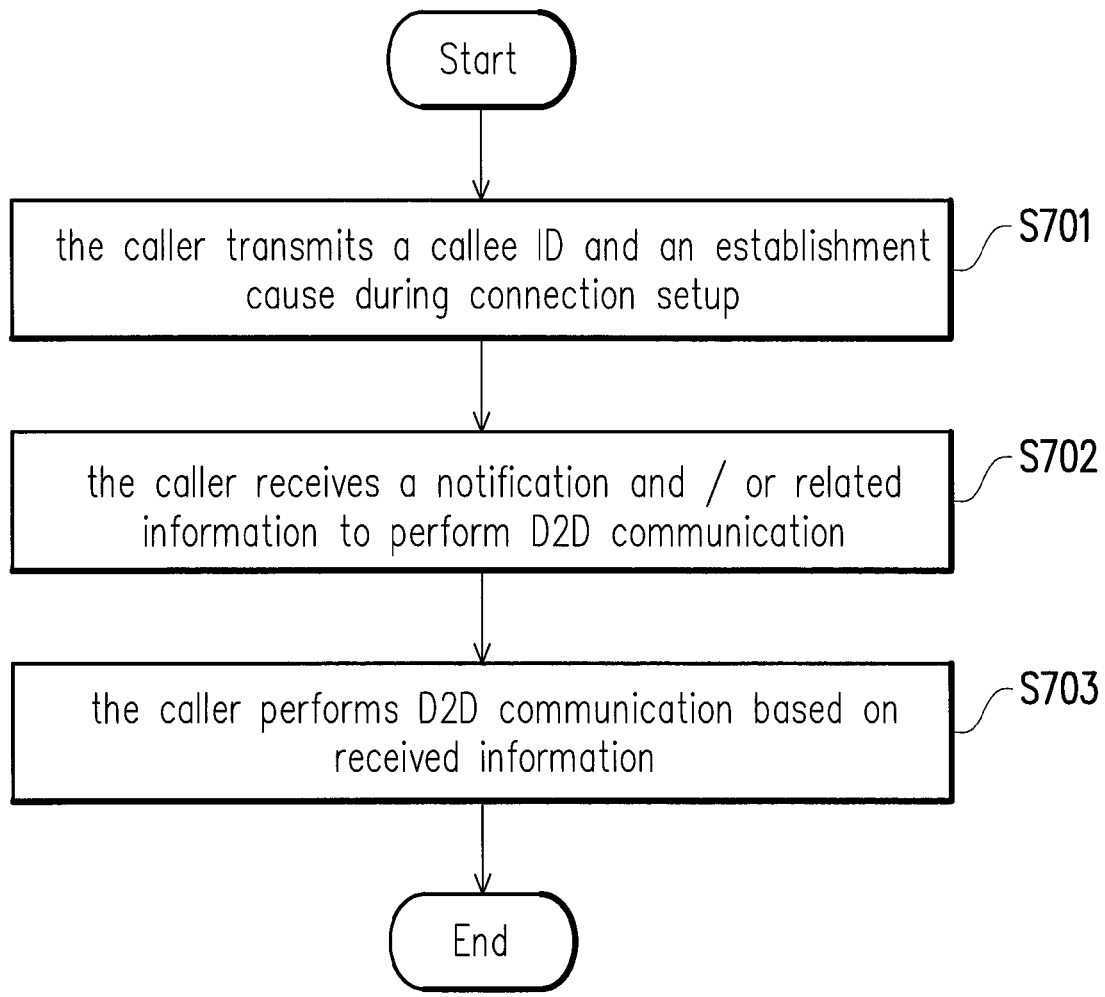
FIG. 7A is a flow chart illustrating proposed D2D communication method from the perspective of a caller

FIG. 7A is a flow chart illustrating proposed D2D communication method from the perspective of a caller. In step S701 the caller transmits a callee ID and an establishment cause during connection setup. S702 the caller receives a notification and/or related information to perform D2D communication. In step S703 the caller perform D2D communication based on received information.

Figure 7B:
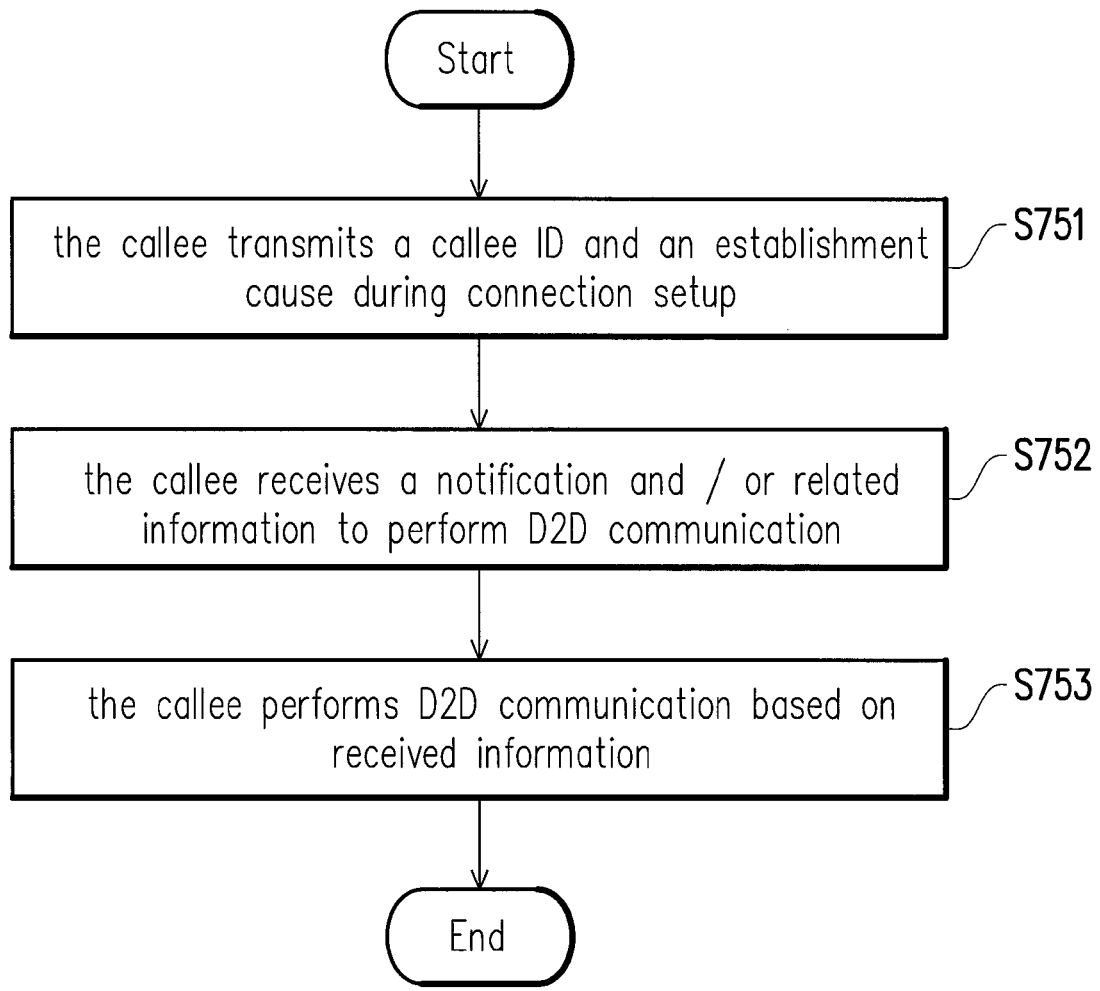
FIG. 7B is a flow chart illustrating proposed D2D communication method from the perspective of a callee.
Figure 7C:
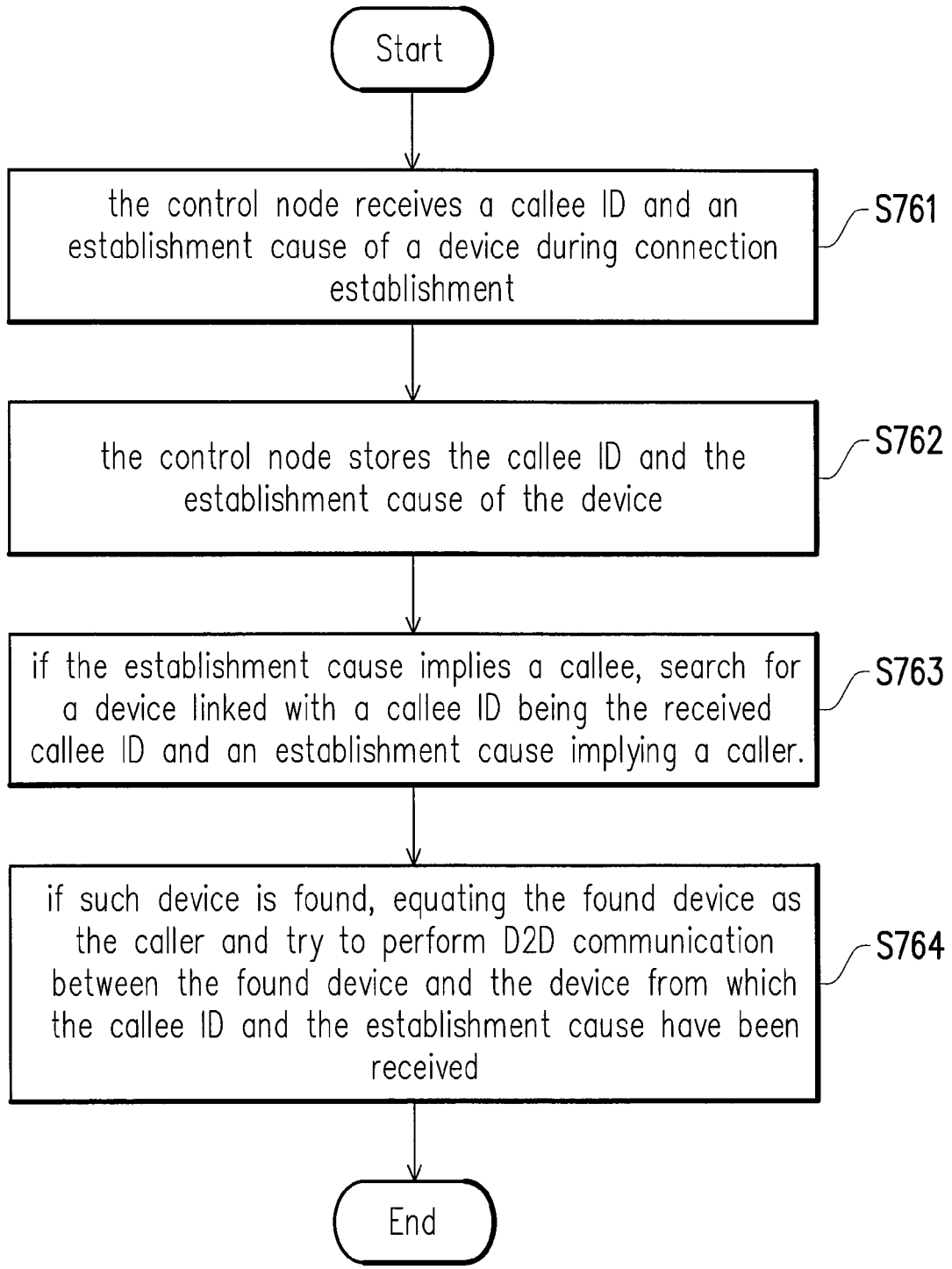
FIG. 7C is a flow chart illustrating proposed D2D communication method from the perspective of a control node.

FIG. 7B is a flow chart illustrating proposed D2D communication method from the perspective of a callee. In step S751, the callee transmits a callee ID and an establishment cause during a connection setup. In step S752, the callee receives a notification and/or related information to perform D2D communication. In step S753 the callee perform D2D communication based on received information FIG. 7C is a flow chart illustrating proposed D2D communication method from the perspective of a control node after the control has been informed by the network of an incoming call, and the control node pages a device accordingly. In step S761 the control node receives a callee ID and an establishment cause of the device during a connection establishment. In step S762 the control node stores the callee ID and the establishment cause of the device. In step S763 if the establishment cause implies a callee, search for a candidate caller device linked with the received callee ID and has an establishment cause implying a caller. In step S764 if such device is found, equating the found device as the caller and try to perform D2D communication between the found device and the device from which the callee ID and the establishment cause have been received from step S761.

Figure 8A:
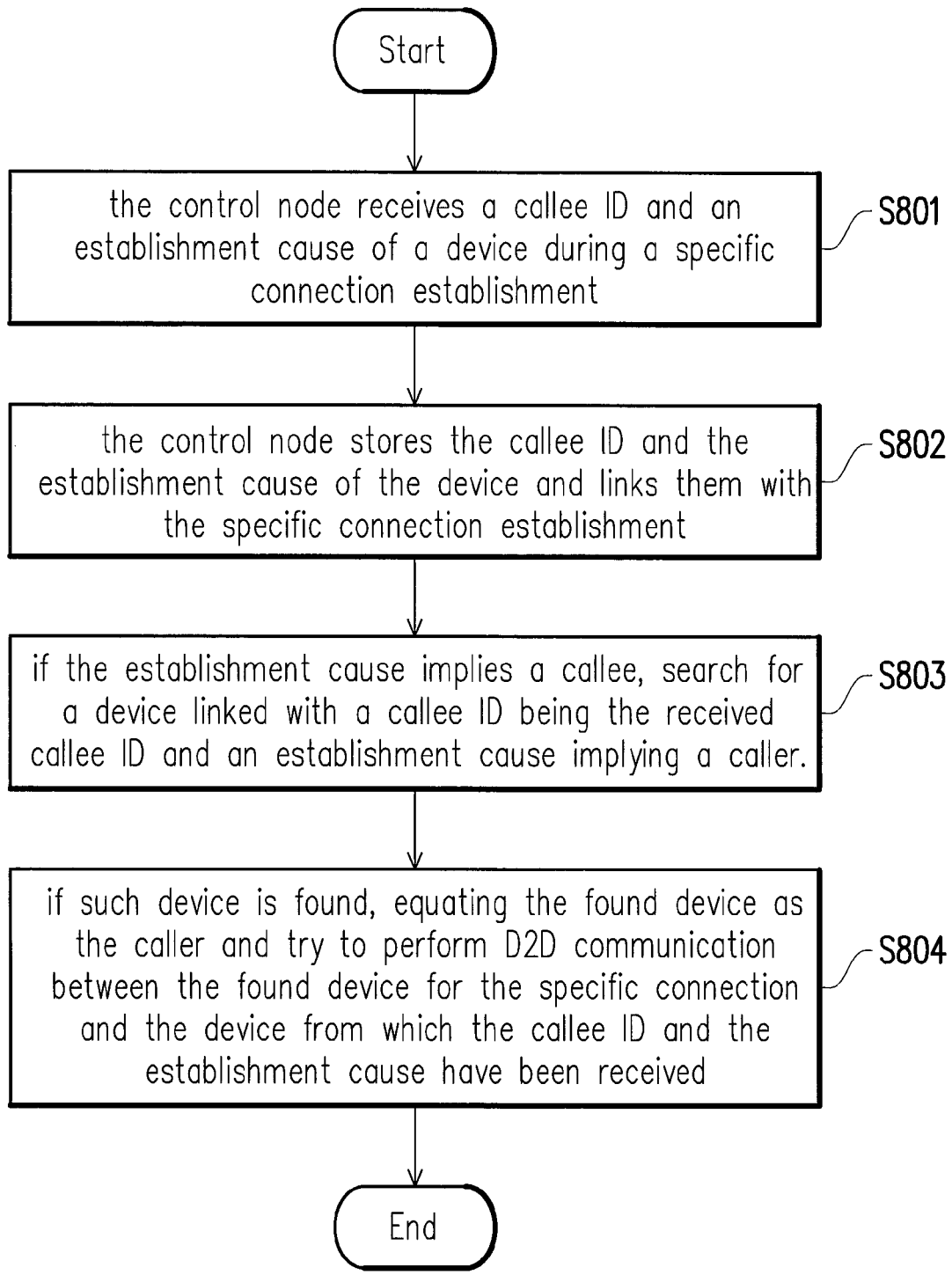
FIG. 8A is a flow chart illustrating proposed D2D communication method for a specific connection type from the perspective of a control node.

FIG. 8A is a flow chart illustrating proposed D2D communication method consistent with FIG. 2C for a specific connection type from the perspective of a control node after the control has been informed by the network of an incoming call, and the control node pages a device accordingly. In step S801, the control node receives a callee ID and an establishment cause of a device during a specific connection establishment. In step S 802, the control node stores the callee ID and the establishment cause of the device and links them with the specific connection establishment. In step S803, if the establishment cause implies a callee, search for a device linked with a callee ID being the received callee ID from step S801 and an establishment cause implying a caller. In step S804 if such device is found, equating the found device as the caller and try to perform D2D communication between the found device for the specific connection and the device from which the callee ID and the establishment cause have been received back in step S801. The process of FIG. 8B is also consistent with FIGS. 4B 5C and 6B.

Figure 8B:
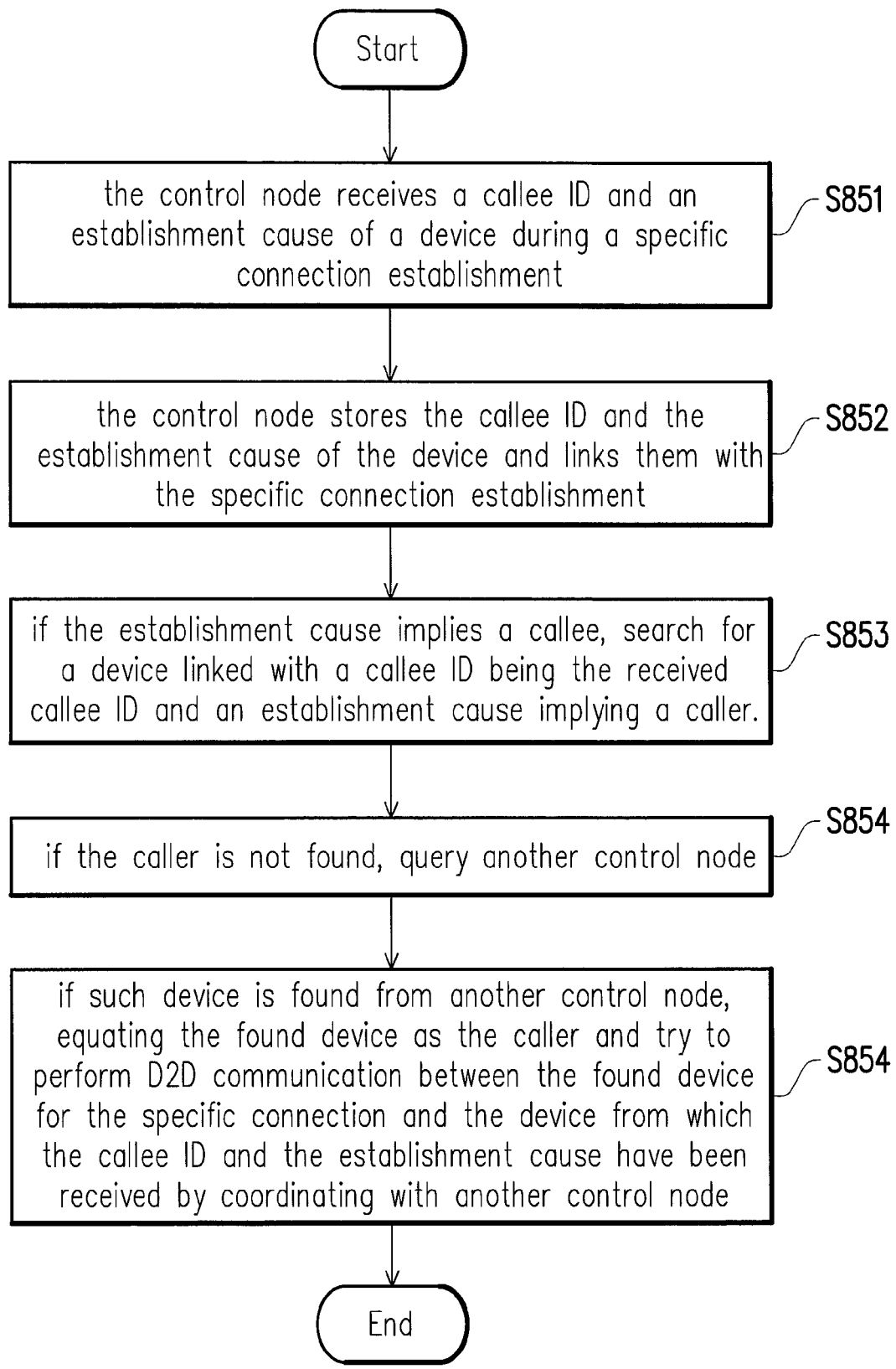
FIG. 8B is a flow chart illustrating proposed D2D communication method involving control nodes coordination from the perspective of a querying control node.

FIG. 8B is a flow chart illustrating proposed D2D communication method involving control nodes coordination from the perspective of a querying control node and is consistent with the embodiment of FIG. 6B. In step S851 the control node receives a callee ID and an establishment cause of a device during a specific connection establishment. In step S852 the control node stores the callee ID and the establishment cause of the device and links them with the specific connection establishment. In step S853, if the establishment cause implies a callee, search for a device linked with a callee ID being the received callee ID from step S851 and an establishment cause implying a caller. In step S854 if the caller is not found, query other control nodes. In step S855, if such device is found from another control node, equating the found device as the caller and try to perform D2D communication between the found device for the specific connection and the device from which the callee ID and the establishment cause have been received back in step S851 by coordinating with the another control node.

Figure 8C:
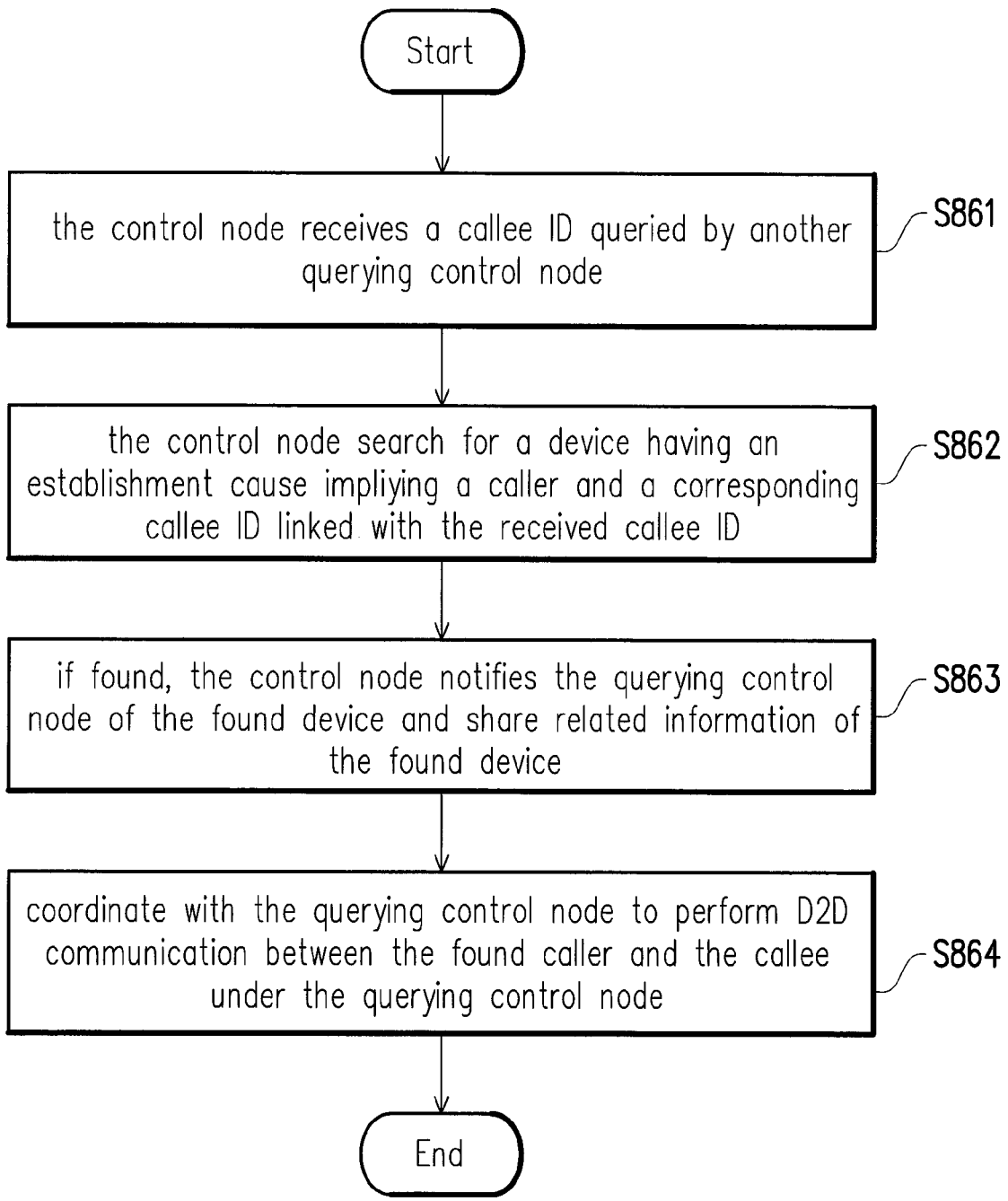
FIG. 8C is a flow chart illustrating proposed D2D communication method involving control nodes coordination from the perspective of a queried control node.

FIG. 8C is a flow chart illustrating proposed D2D communication method involving control nodes coordination from the perspective of a queried control node and is consistent with the embodiment of FIG. 6B. In step S861 the control node receives a callee ID queried by another querying control node. In step S862 the queried control node search from its own stored information for a device having an establishment cause implying a caller and a corresponding callee ID linked with the received callee ID. In step S863, if the caller is found, the control node notifies the querying control node of the found device and share related information of the found device. In step S864, the queried control node coordinates with the querying control node to perform D2D communication between the found caller and the callee under the querying control node.

Figure 9:
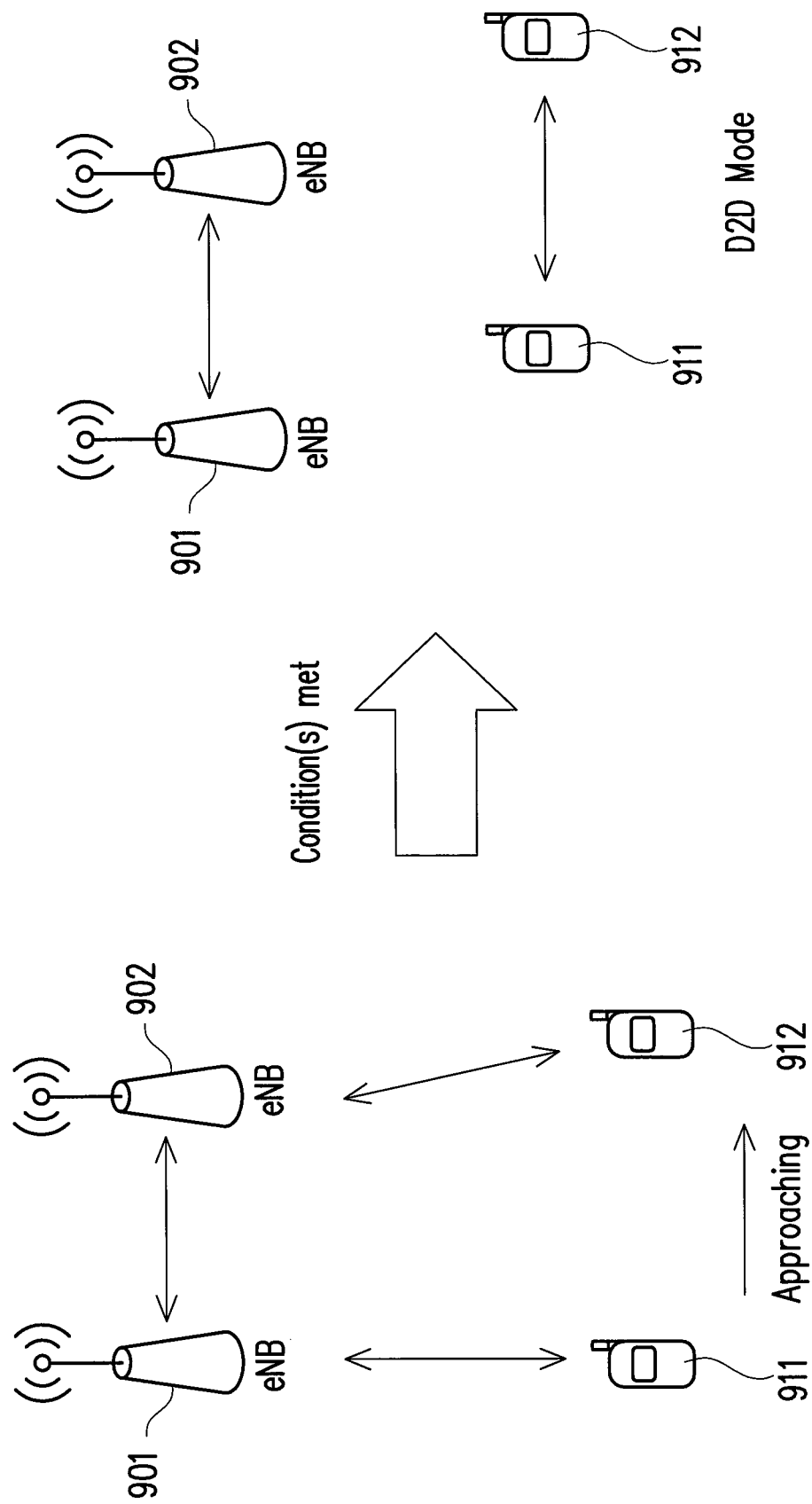
FIG. 9 illustrates automatic D2D communication in cases involving device mobility.

As for circumstances involving device mobility, please refer to the scenario of FIG. 9 which illustrates a general concept in a case when automatic D2D communication could be triggered after one device approaches the other device because of device mobility. For the scenario of FIG. 9, assuming that UE 911 is served under eNB 901, UE 912 is served under UE 902, and eNB 901 and eNB 902 could be in communication of each other across an established interface. In response to UE 911 approaching UE 912, based on the method of the present disclosure, the network could automatically arrange UE 911 to engage in D2D mode of communication with UE 912 after a certain condition(s) has been met, or the network could stay with the conventional cellular communication procedure if the certain condition (s) is lacking or because of other reasons. The present disclosure may apply to cases when UE 911 and UE 912 are served under the same eNB. The present disclosure may also apply to cases when eNB 901 and eNB 902 are each served by different NAS control nodes such as different MMEs.

In should be noted that for the present disclosure, a pair of UEs such as a caller and a callee, namely, UE 911 and UE 912, could already be in cellular conversation, but after the migration of either the caller UE or the callee UE, the network could automatically arrange for D2D communication between UE 911 and UE 912 when these UE pair are within the radio range of each other and thus could communicate directly with each other or when other conditions are also fulfilled such as the channel quality between the UE pair is adequate. One of the features of the present disclosure is that upon the migration of devices the network could automatically arrange for the D2D communication to occur without the awareness or the explicit willingness of the UE devices such that the user could benefit from the convenience of the automatic D2D arrangement from the network without experiencing interruptions or inconsistencies of the network service even though the user may migrate from one control node to another. Also, signaling overhead could be reduced due to ordinary procedures being used for both D2D communication and conventional cellular communication and the simplification of the communication paths of the D2D communication.

Also it should be noted that even though the present disclosure proposes embodiments to switch from the conventional cellular communication to D2D mode of communication upon device mobility, it should be apparent to one skilled in the art that the network could also switch from D2D communication to the conventional cellular communication due to reasons such as device mobility, the change of channel conditions, and etc. . . .

Figure 10A:
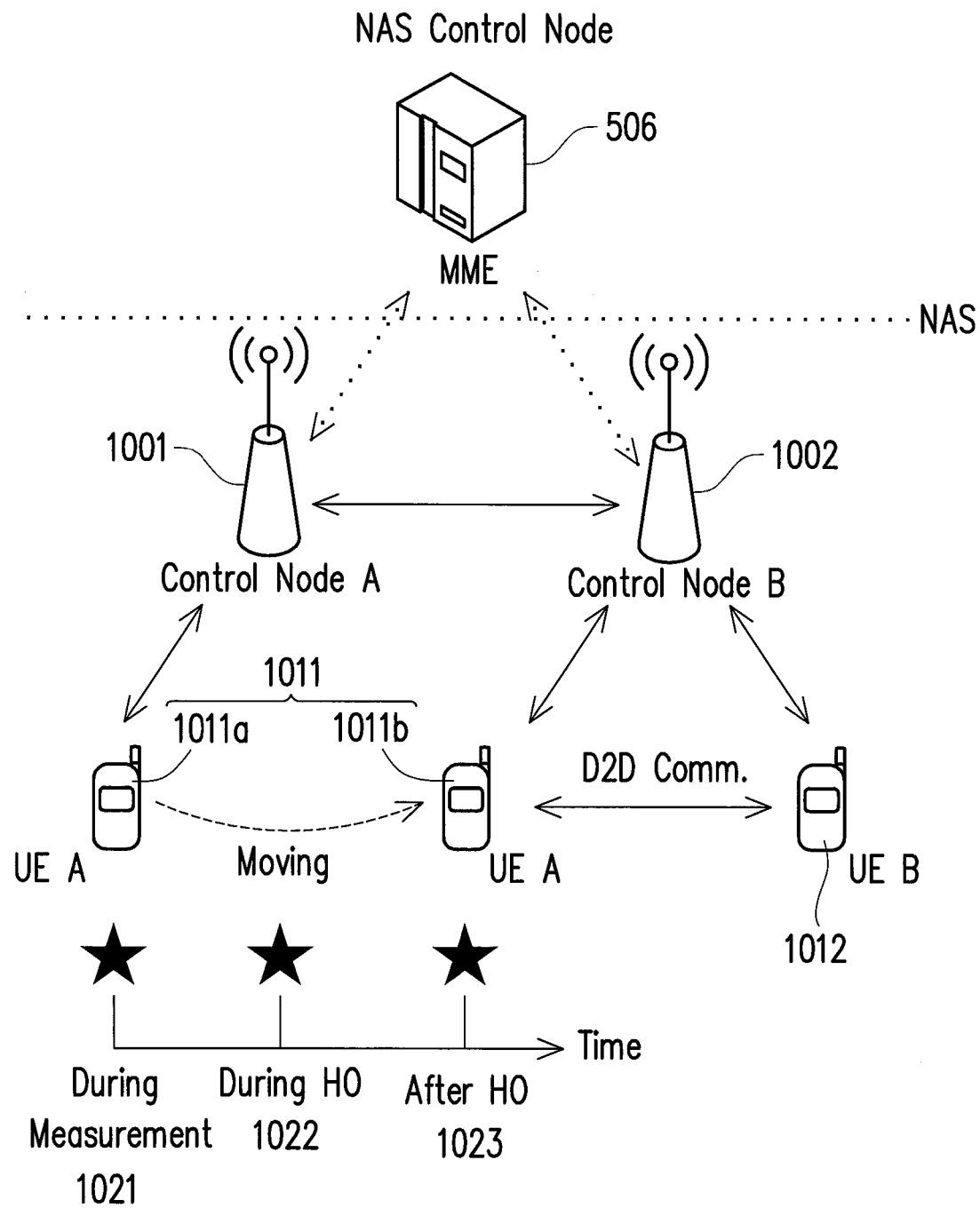
FIG. 10A illustrates automatic D2D communication arrangement for a migrating caller device in a wireless communication network.

FIG. 10A illustrates the D2D communication method with device mobility in a wireless communication network in accordance with the present disclosure. In the wireless network, UE A 1011 is served under control node A 1001 and UE B 1012 is served under control node B 1002, and control node A 1001 is assumed to be in communication with control node B 1002 but could also be idle. Control node A and control node B could also communicate with the network through another control node(s) such as a MME, a gateway, an intelligent maintenance center (IMS), or another network entity in the non access stratum (NAS) layer. Assuming in this exemplary scenario that UE A 1011a which is served under control node A 1001 migrates to another location in order to be served under control node B 1002, the network would then automatically arrange UE A 1011b to engage in D2D communication with UE B 1012. During the migration of UE A 1011, the handover procedure from the domain of control node A 1001 to the domain of control node B 1002 could be classified under three phases—a during measurement phase 1021, a during handover phase 1022, and an after handover phase 1023.

Figure 10B:
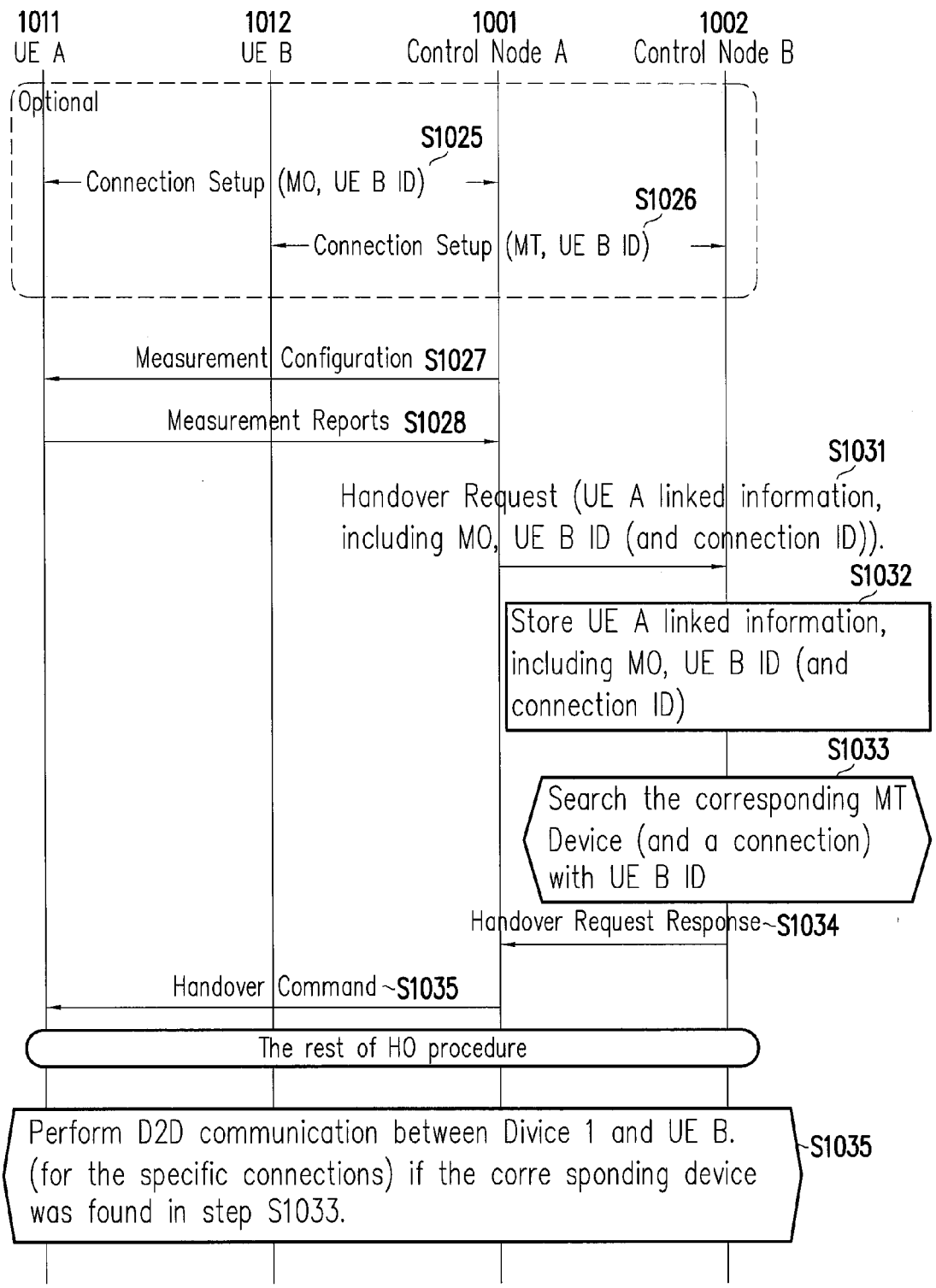
FIG. 10B illustrates automatic D2D communication establishment after a caller device handover in accordance with one of the exemplary embodiments of the present disclosure.

FIG. 10B illustrates automatic D2D communication establishment procedure upon a caller device handover in accordance with one of the exemplary embodiments of the present disclosure. Referring to FIG. 10A and FIG. 10B, first, a connection setup between control node A 1001 and UE A 1011 is established in an optional step S1025 during which UE A 1011 transmits a MO establishment cause and D2D ID of UE B 1012 to control node A 1001. The control node A 1001 then links the MO and the D2D ID of UE B 1012 to UE A 1011. Similarly, a connection setup between control node B 1002 and UE B 1012 is established in an optional step S1026 during which UE B 1012 transmits a MT establishment cause and D2D ID of UE B 1012 to control node B 1012. The control B 1002 then links the MT and the D2D ID of UE B 1012 to UE B 1012. It should be noted that steps S1025 and S1026 are optional since UE A 1011 and UE B 1012 could already be in conversation with each other and hence connection setups are not required.

Next, the measurement phase 1021 commences as in step S1027 control node A 1001 transmits to UE A 1011a measurement configuration containing measurement instructions and parameters. In step S1028, UE A 1011 responds by transmitting a measurement report back to control node A 1011. Steps S1027 and S1028 could be triggered upon potential handover situations such as when UE A 1011 is close to the edge of the radio range of the control node A 1001.

Next, control node A 1001 has decided to handover UE A 1011 to control node B as necessitated by reasons such as movements of UE A, and the during handover phase 1022 would start in step S1031 during which control node A 1001 would transmit a handover request to control node B 1002. The handover request would contain UE A 1011 information including the MO establishment cause, D2D ID of UE B 1012, and optionally the connection ID of UE A 1011 which have been previously linked with UE A 1011. In step S1032, these information including the MO establishment cause, D2D ID of UE B 1012, and optionally the connection ID of UE A 1011 are stored by control node B 1002. In step 1033, control node B searches for the corresponding device with the MT establishment cause, the D2D ID of UE B 1012 and/or the connection ID of the UE B 1012. If such device has been found, the network would arrange the D2D communication between UE A 1011 and UE B 1012 after the during handover phase 1022 is complete. In step S1034, control node B 1002 would respond to the handover request from control node A 1001 by transmitting a handover request response to control A 1001. In step S1035, control node A would transmit a handover command to UE A 1011 in order to handover the UE A 1011 to control node B 1002. In step S1035, after the rest of the HO procedure has been completed, the after the handover phase 1023 would commence, and the network would automatically arrange D2D communication between UE A 1011 and UE B 1012 (for a specific connection) assuming that UE B 1012 has been found back in step S1033.

Figure 10C:
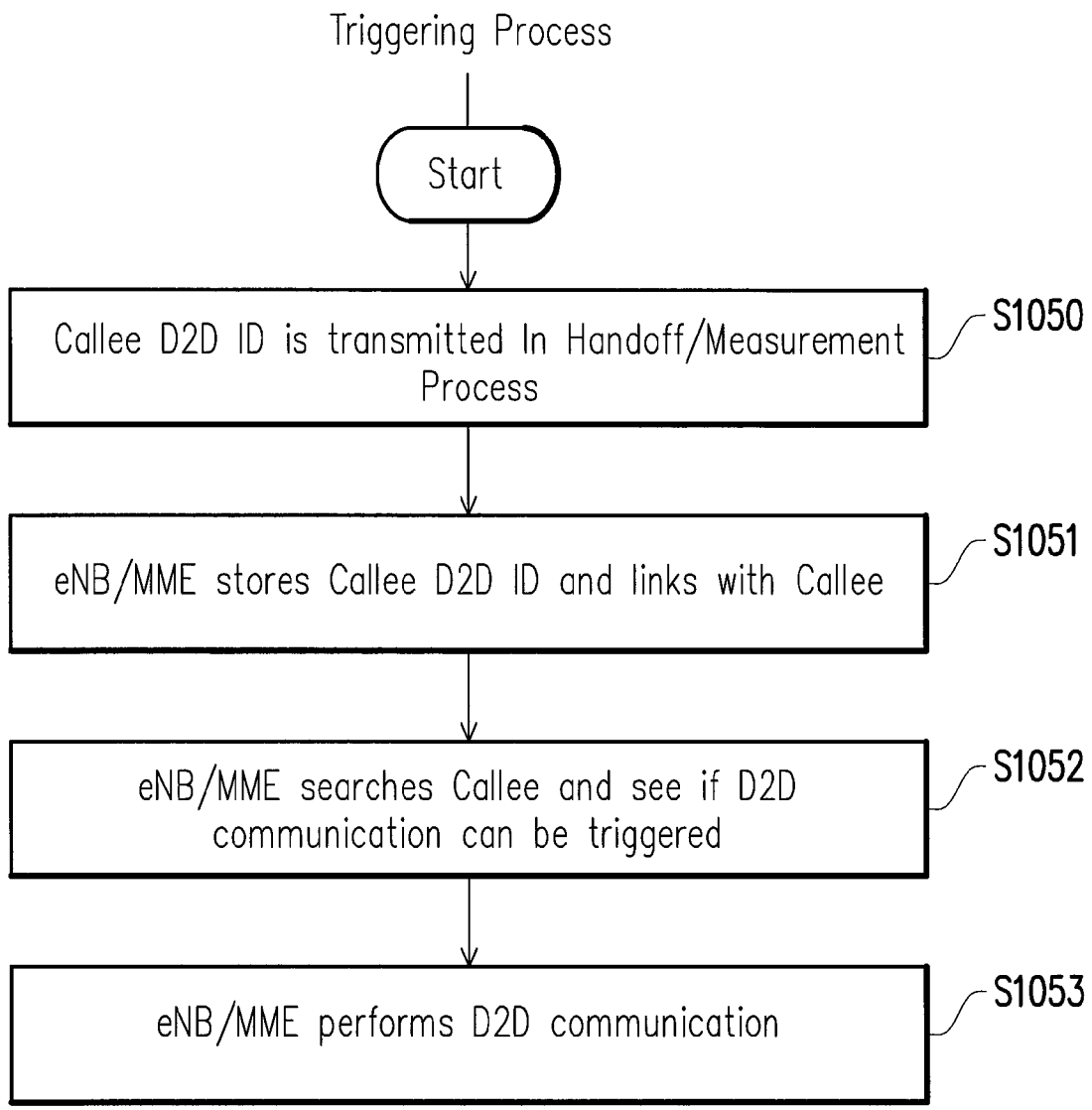
FIG. 10C is a general flow chart illustrating the trigger process for automatic D2D communication in accordance with one of the exemplary embodiments of the present disclosure.

FIG. 10C is flow chart illustrating the automatic D2D communication triggering process in general in accordance with one of the exemplary embodiments of the present disclosure. In step S1050, a callee D2D ID is transmitted from a first control node to a second control node during a measurement phase or a handover phase of an overall communication procedure. In step S1051, the second control node would store the callee D2D ID and links the information with the caller. In step S1052, a control node which could be an access stratum control node or a non access stratum control node searches for the callee and see if D2D communication could be triggered. In step S1053, the control node arranges the D2D communication between the caller and the callee (if appropriate condition(s) is met).

Figure 11A:
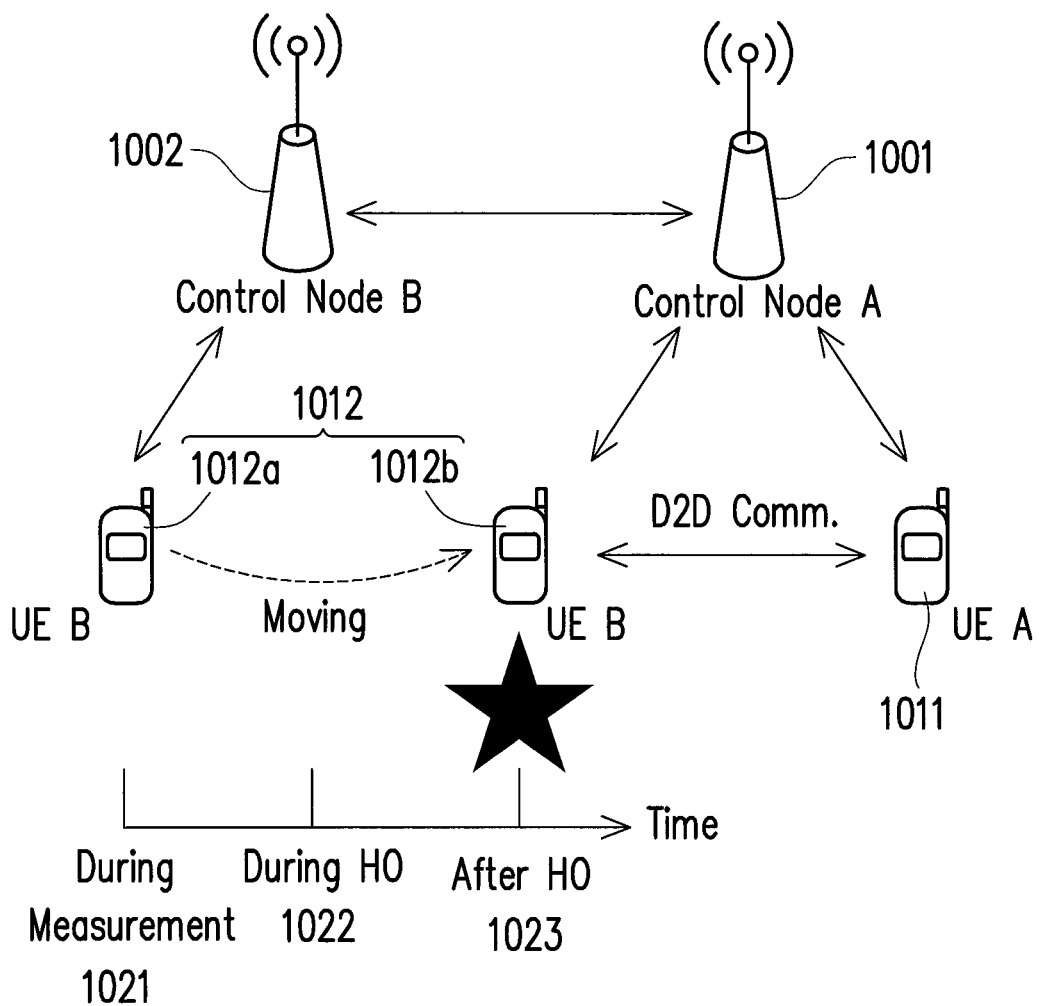
FIG. 11A illustrates automatic D2D communication establishment after MT device handover in accordance with one of the exemplary embodiment of the present disclosure.

FIG. 11A illustrates automatic D2D communication establishment after MT device handover in accordance with one of the exemplary embodiment of the present disclosure. The scenario of FIG. 11A is similar to FIG. 10A except that UE B 1012a or the callee device is the migrating device, and the control node B 1002 hands UE B 1012a to the control A 1001 which would become the serving control node for the migrating UE B 1012b.

Figure 11B:
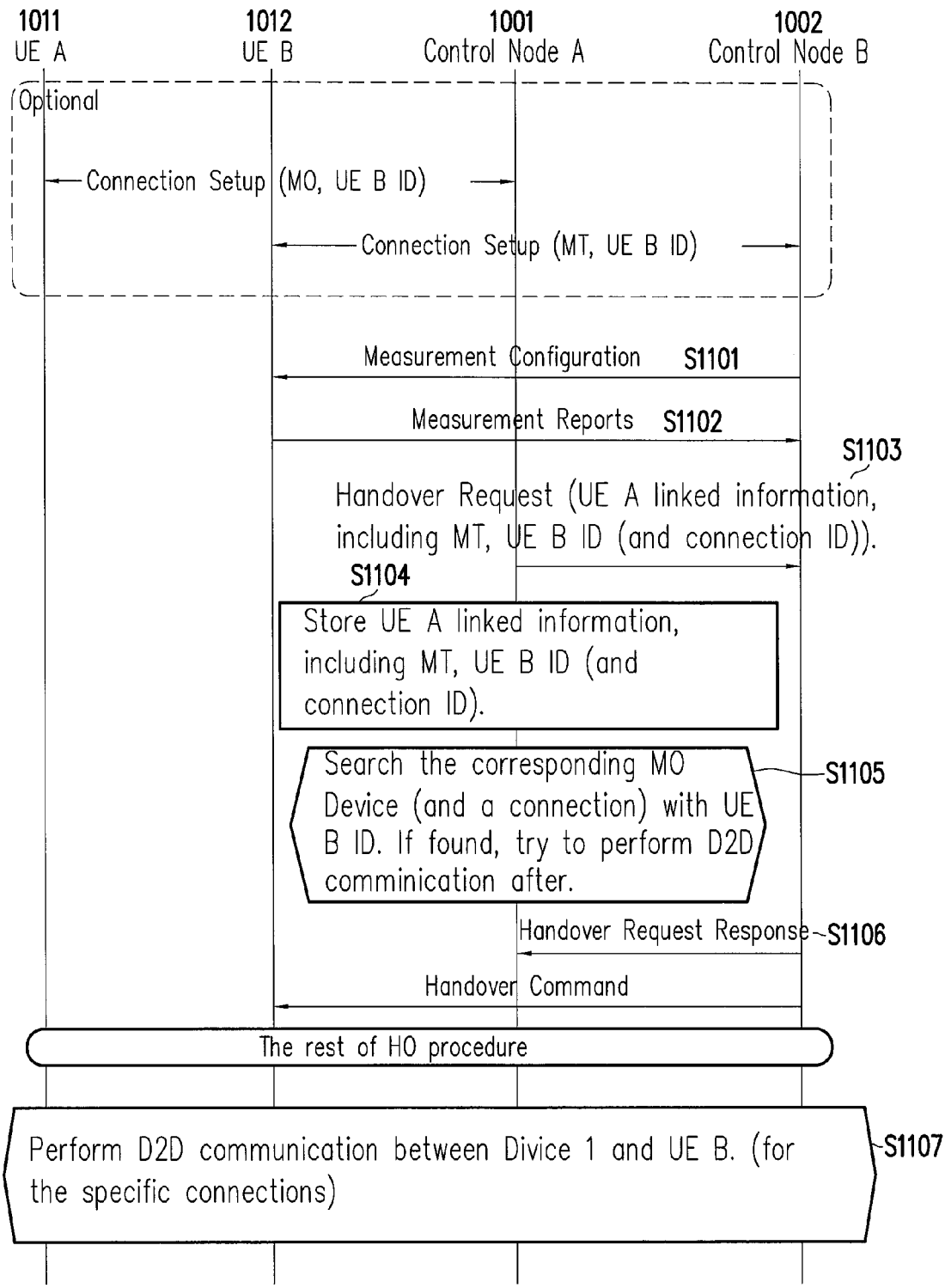
FIG. 11B illustrates automatic D2D communication establishment procedure upon a callee device handover in accordance with one of the exemplary embodiments of the present disclosure.

FIG. 11B illustrates automatic D2D communication establishment procedure upon a callee device handover in accordance with one of the exemplary embodiments of the present disclosure. FIG. 11B is similar to 10B in the same way FIG. 11A is similar to FIG. 10A. After optional specific connection setups are complete, control node B in step S1101 1002 would send a measurement configuration information to the migrating UE B 1012, and the UE B 1012 in step S1102 would respond by transmitting back a measurement report. In step S1103, the control node B 1002 would then send a handover request containing UE B 1012 information which includes the MT establishment cause, the D2D ID of UE B 1012 and optionally a connection ID of UE B 1012 to control node A 1001. Upon receiving these information, control node A 1001 would in step S1104 store the MT establishment cause, the D2D ID of UE B 1012 and optionally a connection ID of UE B 1012 and links these information with UE B 1012. In step S1105, the control node A 1101 would search for a corresponding caller device linked to the establishment cause indicating MO, the D2D ID of the UE B 1012, and the connection ID of the UEB 1012. If such device is found, step S1107 would proceed. Afterwards, in step S1106 control node A would transmit back a handover command to control node B 1002. After the rest of the handover procedures are complete, the network would in step S1107 automatically arrange D2D communication between UE A 1011 and UE B 1012 (for a specific connection).

Even though in both scenarios of FIG. 10A and FIG. 11A that the caller and the callee devices during the after handover phase 1023 are served by the same control nodes, the automatic D2D communication could still be implemented if the caller and the callee devices during the after handover phase are served by different control nodes. In that case, the control nodes may share stored information with each other through direct or indirect communication so that the control nodes would not only search their own stored information but also would search shared information stored in other control nodes.

Figure 11C:
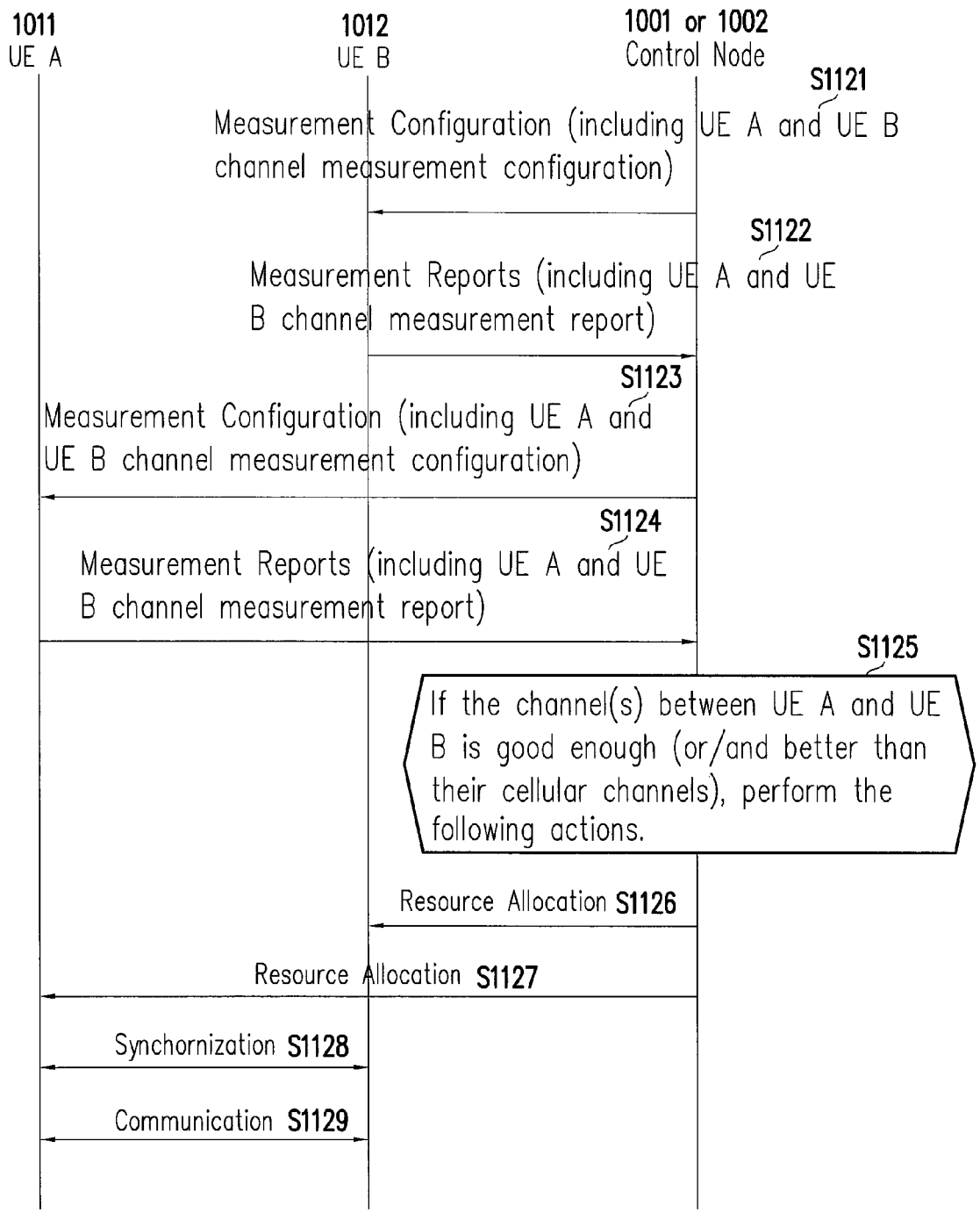
FIG. 11C illustrates a control node arranging automatic D2D communication between two devices in accordance with one of the exemplary embodiments of the present disclosure.

Suppose that steps S1035 of FIG. 10B and S1107 of FIG. 11B are to be executed, a serving control node would execute FIG. 11C to automatically arrange D2D communication between UE A 1011 and UEB 1012 as follows. In step S1121 and S1123, the serving control node 1001 or 1002 would respectively transmit a channel measurement configuration to UE B 1012 and UE A 1011. The measurement configuration may include parameters and instructions to estimate a channel between UE A 1011 and UE B 1012. In steps S1122 and S1124, the serving control node 1001 or 1002 would receive measurement reports may include channel measurement between UE A 1011 and UE B 1012. In step S1125, the serving control node 1001 or 1002 would determine whether channel(s) between UE A 1011 and UE B 1012 is favorable or is better than their cellular channel(s), which is the channel(s) between UE A 1011 and the serving control node 1001 or 1002 and the channel(s) between UE B 1012 and the serving control node 1001 or 1002. If the channel condition is favorable, then steps S1126-S1129 would be executed. Otherwise, D2D communication may not be arranged. In steps S1126 and S1127, the network would allocate D2D radio resources through the serving control node 1001 or 1002 to UE B 1102 and UE A 1101 respectively. In step S1128, UE A 1011 and UE B 1012 perform device synchronization with each other. In step S1129, UE A 1011 and UE B 1012 engage in D2D communication.

Figure 12A:
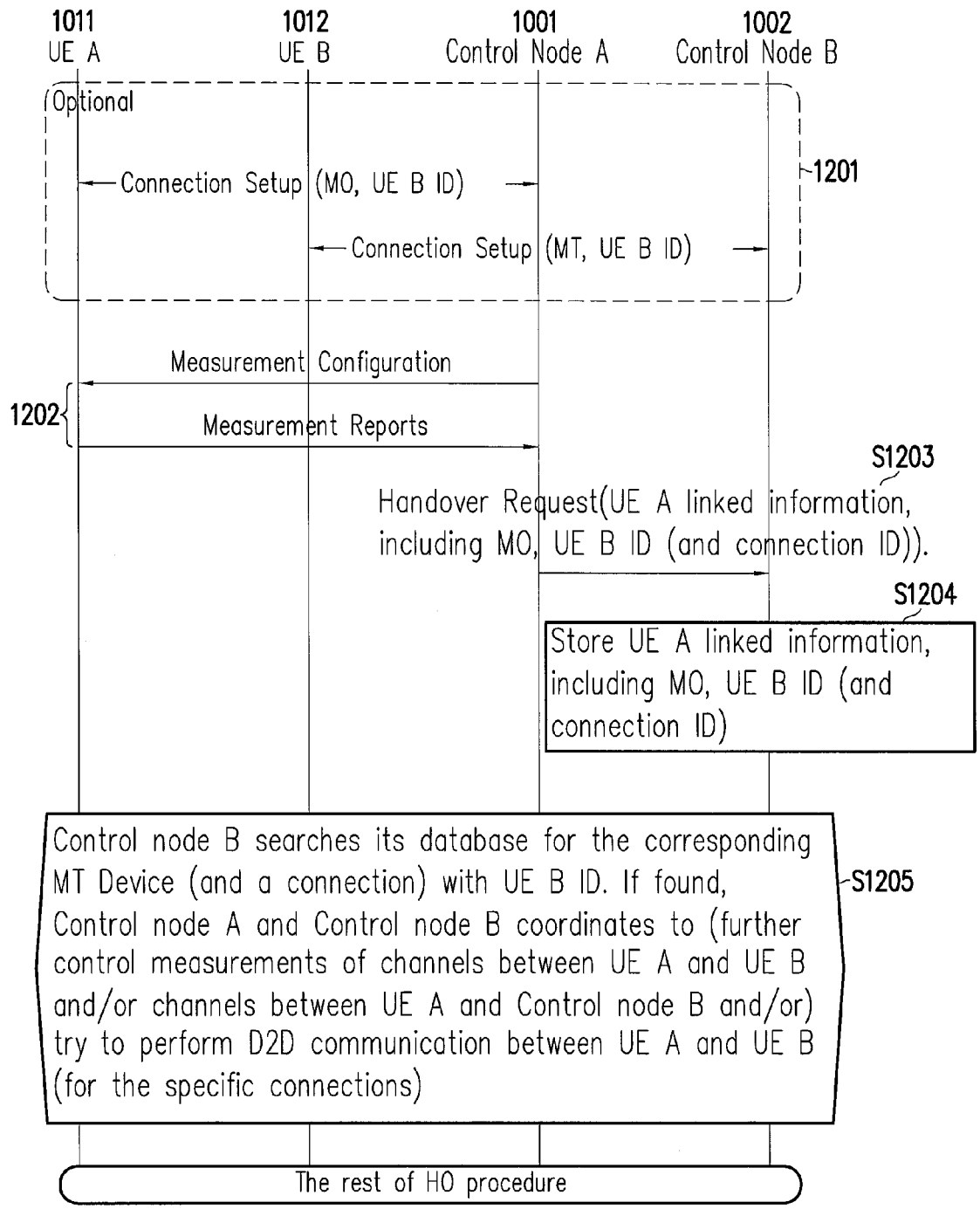
FIG. 12A illustrates automatic D2D communication establishment during a handover phase in accordance with one of the exemplary embodiments of the present disclosure.

According to another variation similar to FIG. 10B and FIG. 11B, instead of arranging for automatic D2D communication establishment during the after handover phase 1023, automatic D2D communication could also be arrange during the handover phase 1022 or during the measurement phase 1021. FIG. 12A illustrates automatic D2D communication establishment during a handover phase in accordance with one of the exemplary embodiments of the present disclosure. Assuming that UE A 1011 is the caller and is to be handed over from control node A 1001 to control node B 1002. After the optional connection setup procedure for a specific connection in step S1201 and after the measurement phase 1021 during which the measurements have been configured and performed in step S1202, in step S1203, control node A 1001 transmits a handover request including a MO establishment cause, the D2D ID of the callee device, and an optional connection ID of the callee device. In step S1204, these information are stored and linked with UE A 1011. In step S1025, control node B searches from its database for the corresponding callee device having the MT establishment cause, the D2D ID of the UE B 1012, and optionally the connection ID of UE B 1012. If such device could be found, then control node A 1001 and control node B 1002 could first optionally coordinate to measure channels between UE A 1011 and UE B 1012 and/or between UE A 1011 and control node B 1002, and then automatically arrange for D2D communication between UE A 1011 and UE B 1012. After step S1205 is completed, the rest of the HO procedure would proceed.

Figure 12B:
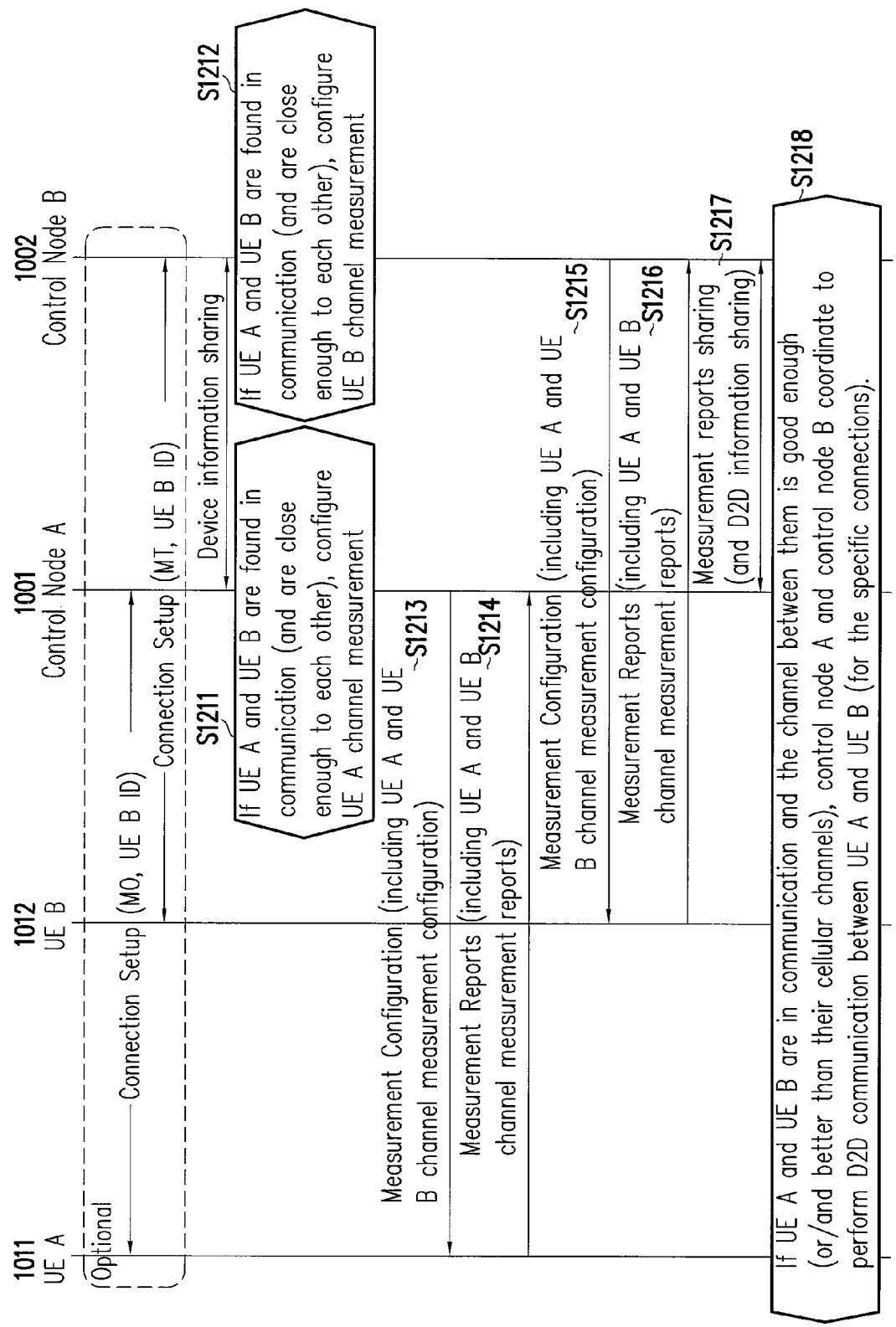
FIG. 12B illustrates automatic D2D communication establishment during a measurement phase in accordance with one of the exemplary embodiments of the present disclosure.

FIG. 12B illustrates automatic D2D communication establishment during a measurement phase in accordance with one of the exemplary embodiments of the present disclosure. It is assumed that control node A 1001 and control node B could share information with each other. After the optional connection setup between control node A 1001 and UE A 1011 is complete and/or the optional connection setup between control node B 1002 and UE B 1012 is complete, if UE A 1011 and UE B 1012 have been determined to be in communication and close to each other by the network, in step S1211 control node A 1001 would configure UE A 1011 for a subsequent channel measurement, and in step S1212 control node B would configure UE B for a subsequent channel measurement. Please note that steps 1211 and s1212 may occur simultaneous or any one of the two steps could occur before the other.

In steps S1213 and 1215, control node A 1001 and control node B 1002 would respectively transmit a measurement configuration to UE A 1011 including the configuration to measure channel(s) between UE A 1011 and UE B 1012 and a measurement configuration to UE B 1012 including the configuration to measure channel(s) between UE A 1011 and UE B 1012. In steps S1214 and S1216, UE A 1011 and UE B 1012 would respectively transmit the channel(s) measurement report to control node A 1001 and control node B 1002. It should be noted that the steps S1215~S1216 could precede steps S1213~S1214. In step S1217, control node A 1001 and control node B 1002 could share measurement result received from steps S1214 and S1216. In step S1218, if UE A 1011 and UE B 1012 could be found to be in communication with each other and the channel(s) between them are good enough or are better than their cellular channels, then control node A 1001 and control node B 1002 would coordinate D2D communication between UE A 1011 and UE B 1012 (for a specific connection type) separately or cooperatively without waiting for the during handover phase 1022 to begin. If control node A 1001 or control node B arranges the D2D communication separately, the procedure of FIG. 11C would be used to arrange for the automatic D2D communication.

Figure 12C:
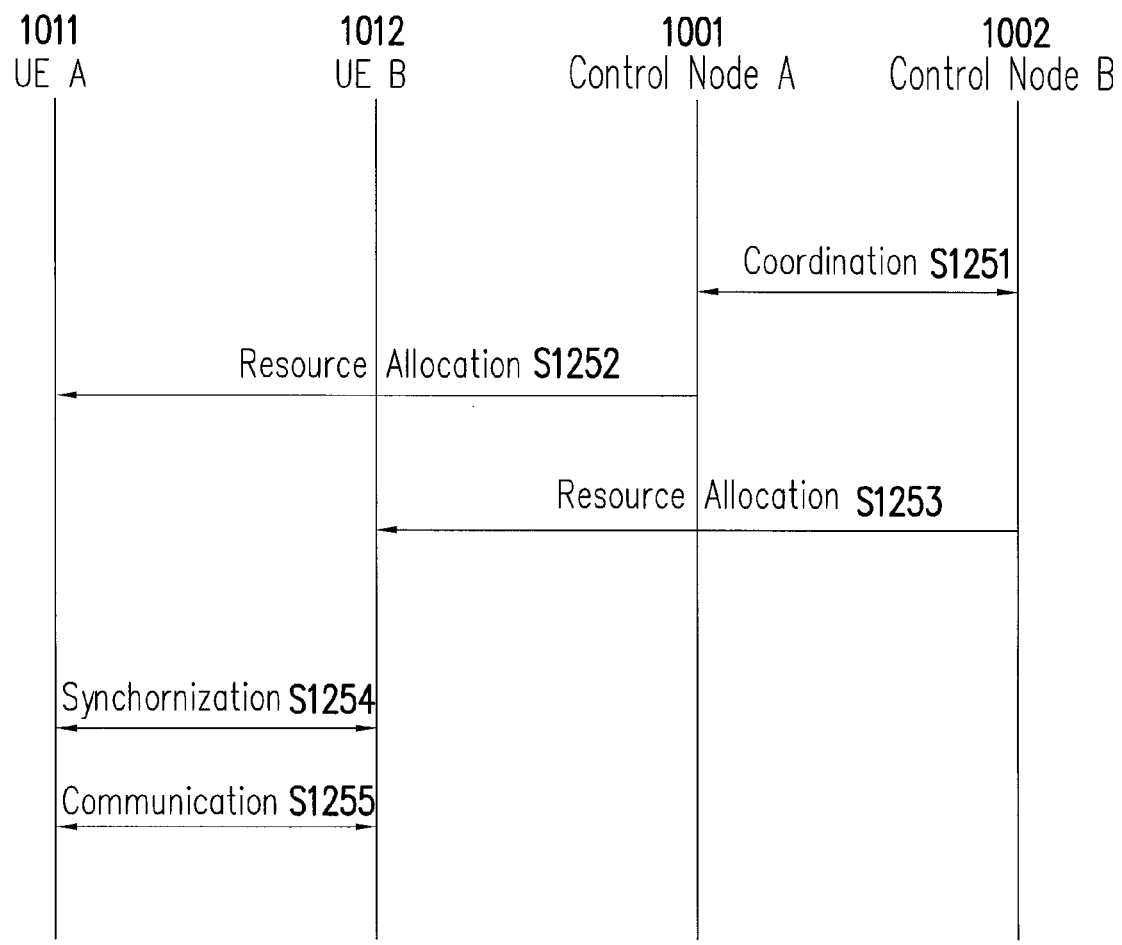
FIG. 12C illustrates control nodes coordination in accordance with one of the exemplary embodiments of the present disclosure.

If however, control node A 1001 and Control Node B 1002 arranges the D2D communication cooperatively, the procedure of FIG. 12C could be used to realize automatic D2D communication. In step S1251, control node A 1001 and control node B 1002 coordinate with each other to determine resource allocation, parameters negotiation, etc. In step S1252, control node A 1001 would transmit resource allocation to UE A 1011, and similarly in step S1253, control node B 1002 would also transmit resource allocation to UE B 1012. In step S1254, UE A 1011 and UE B 1012 would perform device synchronization. In step S1255, UE A 1011 and UE B 1012 would engage in D2D communication. It should be noted that device synchronization between UE A 1011 and UE B 1012 could be performed before steps S1251~S1253.

Besides triggering automatic D2D communication during different occasions, device information search and mapping for automatic D2D communication establishment may be triggered by a message from different nodes. FIGS. 13A~13F propose device information search for automatic D2D communication establishment triggered by messages from a device, a control node, or a NAS control node.

Figure 13A:
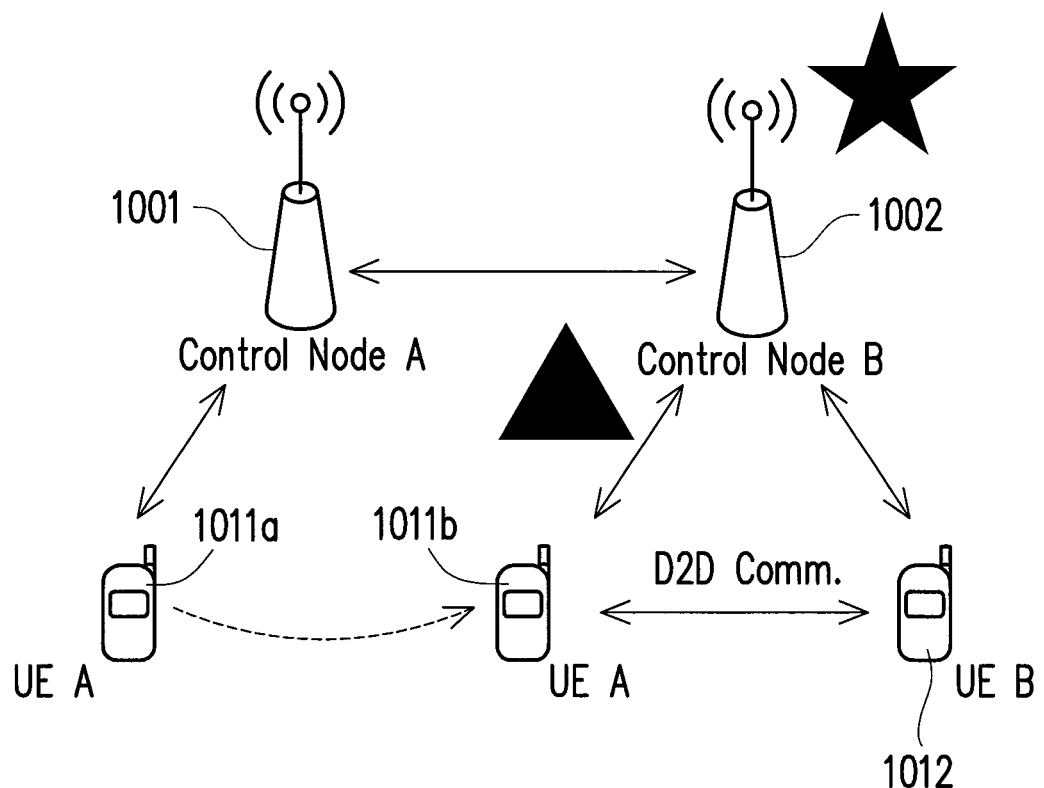
FIG. 13A & FIG. 13B illustrate triggering automatic D2D communication by a device message.
Figure 13B:
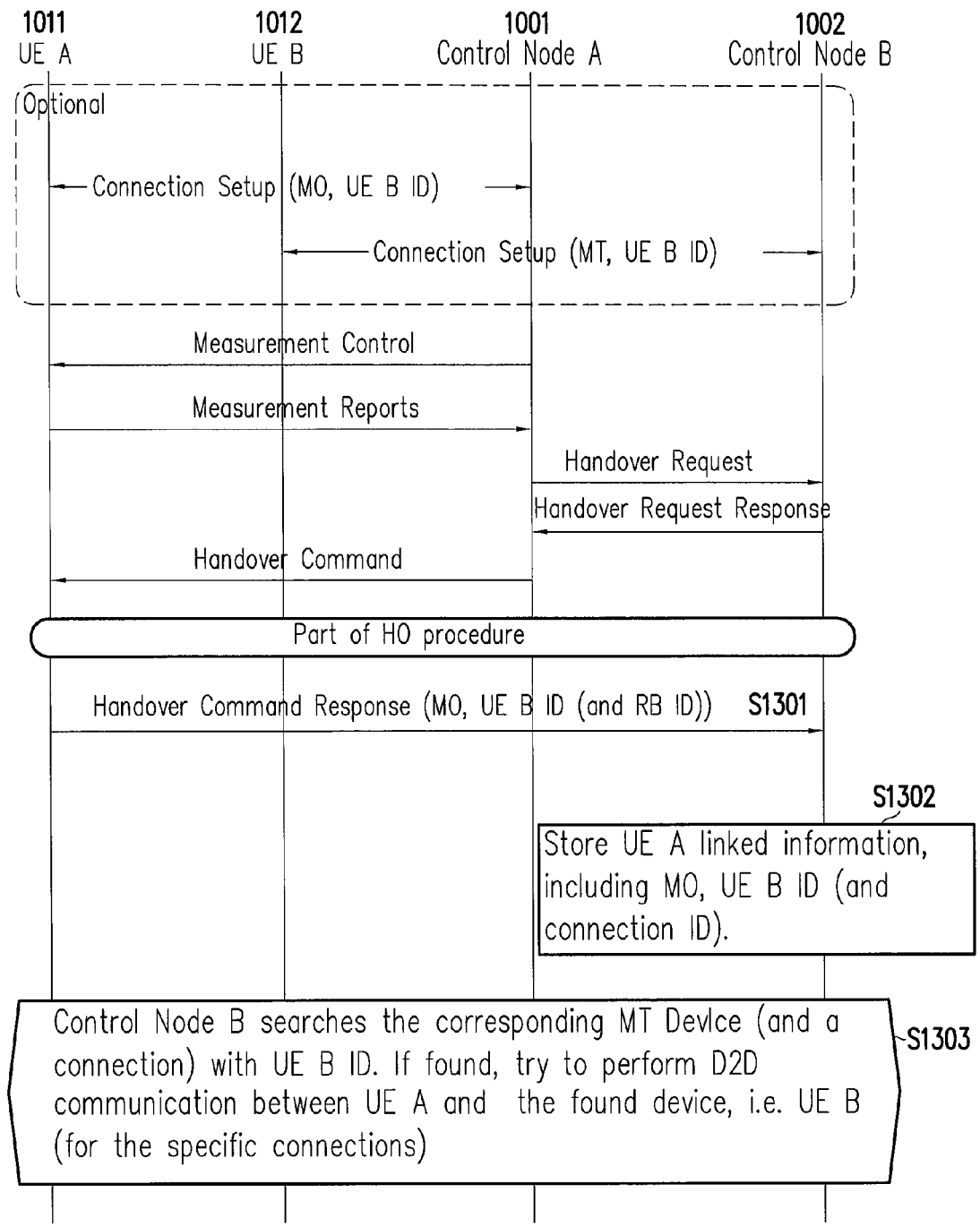

FIG. 13A & FIG. 13B illustrate triggering automatic D2D communication by a device message. In the network scenario of FIG. 13A, UE A 1011*a* is to be handed over from control node A 1001 to control node B 1002. When UE A 1011*b* is handed over to control node B 1002, control node B arranges for automatic D2D communication between UE A 1011*b* and UE B 1012. Please note that 1011*a* and 1011*b* refers to two different states of the same UE 1011, and UE A 1011*a* becomes 1011*b* after being handed over. The same notation would also apply for all the embodiments. The triangle of FIG. 13A between the path of UE A 1011*b* and control node B 1002 signifies that UE A 1011*b* would transmit specific information during one of the stages of the handover process which would result in the potential D2D communication trigger. The star of FIG. 13A signifies that control node B 1002 would initiate the arrangement for D2D communication to occur after certain information has been received from UE A 1011*b*.

FIG. 13B further illustrates the device triggering event by UE A 1011 for the network scenario of FIG. 13A. In step S1301, UE A 1011 sends a handover command response which includes the MO establishment cause, the D2D ID of UE B 1012, and optionally the connection ID to control node B 1002. Control node B 1002 then in step S1302 stores these information and links them with UE A 1011. In step S1303, by receiving the information related to the MO establishment cause, the D2D ID of UE B 1012, and optionally the connection ID, the event of step S1301 triggers a search for the corresponding device with the MT establishment cause, the D2D ID of the UE B 1012, and optionally a connection with UE B 1012. When such device is found, automatic D2D communication would be arranged between UE A 1011 and UE B 1012 (for a specific connection type). For this exemplary embodiment, the specific information which would result in the potential D2D communication trigger is the information transmitted during step S1301 including the MO establishment cause, the D2D ID of UE B 1012, and optionally the RB ID. Upon receiving these specific information, control node B 1002 would initiate the process to perform D2D communication.

Figure 13C:
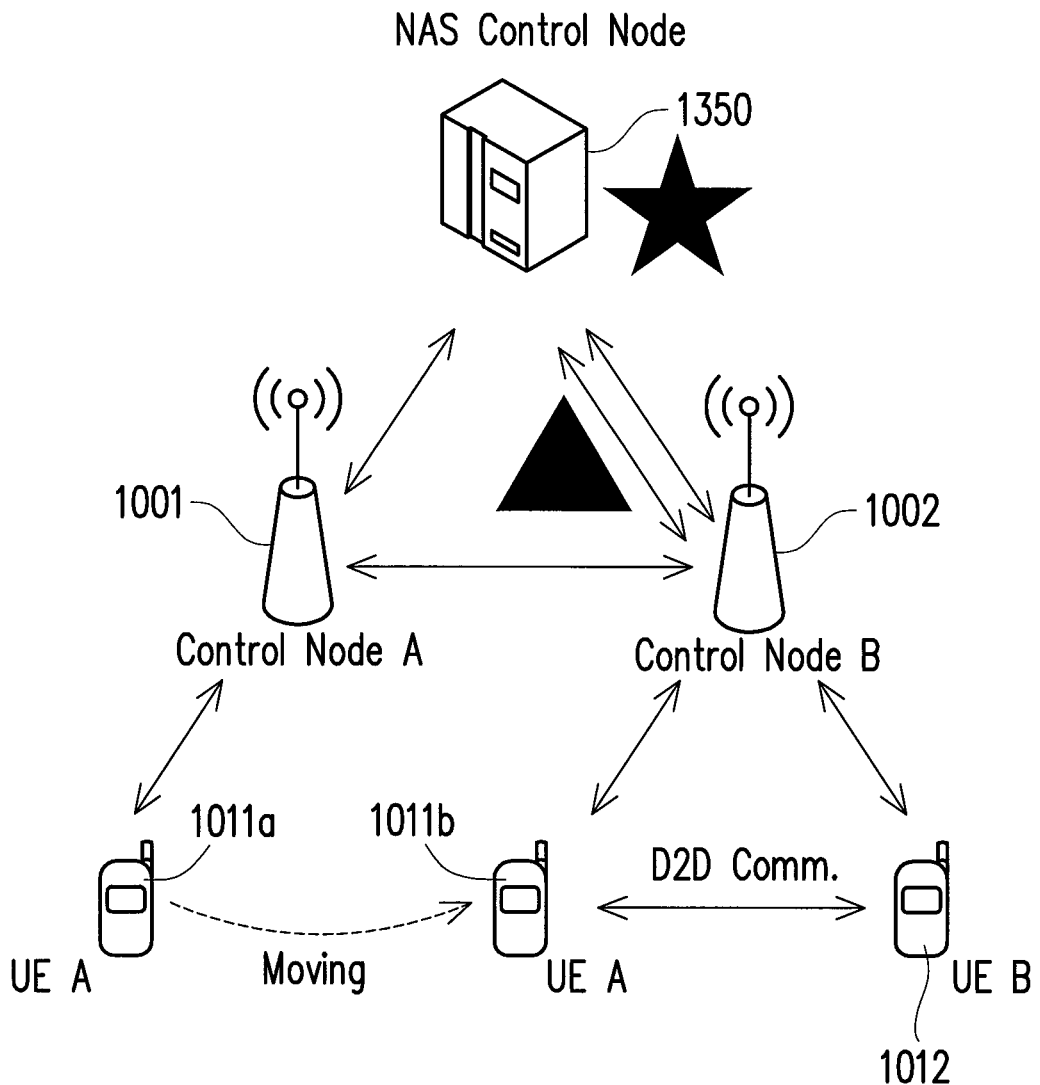
FIG. 13C & FIG. 13D illustrate triggering automatic D2D communication by a control node message.
Figure 13D:
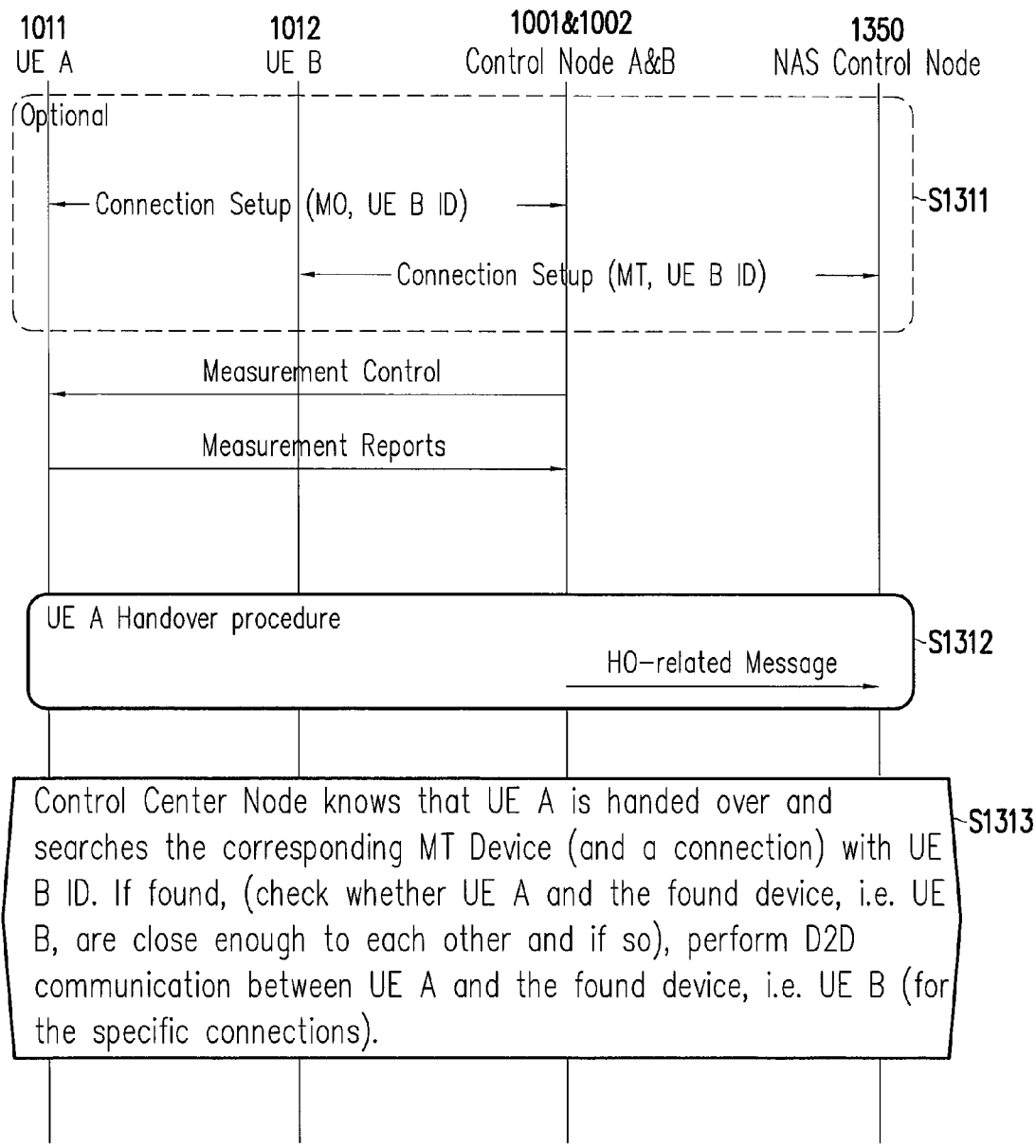

FIG. 13C & FIG. 13D illustrate triggering automatic D2D communication by a control node message. The network scenario of FIG. 13C is similar to FIG. 13A except that control node A 1001 and control B 1002 are connected to a NAS control node 1350 which could be a MME for example. In response to UE A 1011*b* transmitting specific information to control node B 1002, the control node B would store these information and initiates D2D communication to be arranged based on a certain condition(s). For instance, the conditions could be simply finding out that UE A 1011 and UE B 1012 are in the mobile phone same conversation, and the conditions may include UE A 1011 and UE B 1012 in the radio range of each other, the D2D channel condition is superior to conventional cellular channel, offload concerns of the network, and so forth.

FIG. 13D illustrates the D2D triggering event by a control node message for the network scenario of FIG. 13A. In step S1311, UE A 1011 and UE B 1012 establish connection setup with control node A 1001, control node B 1002, and the NAS control node 1350. In step S1312, UE A 1011*a* is handed over from control node A 1001 to control node B 1002. In step S1313, when control node A 1001 hands over UE A 1011 to control node B 1002, control node A sends UE A 1011 linked information, such as the MO establishment cause, D2D ID of UE B 1012 (and connection ID) to NAS control node 1350 and therefore trigger device search and mapping in NAS control node 1350 for automatic D2D communication establishment. If such device could be found, the NAS control node 1350 may check further whether UE A 1011 and the found device which is UE B 1012, would be close enough to each other. Assuming so, D2D communication would be automatically arranged between UE A 1011*b* and UE B 1012 (for the specific connections). Therefore, the transmitting of specific information in step S1301 would cause the control node B to store these information and performing searches for the corresponding MT device. When such device is found, the finding of such device could be one of the conditions to trigger the control node B to initiate for the D2D communication to be arranged.

Figure 13E:
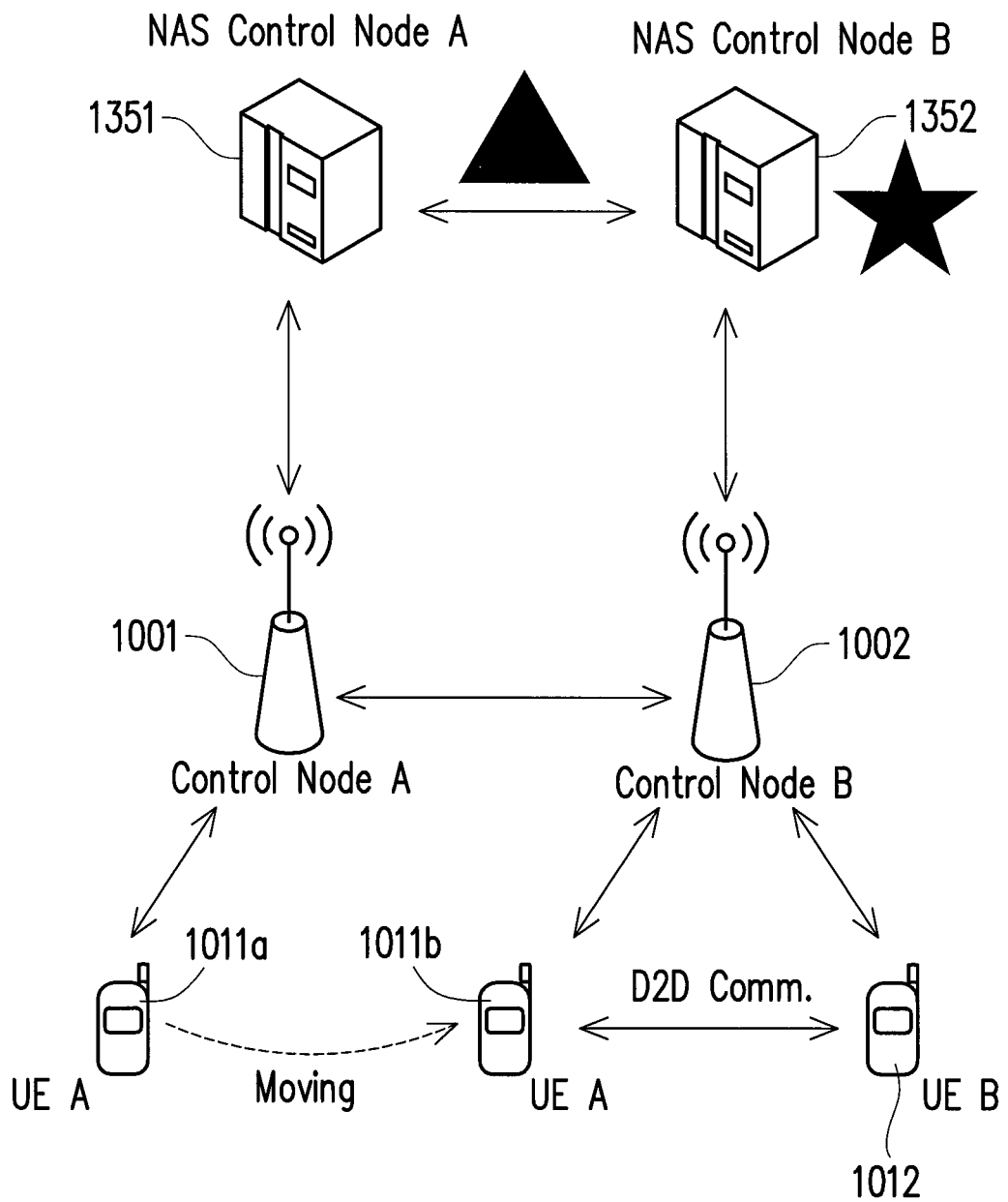
FIG. 13E & FIG. 13F illustrate triggering automatic D2D communication by a NAS control node message.
Figure 13F:
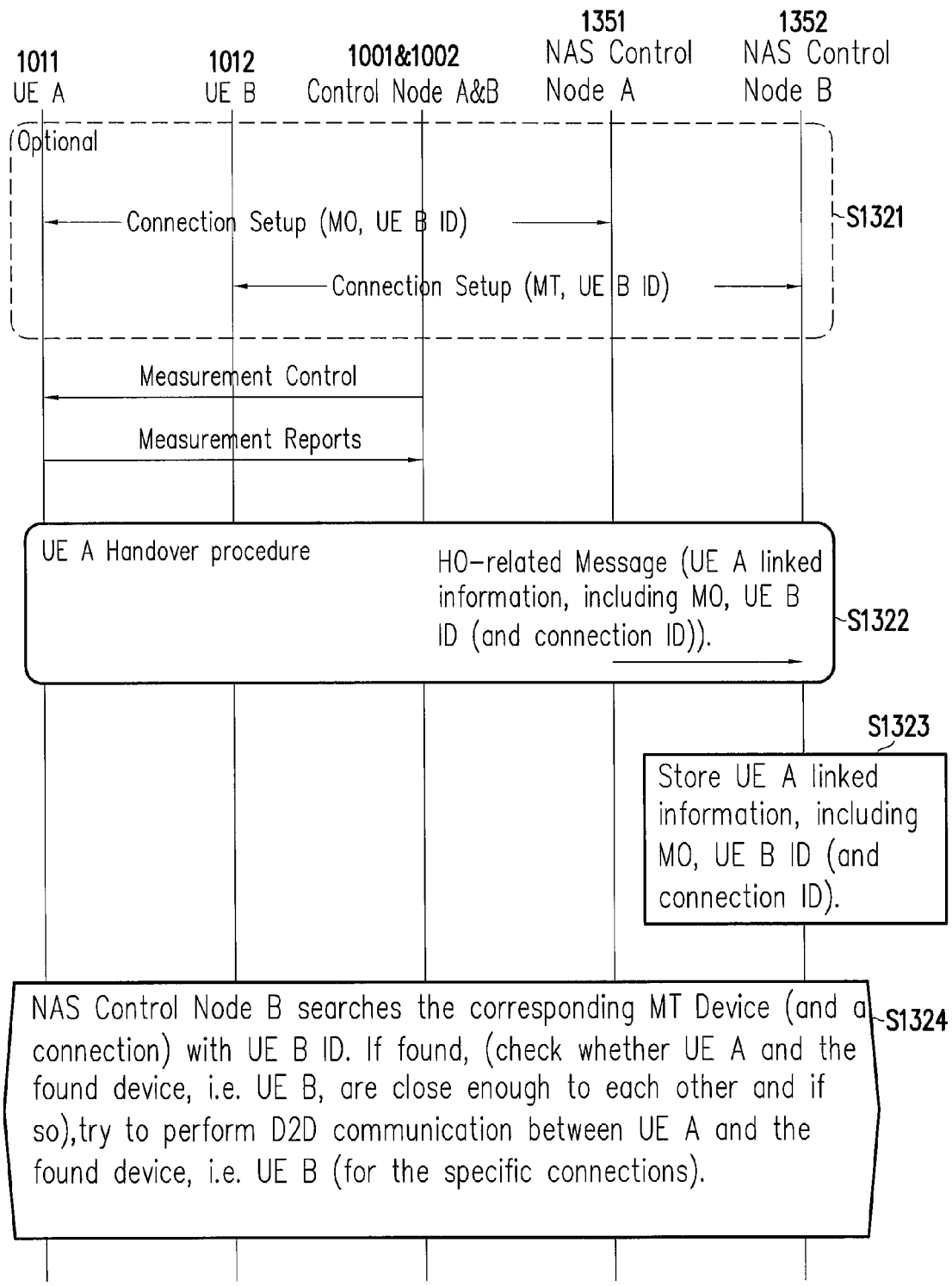

FIG. 13E & FIG. 13F illustrate triggering automatic D2D communication by a NAS control node message. The network scenario of FIG. 13E is similar to FIG. 13C except that control node A 1001 is connected to NAS control node A 1351, and control B 1002 is connected to a NAS control node B 1352. When NAS control node A 1351 such as MME A (not shown) transmits specific information, it would potentially trigger an automatic D2D communication to be initiated by NAS Control Node B 1352.

FIG. 13F illustrates the D2D triggering event by a NAS control node message for the network scenario of FIG. 13E. In step S 1321, UE A 1011 establishes connection setup with control node A 1001 and NAS control node A 1351, and UE B establishes connection setup with control node B 1002 and NAS control node B 1352. In step S1322, during the during handover phase 1022 when control nodes perform handover for UE A 1011, NAS control node A 1351 would send information linked with UE A 1011*a*, such as the MO establishment cause and the D2D ID of UE B 1012 (and optionally connection ID) to NAS control node B 1352 and therefore trigger device search and mapping in NAS control node B 1352 required for the subsequent automatic D2D communication establishment in step S1324. In step S1323, the information linked with UE A 1011*a* would be stored by NAS control node B 1352. In step S1324, if the corresponding device which would have been in communication with UE A 1011*b* is found, then the NAS control center node B 1352 would further determine whether UE A 1011*b* and the found device UE B 1012 would be close enough to each other. If UE A 1011*b* and UE B 1012 would be close enough to each other, automatic D2D communication between UE A 1011*b* and UE B 1012 would be arranged (for the specific connections).

Figure 14A:
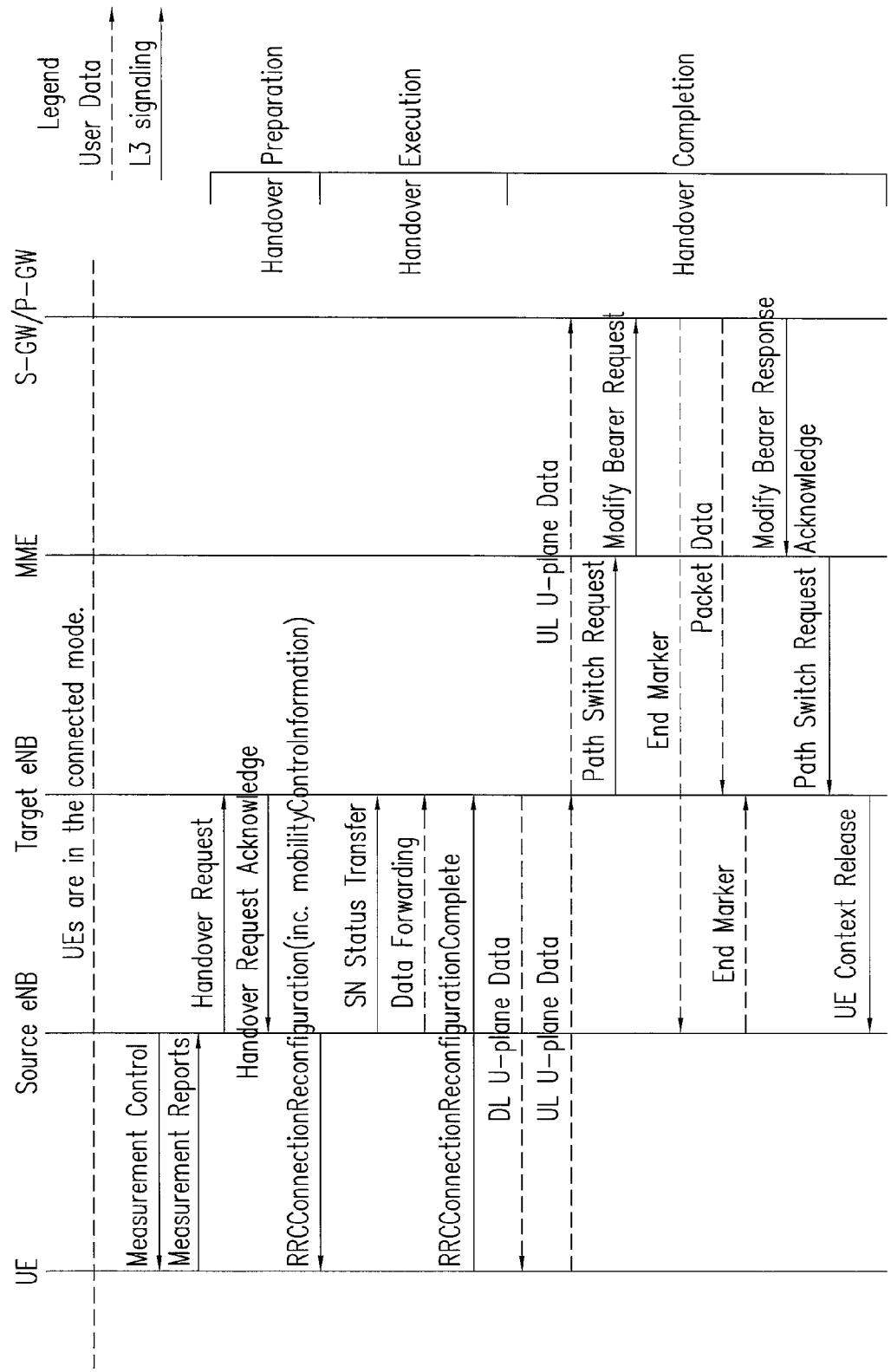
FIG. 14A illustrates a related art showing a current X2 handover protocol involving a source eNB handing over a UE to a target eNB.

The aforementioned disclosure involving device mobility could be embodied in the current LTE/LTE A system in various ways. One such embodiment could be to implement automatic D2D communication establishment by eNB upon X2-based handover of a MO UE. FIG. 14A illustrates a X2 handover protocol involving a source eNB handing over a UE to a target eNB across the X2 interface, and the protocol is currently known in the art. Please note that the current disclosure is built upon the existing X2-based handover protocol such as a complete overhaul is not needed in order to accommodate D2D communication in the current system.

Figure 14B:
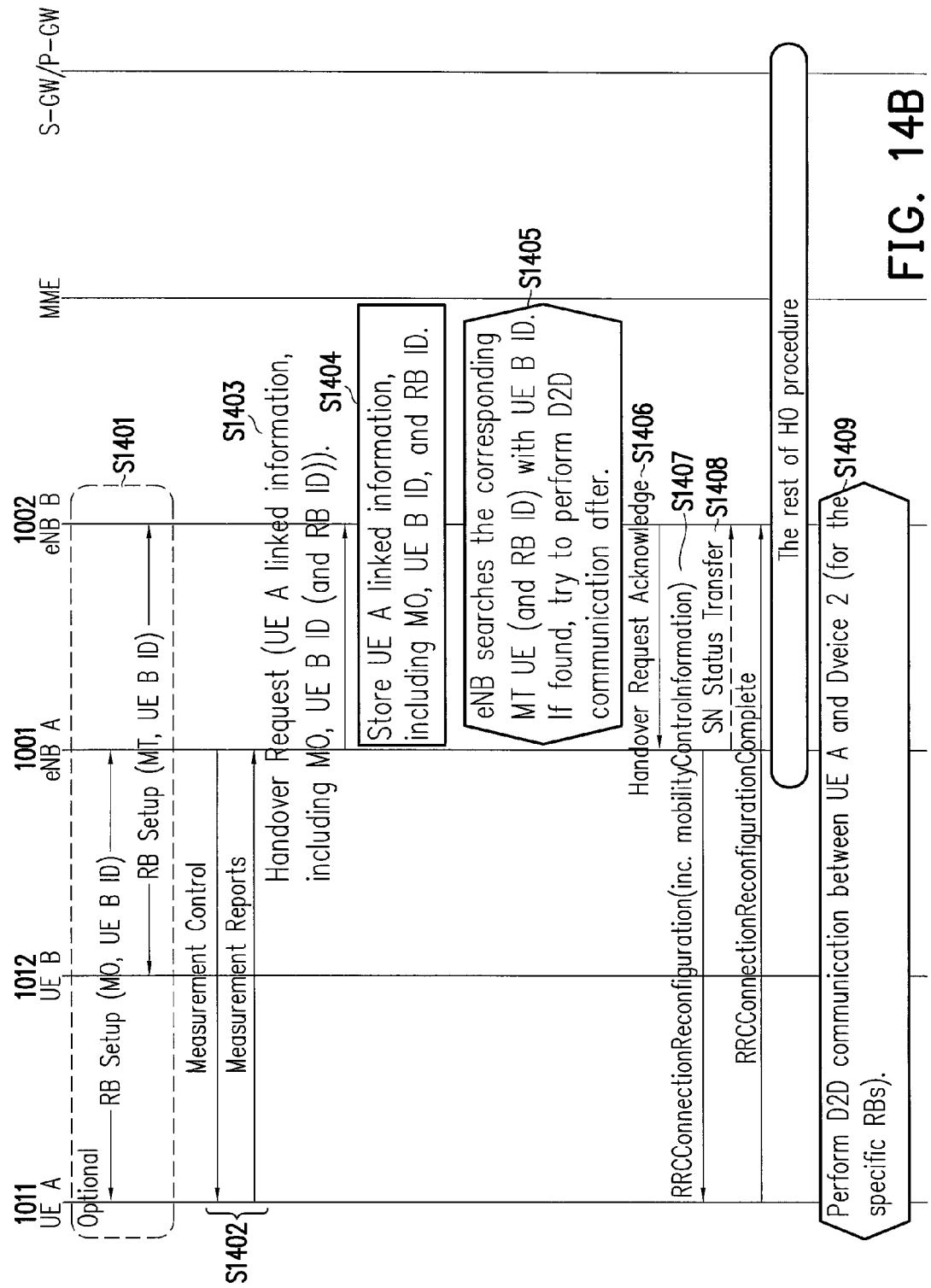
FIG. 14B illustrates an eNB controlled automatic D2D trigger after a handover across the X2 interface in accordance with one of the exemplary embodiments of the present disclosure.

FIG. 14B illustrates an eNB controlled automatic D2D trigger after a handover across the X2 interface. In the scenario of FIG. 14B, it is assumed that UE A 1011 is served by eNB 1012, UE B 1012 is served by eNB B 1002 and UE A 1011, and UEA 1011 is to be handed over from eNB A 1001 to eNB B 1002 because of device mobility. In step S1401, as UE A 1011 intends to communicate with UE B 1012, UE A 1011 may first complete a radio bearer setup procedure during which UE A 1011 transmits a MO establishment cause and the D2D ID of UE B 1012 to eNB A 1001 either through an independent message or embedded in a message for another purpose. Upon receiving the message, the eNB A 1001 stores the MO establishment cause, the D2D ID of UE B 1012, and/or the established radio bearer ID of UE A 1011 and links these information with UE A 1011. Similarly, also in step S1401, the UE B 1012 may also complete a radio bearer setup procedure during which UE B 1012 transmits a MT establishment cause and the D2D ID of UE B 1012 to eNB B 1002 either through an independent message or embedded in a message for another purpose. Upon receiving the message, the eNB A 1001 stores the MT establishment cause, the D2D ID of UE B 1012, and/or the established radio bearer ID of UE B 1012 and links these information with UE B 1012. In step S1402, eNB A 1001 transmits the channel measure parameters to UE A 1011, and UE A 1011 responds with the channel measurement report for the channel between UE A 1011 and eNB B 1002.

Assuming that the channel measurement report is favorable or that a handover has been decided for another reason, the eNB A 1001 then hands over UE A 1011 to eNB B 1002 across the X2-based interface which includes procedures similar to FIG. 14A. In step S1403, the eNB A 1001 sends the stored UE A information to eNB B 1002 either through an independent message or by embedded the stored information in a message intended for another purpose, such as the handover request message. The stored information sent from eNB A 1001 to eNB B 1002 may include the MO establishment cause, the D2D ID of UE B 1012, and the radio bearer ID of UE A 1011. Upon receiving the stored information of UE A 1011, eNB B 1002 searches from its own stored information or under its own domain to find whether there exists another device (with a radio bearer) whose establishment cause indicates that it is a callee (e.g. MT) and the corresponding ID (the callee ID) is the D2D ID of UE B 1012. Assuming that eNB B 1002 is able to find such a device which in this case is UE B 1012, the eNB 1002 would subsequently then try to arrange D2D communication for the corresponding established radio bearers of UE A and UE B in step S1409 after the handover procedures have been complete. But before the handover procedures could be completed, in step S1407, eNB A 1001 transmits a RRC connection reconfiguration message, and in step S1408, UE A 1011 responds with the RRC connection reconfiguration complete message. Afterwards, the rest of the HO procedures similar to FIG. 14A would be executed, and then the D2D communications between UE A 1011 and UE B 1012 would be arranged by the network in step S1409.

Even though the embodiment of FIG. 14B is an implementation of automatic D2D communication establishment by an eNB upon a X2-based handover of a caller or MO UE, a similar procedure could also be applied for a scenario similar to FIG. 11A which involves a callee or MT UE handover. Since the exact procedure could be readily apparent based on the combination of FIGS. 11A and 14B for a person skilled in the art, the details would not be described further. Furthermore, according to one exemplary embodiment, the D2D ID of UE A 1011 may also be carried during connection establishment of step S1401 so that eNB B 1002 may have more information to perform a UE search and to determine whether D2D could be arranged after the handover procedures are complete.

Figure 15:
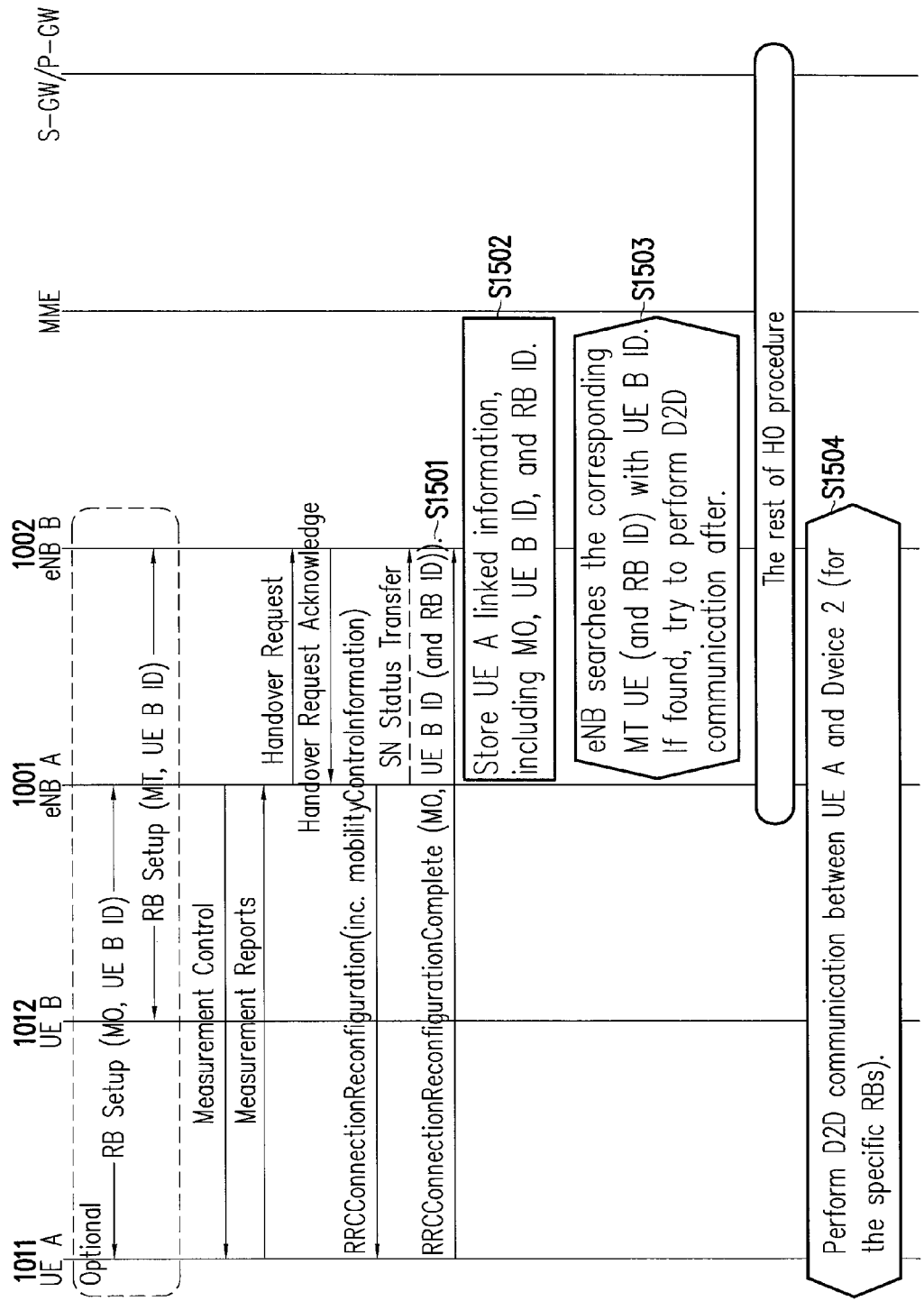
FIG. 15 illustrates an eNB controlled automatic D2D trigger after a handover across the X2 interface in accordance with another exemplary embodiment of the present disclosure.

FIG. 15 illustrates another exemplary embodiment of an eNB controlled automatic D2D trigger after a handover across the X2 interface. In this case, the information sent from one control node to another control node could be delivered over another message such as RRCConnectionReconfigurationComplete. Assuming that the circumstance of FIG. 15 is similar FIG. 14B, in step S1501, UE A 1011 transmits the caller indicator (e.g. MO establishment cause), the D2D ID of UE B 1012, and the radio bearer ID of UE A 1011 to eNB B 1002 over the RRCConnectionReconfigurationComplete message. In step S1502, eNB B 1002 upon receiving these information stores them and link them with UE A 1011. In step S1503, the eNB B 1002 searches from its own database or under its own domain for a responding callee device which would possess a MT establishment cause, a D2D ID of the UE B 1012, and optionally the radio bearer ID of UE B 1012. After the rest of the handover procedure is completed, in step S1504, assuming that such device has been found, the network would automatically arrange D2D communication between UE A 1011 and UE B 1012 (for specific radio bearers).

Figure 16A:
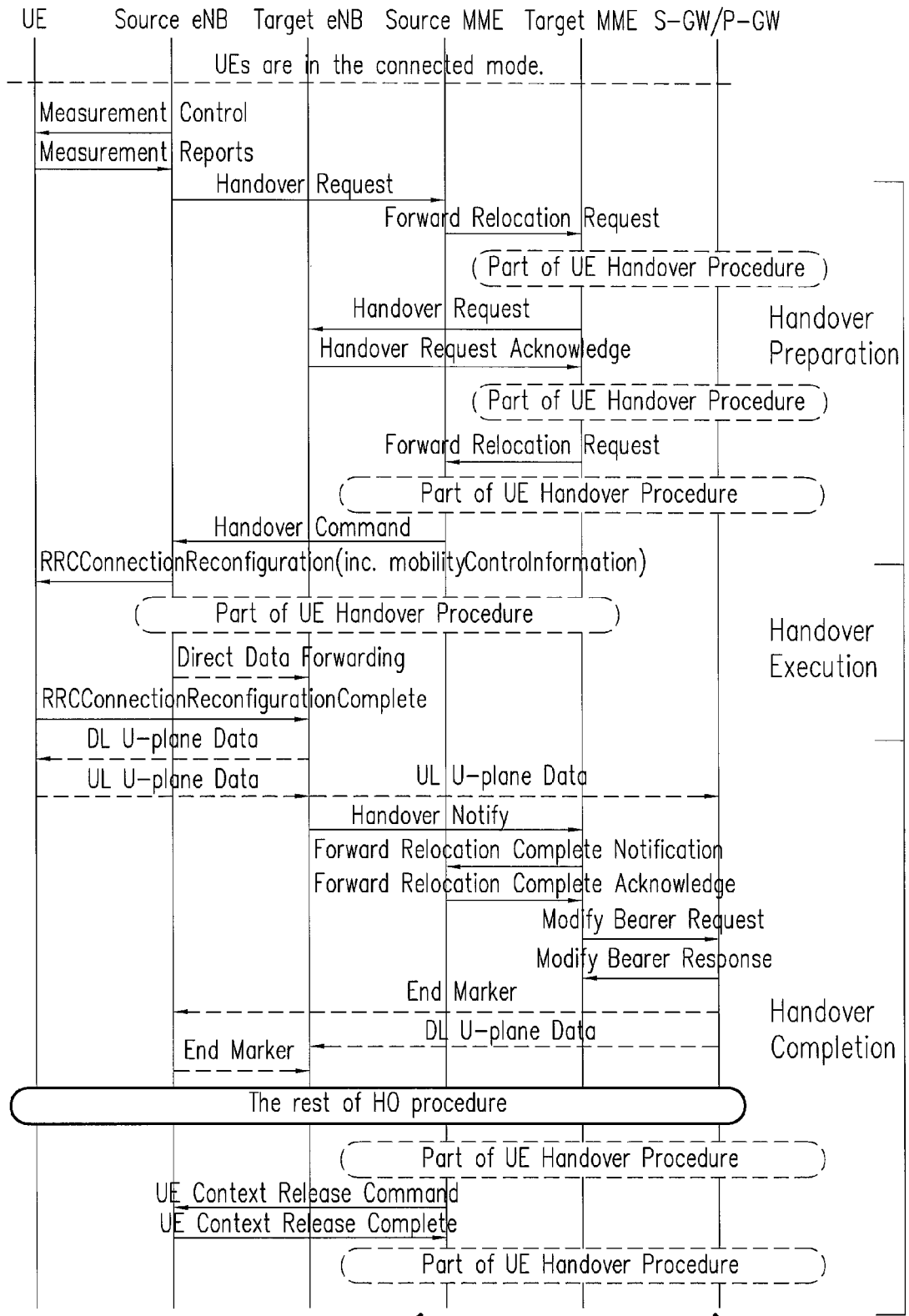
FIG. 16A illustrates a related art showing a current S1 handover protocol involving a source eNB handing over a UE to a target eNB.

As for the circumstance involving handling over in the level of NAS, a handover procedure across the S1 interface could be implemented. FIG. 16A illustrates a current handover scheme across the S1 interface. Similar to the X2 interface which could be used to handover one device from one access stratum (AS) level control node to another AS level control node such as a base station, S1 interface could be used to handover the network attachment of a device from one NAS control node to another NAS control node (e.g. MME). By modifying the current S1 based handover scheme, the existing infrastructures could be utilized to accommodate D2D communication such that a complete overhaul would not be required.

Figure 16B:
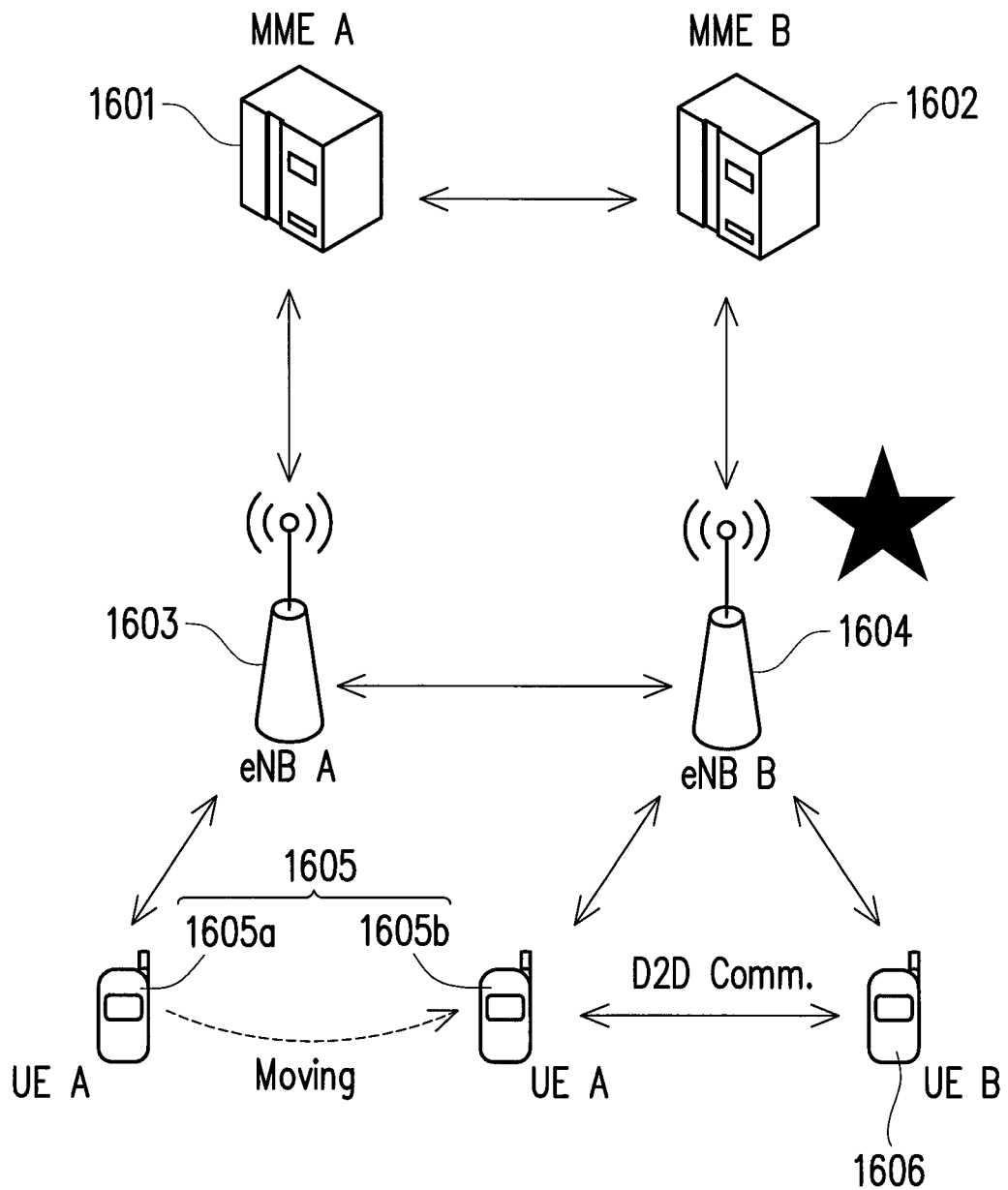
FIG. 16B illustrates an exemplary scenario of a S1 interface handover involving a mobile caller UE.

FIG. 16B illustrates an exemplary scenario of a S1 interface handover involving a mobile caller UE. It is assumed that UE A 1605 (1605*a*, 1605*b*) is a caller UE and is initially served by eNB A 1063. After UE A 1605*a* is handed over to eNB B 1604, UE A 1605*b* would be served by eNB B 1604. However, assuming that the eNB A 1063 and eNB B 1604 are served under different domains in the NAS level as eNB A 1603 is served by MME A 1601 and eNB B 1604 is served by MME B 1602, the mobile caller UE which is UE A 1605 would be handed over across S1 interface from MME A 1601 to MME B 1602.

Figure 16C:
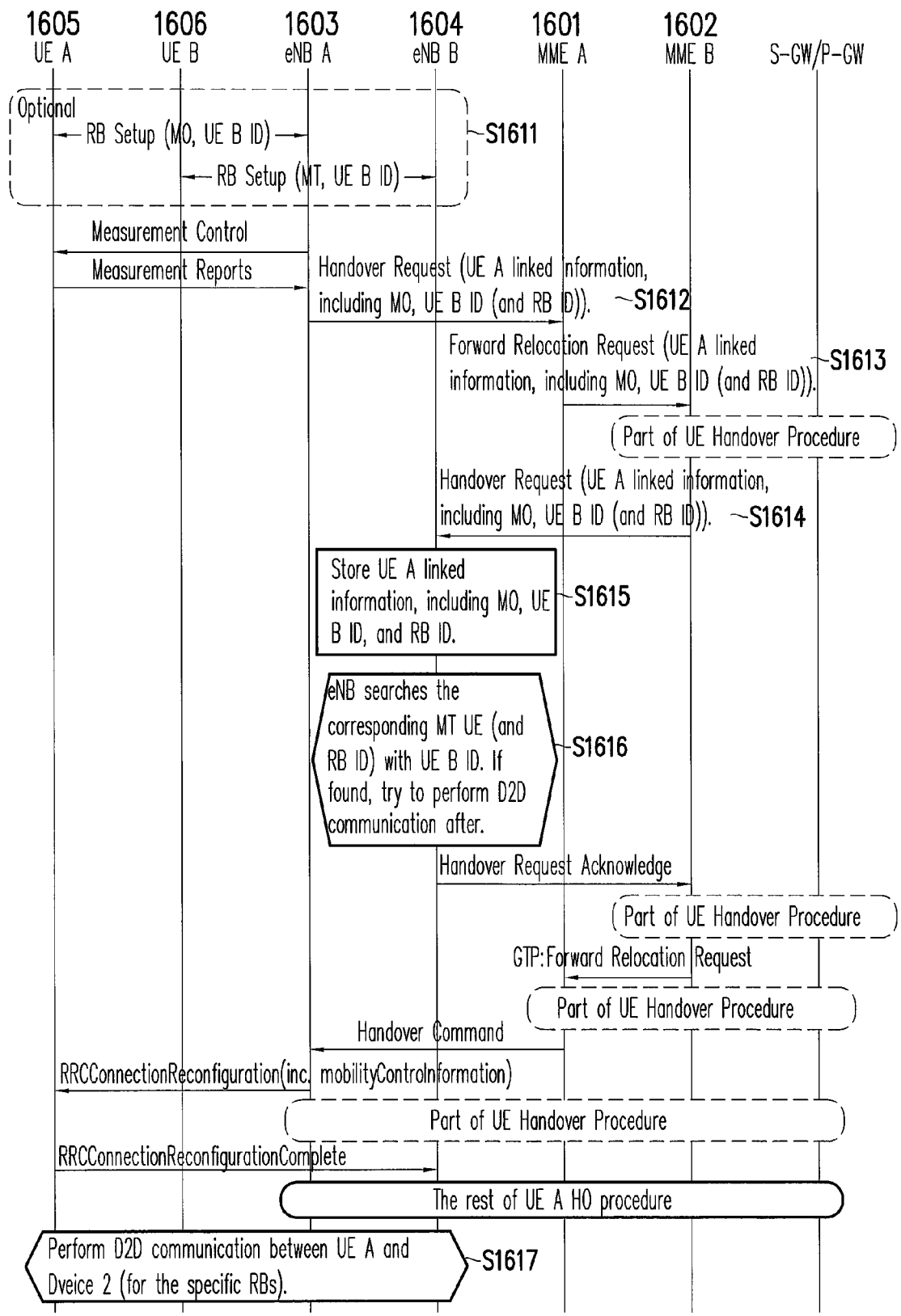
FIG. 16C illustrates a modified procedure for triggering automatic D2D communication establishment by an eNB upon S1-based handover of a MO UE in accordance with one of the exemplary embodiments of the present disclosure

Assuming the same exemplary scenario of FIG. 16B, FIG. 16C illustrates a modified procedure for triggering automatic D2D communication establishment by an eNB upon S1-based handover of a MO UE in accordance with one of the exemplary embodiments of the present disclosure. In step S1611, UE A 1605 optionally attempts to communicate with UE B 1606 by performing a radio bearer connection setup. During the radio bearer establishment of UE A 1605, UE A 1605 may send D2D ID of UE B 1606, and a MO establishment cause, to eNB A 1603 either through an independent message or through another message intended for another purpose. When eNB A 1603 receives such information, eNB A 1604 stores the MO establishment cause, the D2D ID of UE B 1606 and optionally the established radio bearer ID of UE A 1605 and links them with UE A. Also, UE B 1606 may request a similar implementation to establish a radio bearer, and eNB B 1604 would store the information received from UE B 1606 including MT establishment cause, D2D ID of UE B 1606 and optionally the established radio bearer ID of UE B 1606 and link these information with UE B 1606.

As UE A 1605 migrates from eNB A to eNB B based on X2-based handover, eNB A 1603 would send the previously stored information linked with UE A 1605 to eNB B 1604 directly or indirectly through either an independent messages or by embedded the stored information in a message intended for another purpose. In step S1612, these stored information would be forwarded to MME A 1601 through the message Handover Required. In step S1613, the MME A 1601 would send these stored UE A information to MME B 1602 via the Forward Relocation Request message. After other necessary steps of the handover procedure are completed as required by the conventional S1 handover scheme, in step S1614, MME B 1602 would deliver the stored UE A 1605 information to eNB B 1606 via the Handover Request message. Upon receiving the stored UE A 1605 information, in step S1615, eNB B 1604 would store these information which has been linked with UE A 1605 including the MO establishment cause, the D2D ID of UE B 1606 and optionally the established radio bearer ID. In step S1616, eNB B 1604 would search among eNB B 1604's own stored information or under its own domain to locate whether there is another device (with the corresponding established radio bearer) whose establishment cause indicates that it is a callee (e.g. MT) and the corresponding (callee) ID is the D2D ID of UE B 1606. Assuming that eNB B 1604 would be able to locate such device, and in step S1617, the eNB B 1604 would try to initiate the D2D communication between UE A 1605 and UE B 1606 after the S1 handover have been completed.

It should be noted that although in FIG. 16C, the required information of UE A 1605 for D2D communication such as the establishment cause, the callee ID, and optionally the established radio bearer ID has been sent from eNB A 1603 to eNB B 1604 through the message Handover Required, Forward Relocation Request, and Handover Request, it would be apparent for one skilled in the art that these information could also be sent through another message such as the RRCConnectionReconfigurationComplete message.

Also, even though the embodiment of FIG. 16C relates to the migrating caller device, it would also be apparent to one skilled in the art that the same concept and procedure could also be modified and applied to the case related to a migrating callee device. Furthermore, the D2D ID of UE A 1605 could also be included during the connection establishment In step S1611 such that eNB A 1603 and eNB B 1604 may have more information to perform searches for devices and to discern whether D2D could be performed after the handover procedure is finished.

Figure 17A:
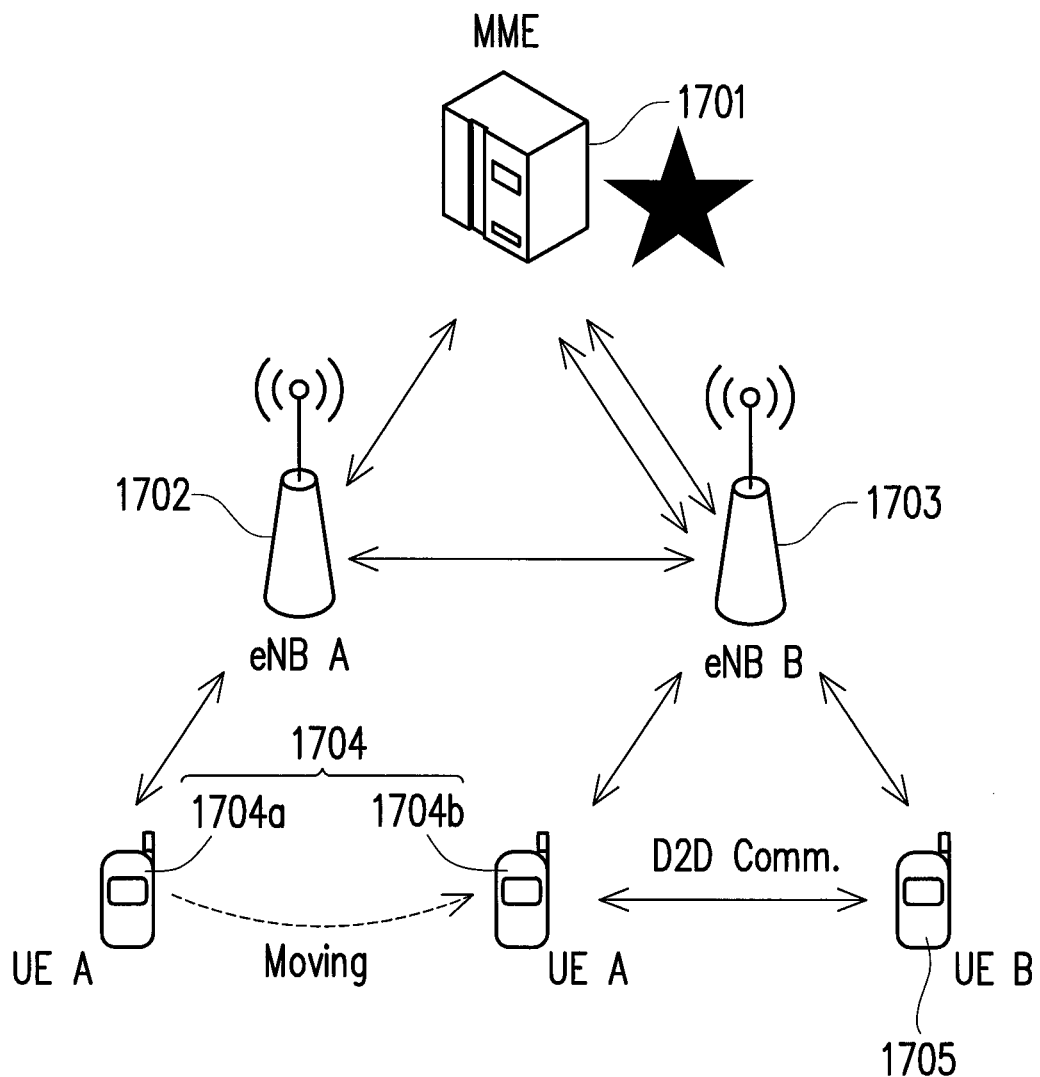
FIG. 17A illustrates an exemplary scenario of a MME triggered D2D communication after a X2-based handover of a caller UE.
Figure 17B:
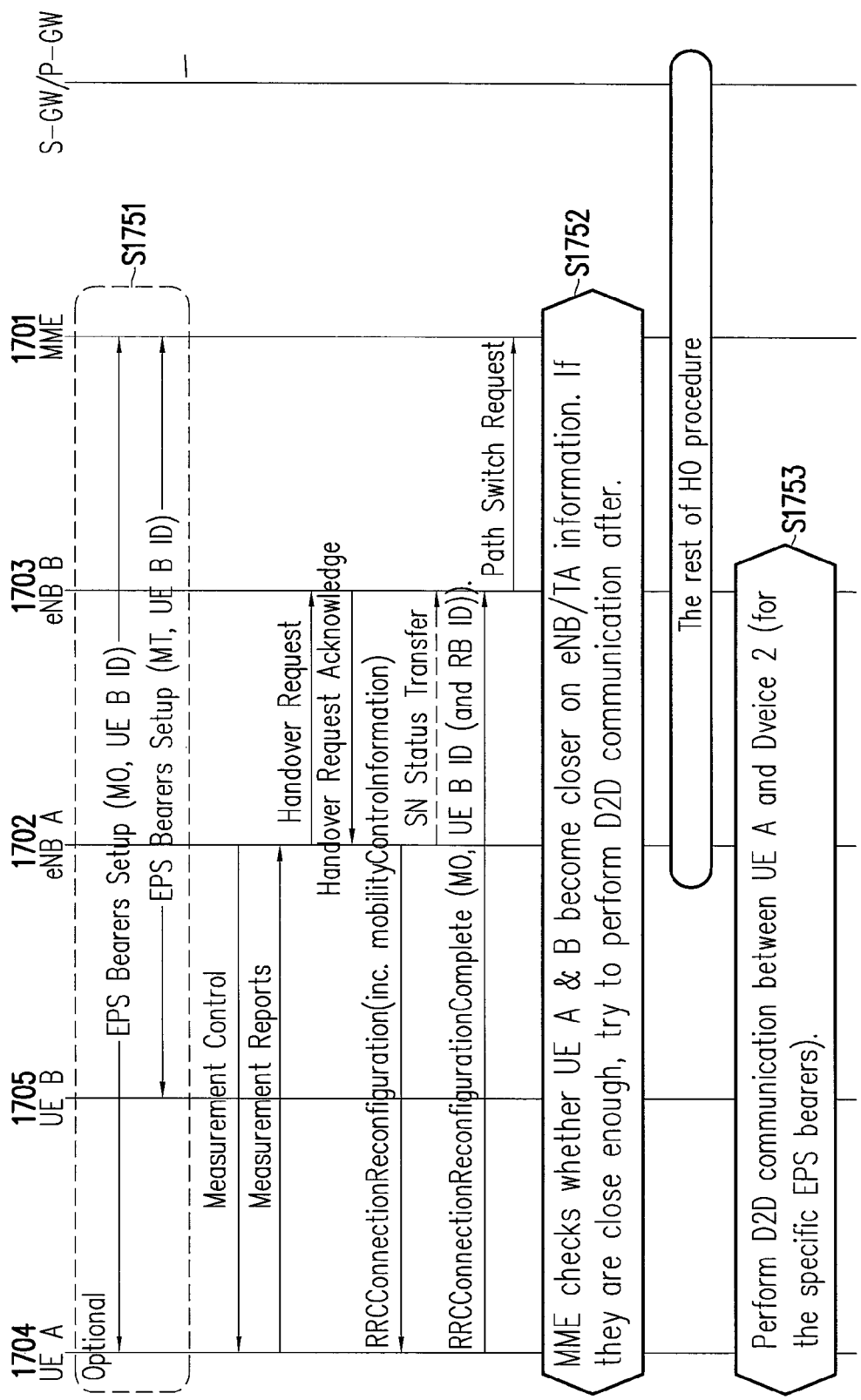
FIG. 17B illustrates a MME triggered D2D communication procedure after a X2-based handover based on the scenario of FIG. 17A in accordance with one of the exemplary embodiments of the present disclosure.

Similar to the embodiment of FIG. 14B and FIG. 15, another embodiment of D2D communication trigger upon X2 based handover could be implemented except that the D2D communication would be triggered by a NAS control node such as MME instead of a AS control node such as an eNB. In other words, the MME is the entity which initiates and arranges for the D2D communication to occur instead of an eNB even though the handover is performed across the X2 interface between eNBs. FIG. 17A illustrates an exemplary scenario of a MME triggered D2D communication after a X2-based handover which is also a modification of an existing X2 based handover procedure such as a complete overhaul of the existing infrastructure is not required. FIG. 17B illustrates a MME triggered D2D communication procedure after a X2-based handover based on the scenario of FIG. 17A in accordance with one of the exemplary embodiments of the present disclosure.

Referring to FIG. 17A, assuming that UE A 1704 (1704*a*, 1704*b*) communicates with UE B 1705, and UE A 1704*a* is initially served by eNB A 1702 but would eventually be handed over because of device mobility and be served by eNB B 1703, and UE B 1705 is served by eNB B 1703. Also assuming that both eNB A 1702 and eNB B 1703 are under the domain of the same MME 1701 and could communicate with each other through the X2 communication interface between them. After UE A 1704*b* is handed over to eNB B 1703, the MME 1702 would automatically arrange for D2D communication between UE A 1704*b* and UE B 1705.

FIG. 17B illustrates the scenario of FIG. 17A in greater details. In step S1751, UE A 1704 may initiate a call to communicate with UE B 1705 by establishing an EPS bearer, i.e. a specific connection type, first with the MME 1701. During the EPS bearer establishment of UE A in step S1751, UE A 1704 may send the MO establishment cause, the D2D ID of UE B 1705 to the MME either through an independent message or through a message intended for another purpose. When the MME 1701 receives the information, it stores them and links them with UE A 1704 (and the established EPS bearer ID of UE A 1704). Similarly, UE B 1705 may also request to establish a EPS bearer. During the EPS bearer establishment of UE B 1705, UE B 1705 may send the MT establishment cause and D2D ID of UE B 1705 to the MME either through an independent message or through a message intended for another purpose. When the MME 1701 receives the information, it stores them and links them with UE B 1705 (and the established EPS bearer ID of UE B).

After related handover preparation and handover execution steps are completed as required by the current X2-based handover procedure and shown in FIG. 17B, in step S1752 after eNB A 1702 has handed UE A 1704 over eNB B 1705 based on X2-based handover, eNB B 1703 may transmit messages to the MME 1701. When the MME 1701 receive a message from eNB B 1703 related to the handover of UE A 1704 such as the Path Switch Request message, MME 1701 would know that UE A 1704 has moved and would then search from its own stored information or stored information from a control node under its own domain such as eNB B to find whether there is a device (with a radio bearer) matching the description of a device with an establishment cause indicates a callee (e.g. MT) and the corresponding (callee) ID being the D2D ID of UE B 1705. If such device has been found by MME 1701, MME 1701 may further check whether UE A 1704 and UE B 1705 may communicate in D2D mode possibly based on tracking areas or/and location information or/and speed. When MME 1701 finds that it is feasible for UE A 1704 and UE B 1705 to communicate in D2D mode, MME 1701 would initiate for the D2D communication to be arranged for (the corresponding established radio bearers of) UE A 1704 and UE B 1705.

Figure 18A:
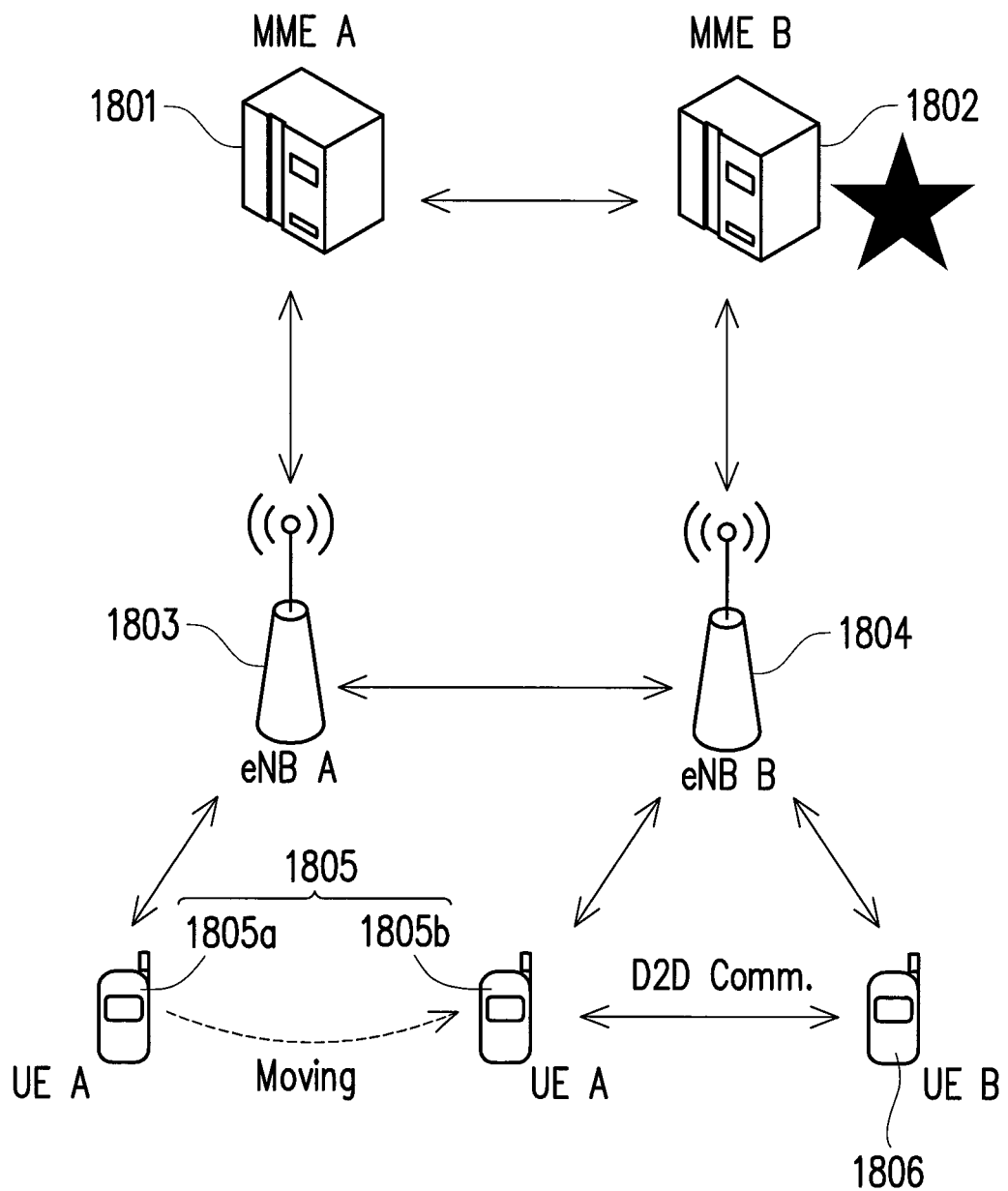
FIG. 18A illustrates an exemplary scenario of a MME triggered D2D communication after a S1-based handover of a caller UE.

FIG. 18A illustrates an exemplary scenario of a MME triggered D2D communication after a S1-based handover of a caller UE. For this exemplary scenario, assuming that MME A 1801 and MME B 1802 could communicate through the S1 interface. MME A 1801 is a NAS control node which provides service to eNB A 1803, and MME B 1802 is a NAS control node which provides service to eNB B 1804. eNB A 1803 provides service to UE A 1805, and eNB B 1804 provides service to UE B 1806. Assuming that UE A would move from 1805*a* under the domain of eNB A to 1805*b* after being handed over to the domain of eNB B 1804. MME B 1802 in this exemplary scenario would eventually initiate D2D communication to be arranged after information related to the caller device handover is transmitted over the S1 interface.

Figure 18B:
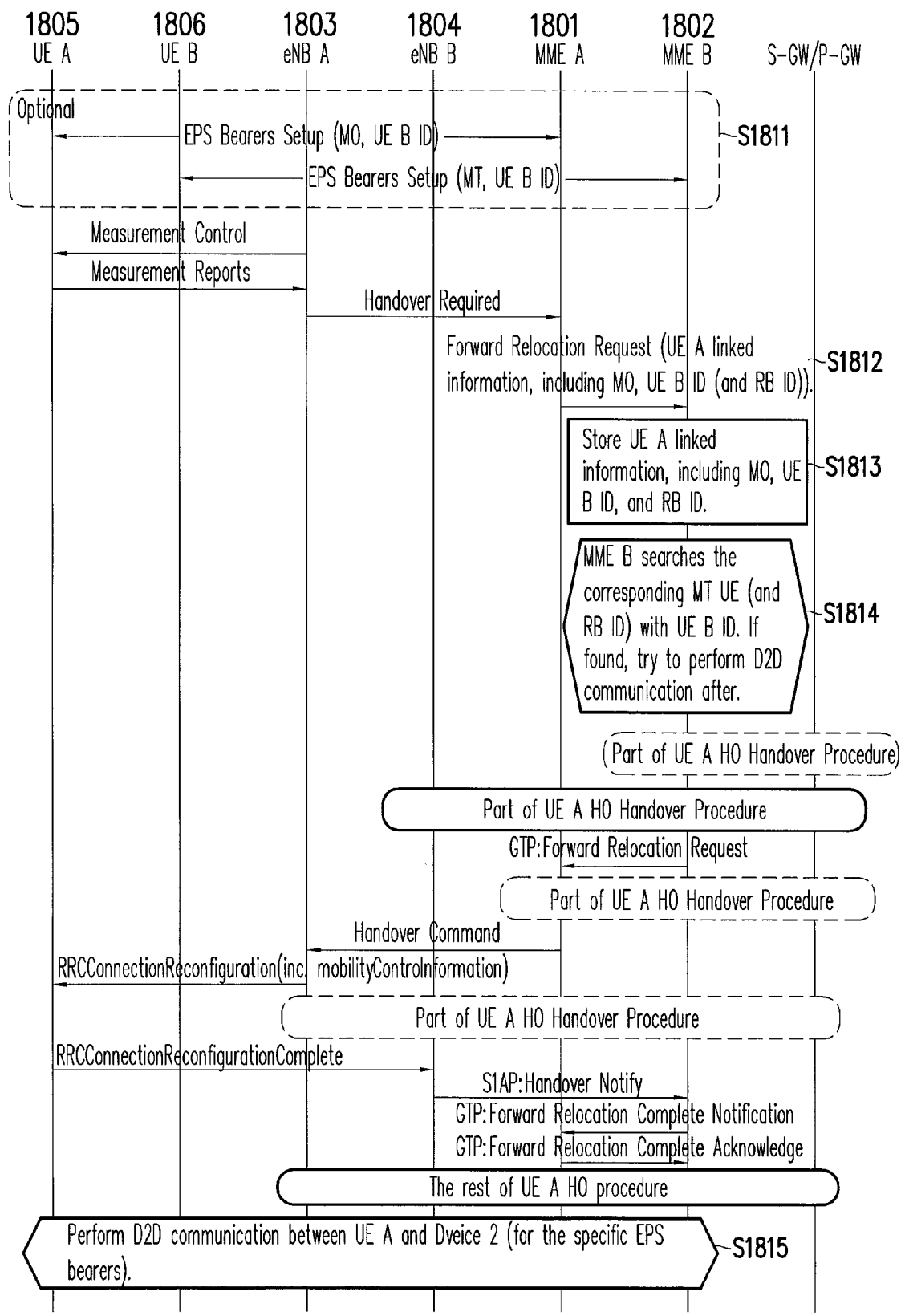
FIG. 18B illustrates a MME triggered D2D communication procedure after a S1-based handover based on the scenario of FIG. 18A in accordance with one of the exemplary embodiments of the present disclosure.

FIG. 18B illustrates a MME triggered D2D communication procedure after a S1-based handover based on the scenario of FIG. 18A in accordance with one of the exemplary embodiments of the present disclosure. In step S1811, UE A 1805 intends to communicate with UE B 1806 by establishing an EPS bearer with MME A 1801. During the EPS bearer establishment of UE A 1805, UE A 1805 may send the MO establishment cause and the D2D ID of UE B 1806 to MME A 1801 either through an independent message or through a message intended for another purpose. When the MME A 1801 receives the data, MME A 1801 stores them and links them with UE A 1805 (and the established EPS bearer ID of UE A). Similarly in step S1811, UE B 1806 may establish an EPS bearer during which the MT establishment cause and the D2D ID of UE B 1806 may be transmitted to MME B 1802. When MME B 1802 receives the data, MME B 1802 stores them and links them with UE B 1806 (and the established EPS bearer ID of UE B).

As UE A 1805 migrates from eNB A 1803 which is under the domain of MME A 1801 to eNB B 1804 which is under the domain of MME B 1802, MME A 1801 would send the previously stored information linked with UE A 1805 to MME B 1802 across the S1 interface either directly or indirectly through either an independent message or by embedding the information linked with UE A 1805 in a message intended for another purpose. More specifically, in step S1812, MME A 1801 could send the stored UE A information to MME B 1802 through the Forward Relocation Request message. In step S1813, upon the reception of these information linked with UE A 1805, MME B 1802 would store these information in its storage medium. In step S1814, MME B would search for the corresponding device (with the corresponding established EPS bearer) which matches the description of a callee (e.g. MT establishment cause) and the corresponding (callee) ID being the D2D ID of UE 1806. When such device has been found, MME B would initiate the D2D communication to be automatically arranged for (the corresponding established EPS bearers of) UE A 1805 and UE B 1806.

Although in FIG. 18B, during the device handover the information linked with UE A 1805 was sent by MME A to MME B via the message Forward Relocation Request, the message may also be sent through such as the Forward Relocation Complete Acknowledge message. The information linked with UE A 1805 may also be initially delivered from UE A 1805 to eNB 1804 B through the RRC message RRCConnectionReconfigurationComplete and then be delivered by eNB B 1804 to MME B 1802 through the Handover Notify message.

Even though the exemplary scenario of FIGS. 18A & 18B teaches an example of automatic D2D communication establishment by MME upon S1-based handover of a migrating caller UE. It would be apparent for one skilled in the art that aforementioned disclosure could be modified and applied to a migrating callee UE. Also, the ID of UE A 1805 or the caller ID may also be carried during EPS bearer establishment so that MME B 1802 may have more information to perform a UE search and to discern whether D2D could be feasible upon a device handover. Also it is worth noting that although the embodiments between FIG. 14A~FIG. 18B teaches automatically arranging D2D communication establish after the completion of the handover procedure, it would be apparent for those skilled in the art that the aforementioned procedure could be modified so that D2D communication establishment could be triggered during device handover rather than after the completion of the device handover and therefore the disclosure would not be repeated.

Figure 19A:
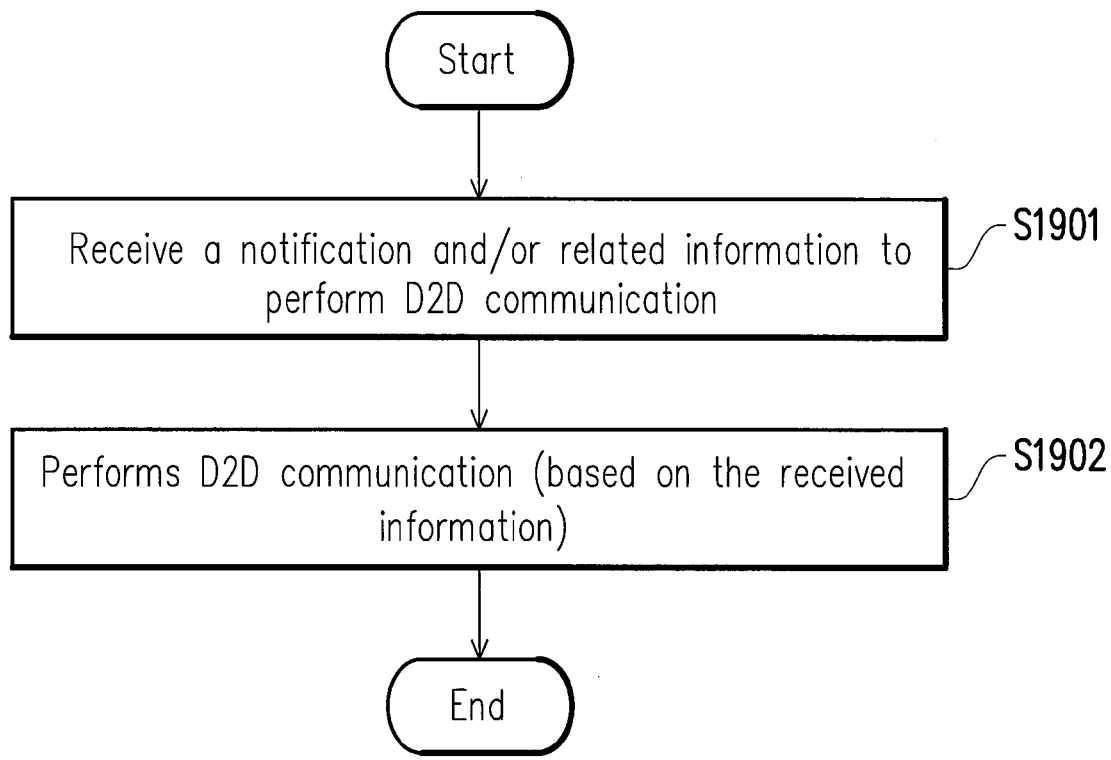
FIG. 19A illustrates the process of automatic D2D communication after device handover from the view point of a caller device or a callee device.

FIG. 19A illustrates the process of automatic D2D communication after device handover from the view point of a caller device or a callee device. In step S1901 the caller/callee receives a notification and/or related information for D2D communication. In step S1902, the caller or callee then performs D2D communication based on the received information.

Figure 19B:
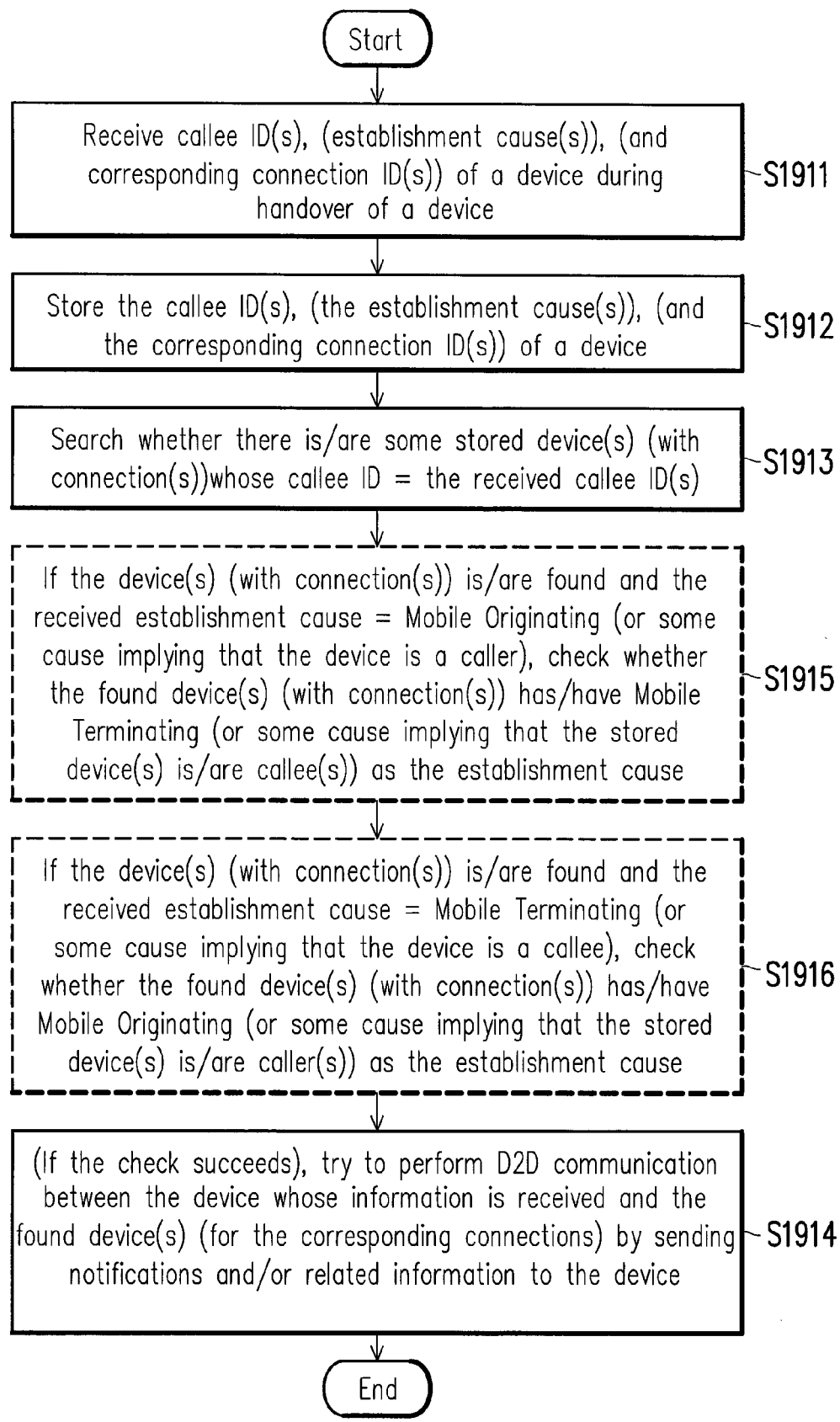
FIG. 19B illustrates the process of automatic D2D communication after device handover from the view point of a control node.

FIG. 19B illustrates the process of automatic D2D communication after device handover from the view point of a control node. Please note that in FIG. 19B or any other figures of the specification, texts within parentheses or dotted blocks mean that optional these elements are optional elements which may not be needed under some circumstances. In step S1911, the control node receives from a first device a D2D ID of a callee and optionally an establishment cause which may indicate a caller or a callee, and optionally a corresponding connection ID of the first device during the handover of the first device. In step S1912, these information are stored in a storage medium of the control node in the form of a database of the control node. In step S1913, the control node searches whether there is a second stored device linked with a callee ID matching the previously received callee ID of the first device (and optionally the connection ID matching the connection ID of the first device). If the second device has been found based on the condition of the step S1913, then in step S1914, the control node would automatically arrange D2D communication between the first device and the second device by sending notifications and/or other related information to these devices.

Between steps S1913 and S1914, one of the two or both additional checks could be performed. In step S1915, if the first device has indicated that it is a caller such as by having an establishment cause equals MO, the control node would check whether the second device or the found device has the establishment cause which equals MT (i.e. the second device is a callee device). In step S1916, if the first device has indicated that it is a callee device such as by having an establishment cause equals MT, the control node would then check whether the second device or the found device has the establishment cause equals to MO which means that the second device would indicate that it is a caller device. If the condition of step S1913 together with the conditions of steps S1915 and S1916 are fulfilled, then the control node may execute step S1914.

Please note that for some embodiments, steps S1915 and S1916 could be skipped and the control node would arrange for D2D communications to take place as long as the same callee IDs would match between two devices such that not only two devices could communicate in D2D mode but also more than two devices may perform D2D communication together as long as they have the same callee ID or the same group ID which serves the purpose of identifying them as a D2D communication group.

Figure 20A:
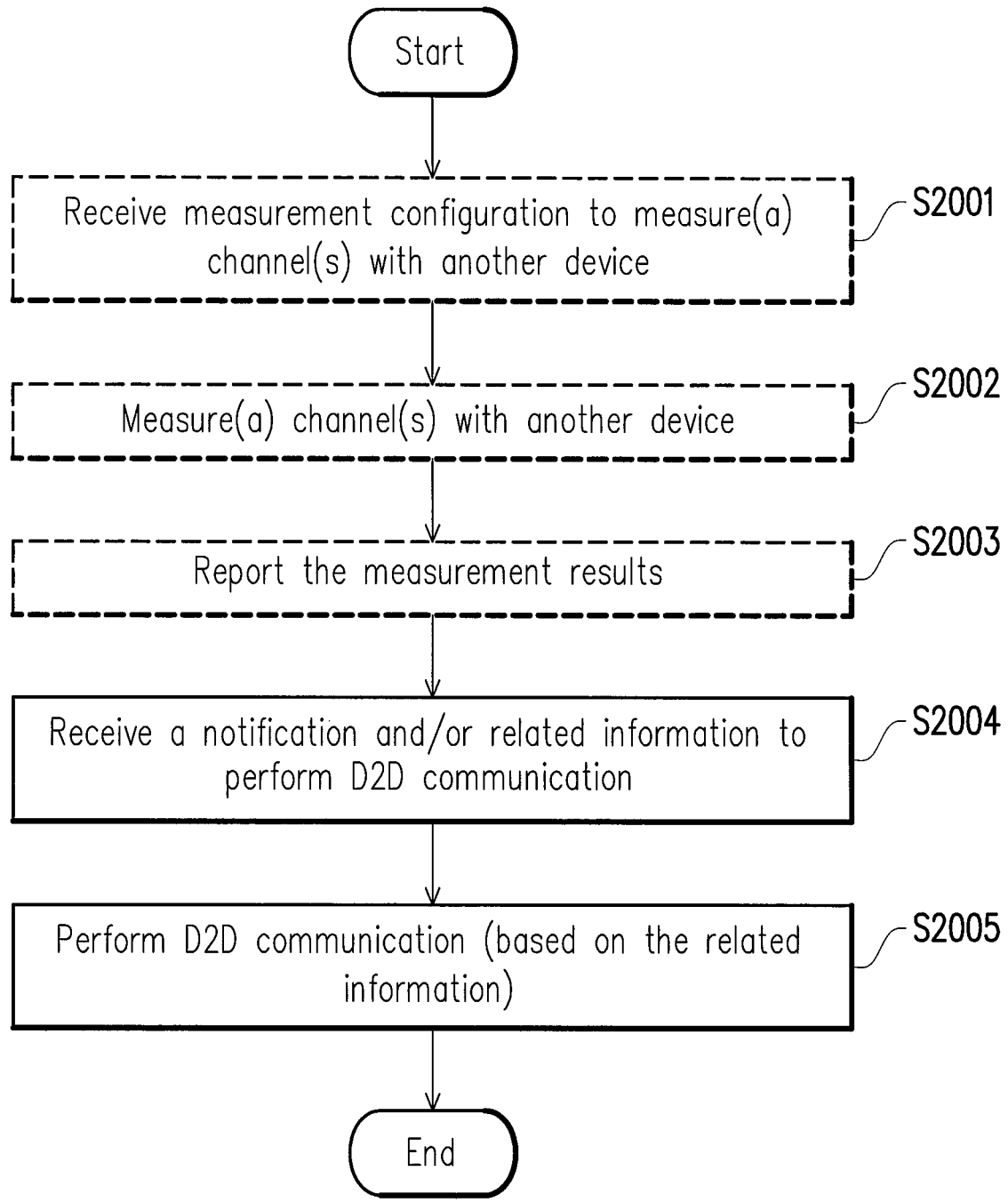
FIG. 20A illustrates the process of automatic D2D communication during device handover from the view point of a caller device or a callee device in accordance with one of the exemplary embodiments of the present disclosure.

FIG. 20A illustrates the process of automatic D2D communication during device handover from the view point of a caller device or a callee device in accordance with one of the exemplary embodiments of the present disclosure. In the optional step S2001, the caller or callee receives from a control node a measurement configuration or measurement instruction to measure channel between itself and a first device or a first control node. In the optional step S2002, the caller or callee performs channel measurement based on the configuration or instruction from step S2001. In the optional step S2003, the caller or callee transmits the report containing the measurement result to the network. In step S2004, the caller or callee receives a notification and/or related information needed to perform the subsequent D2D communication. In step S2005, the caller or callee performs D2D communication based on the received information from step S2004.

Figure 20B:
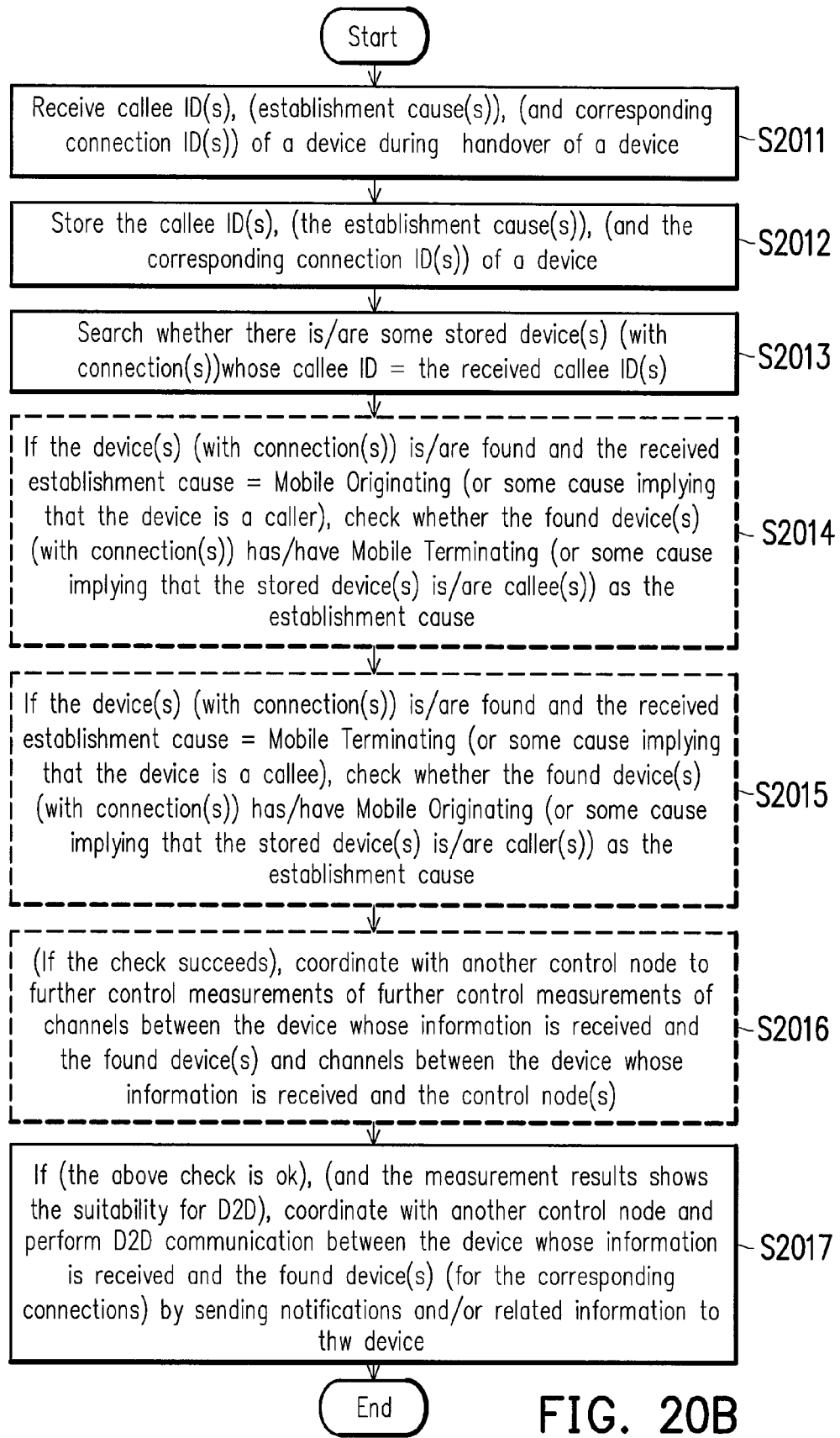
FIG. 20B illustrates the process of automatic D2D communication during device handover from the view point of a control node in accordance with one of the exemplary embodiments of the present disclosure.

FIG. 20B illustrates the process of automatic D2D communication during device handover from the view point of a control node in accordance with one of the exemplary embodiments of the present disclosure. In step S2011, the control receives from a first device a callee ID during the handover of the first device. The control may also optionally receive the establishment cause and the connection ID from the first device. In step S2012, the received information from the first device are stored in the storage medium of the control node itself, and these information would be linked with the first device. In step S2013, the control node searches whether there is a second stored device whose callee ID matches the callee ID from the received first device. If the second device has been found, the control node may directly execute step S2017 in which the control node may coordinate with another control node in order to perform D2D communication with the first device and the second device by sending notification and related information to these devices.

In addition to step S2013, the control node may perform additional checks so as to determine whether the step S2017 could be performed. Optionally, in step S2014, if the second device has been found back in step S2013 and if the first device has the MO establishment cause indicating a caller, then in step S2014 the control node would determine whether the found device or the second device has the MT establishment cause indicating a callee. Similarly, in step S2015, if the first device has the MT establishment cause indicating that it is a callee, then in step S2015 the control node would determine whether the second device or the found device is the MO establishment cause indicating a caller. If the checks between steps S2013~S2015 has been successful, then optionally, the control node may execute step S2016 by coordinating with another control node to further measure channels between the first device and the second device or between the first device and a control node.

Figure 21A:
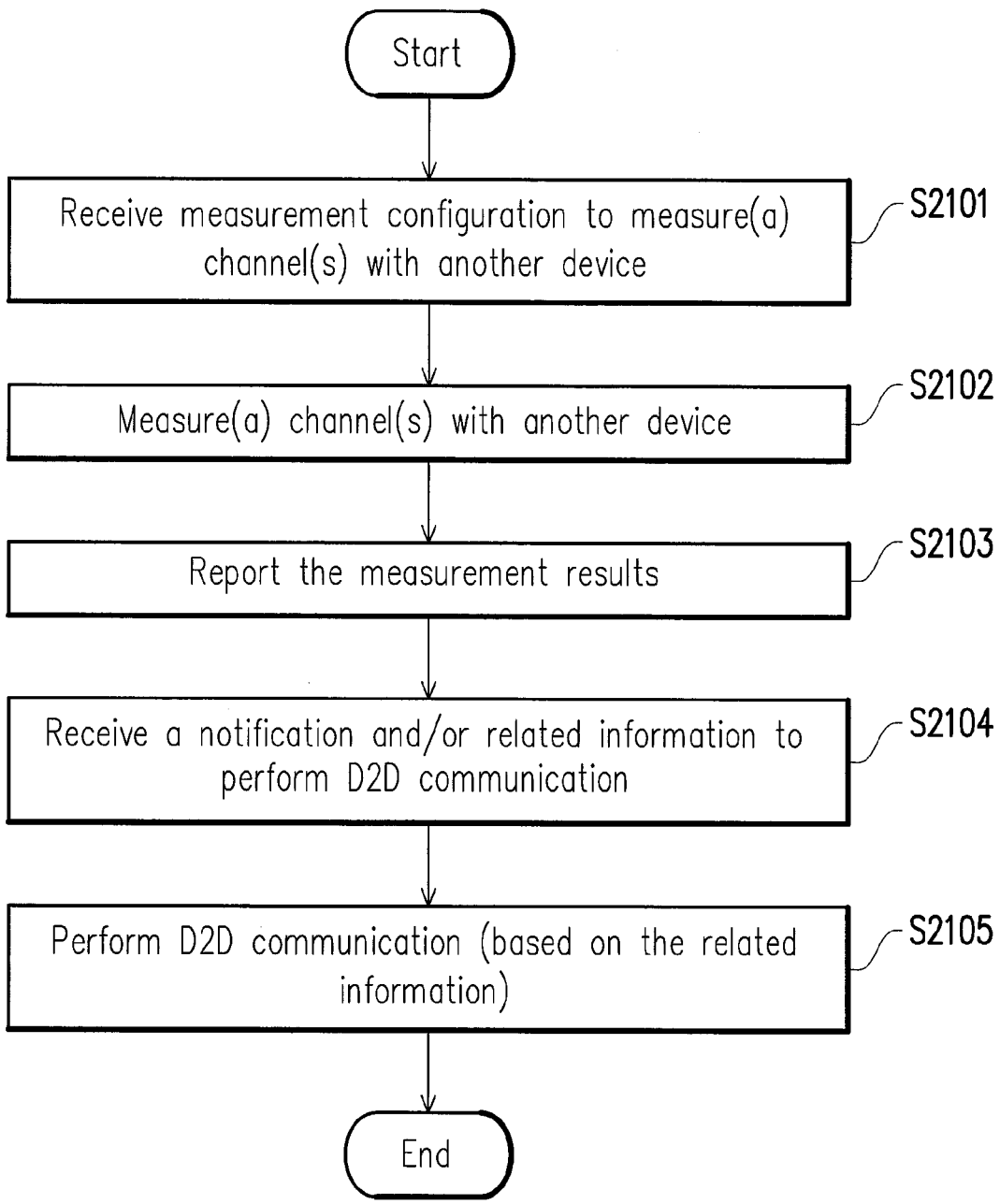
FIG. 21A illustrates the process of automatic D2D communication during channel measurement from the view point of a caller device or a callee device in accordance with one of the exemplary embodiments of the present disclosure.

FIG. 21A illustrates the process of automatic D2D communication during channel measurement from the view point of a caller device or a callee device in accordance with one of the exemplary embodiments of the present disclosure. The process of FIG. 21A is very similar to the process of FIG. 20A. In step S2101, the caller/callee receives measurement configuration or instruction to measure channel between itself and another device or another control node. In step S2102, the caller/callee performs the channel measurement based on the information received from step S2101. In step S2103, the caller/callee reports the measurement result to its serving control node. In step S2014, the caller/callee receives a notification and/or related information from the network to perform D2D communication. In step S2015, the caller/callee performs D2D communication based on the received information.

Figure 21B:
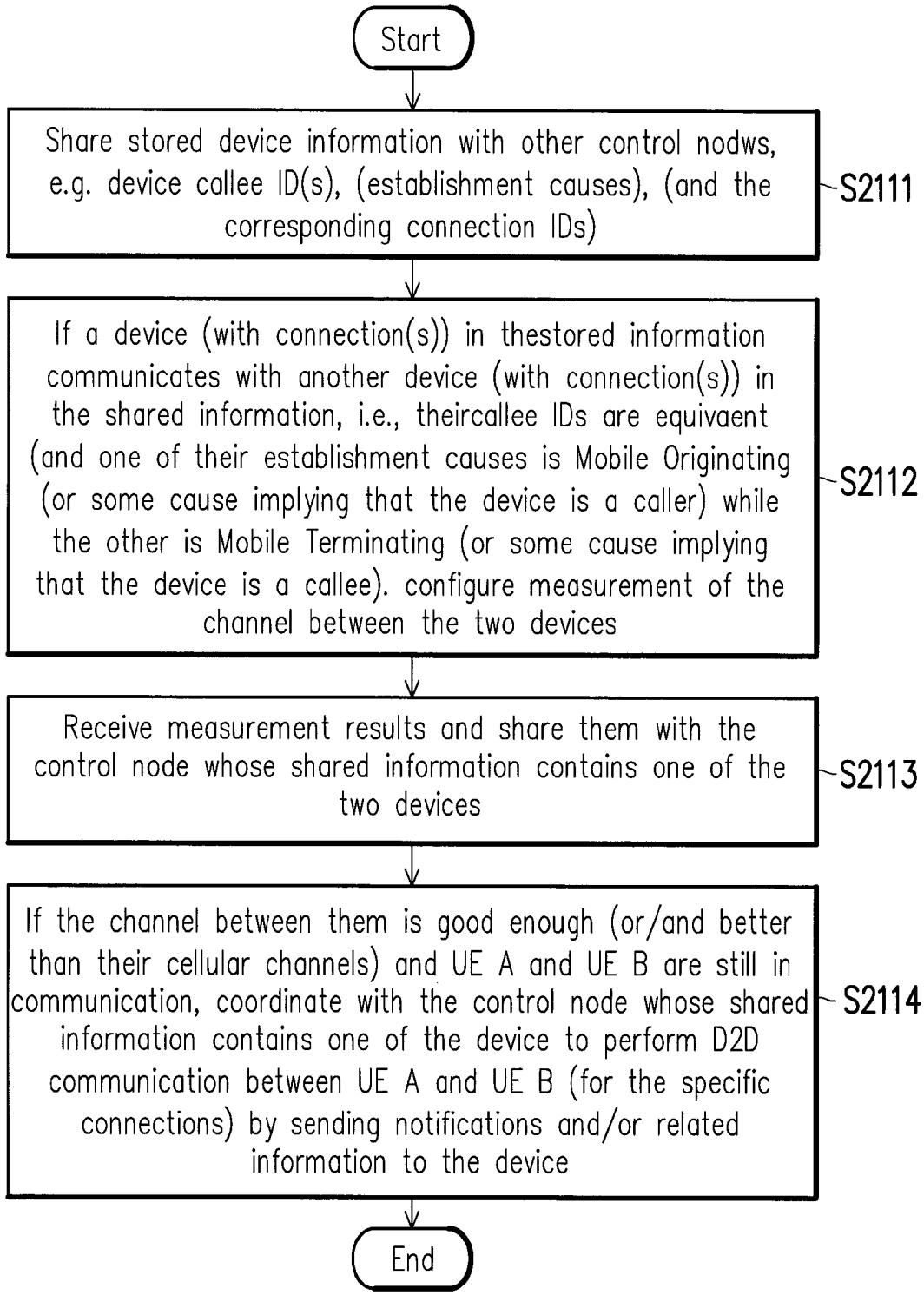
FIG. 21B illustrates the process of automatic D2D communication during channel measurement from the view point of a control node in accordance with one of the exemplary embodiments of the present disclosure.

FIG. 21B illustrates the process of automatic D2D communication during channel measurement from the view point of a control node in accordance with one of the exemplary embodiments of the present disclosure. FIG. 22B is very similar to FIG. 21B. In step S2111, the control node obtains access of stored device information from another control node(s) or shares stored device information among one or more control nodes. The stored device information may include information such as establishment cause, callee ID, and connection ID. In step S2112, the control nodes examines whether one device is in fact communicating with another device. This is accomplished by examining the establishment cause of these devices. If one device indicates a caller or has a MO establishment cause, the other device would indicate a callee or has a MT establishment, and vice versa. In step S2113, the control node receives a measurement report containing a channel measurement between a caller and a callee or between a user device and a control node. After receiving the measurement report, the control would share the report with another control node whose stored information was found to contain one of the two devices. In step S2114, if the channel between the caller device and the callee device is sufficient, or is better than their cellular channels with their serving base stations, and if the caller device and the callee device are still in communication with each other, then the control node would coordinate with the another control node whose stored information was found to contain one of the two devices to automatically arrange for D2D communication between the caller device and the callee device (for the specific connection) by sending notifications and/or related information to these devices.

Figure 22A:
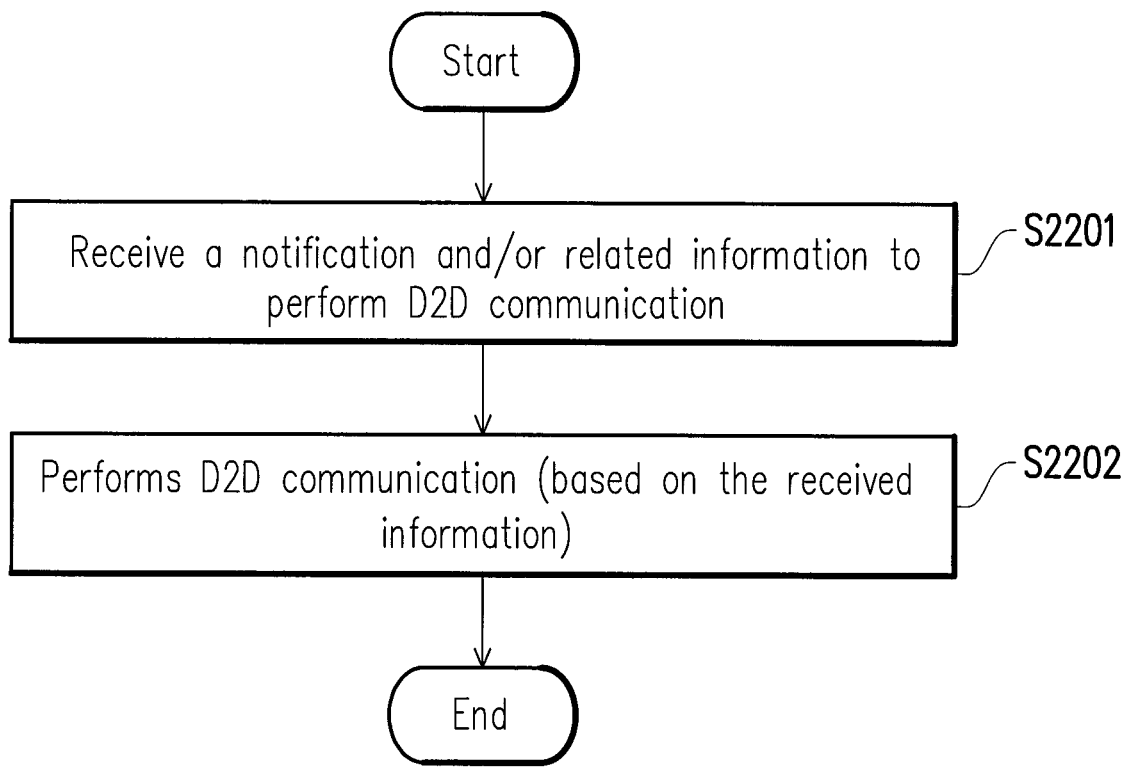
FIG. 22A illustrates the process of NAS control node arranged automatic D2D communication triggered by a control node message from the view point of a caller device or a callee device in accordance with one of the exemplary embodiments of the present disclosure.
Figure 22B:
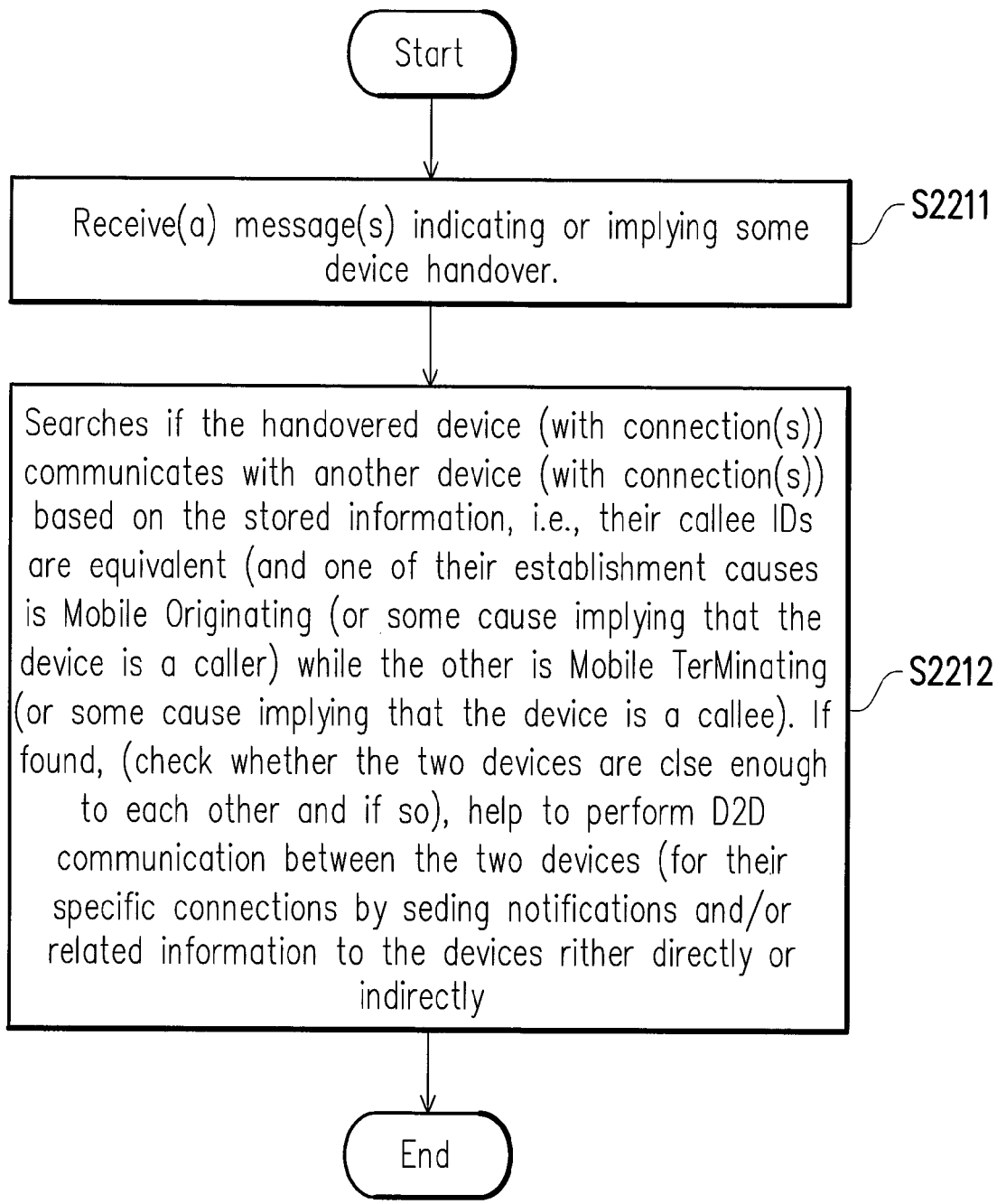
FIG. 22B illustrates the process of NAS control node arranged automatic D2D communication triggered by a control node message from the view point of a NAS control node in accordance with one of the exemplary embodiments of the present disclosure.

FIG. 22A illustrates the process of NAS control node arranged automatic D2D communication triggered by a control node message from the view point of a caller device or a callee device in accordance with one of the exemplary embodiments of the present disclosure. This particular process is similar to the process of FIG. 19A. In step S2201, the caller or callee device receives a notification and/or related information to perform D2D communication. In step S2202, the caller/callee device performs D2D communication based on the received information from step S2201.

FIG. 22B illustrates the process of NAS control node arranged automatic D2D communication triggered by a control node message from the view point of a NAS control node in accordance with one of the exemplary embodiments of the present disclosure. In step S2211, the NAS control node such as the MME receives a message indicating or implying a device handover. In step S2212, the NAS control node searches if the device handed over is communicating with another device based on the stored information such as their callee IDs being equivalent and/or one of their establishment causes is MO and the other being MT and vice versa and/or the connection ID of these two devices are equivalent. If the pair of devices has been found such that they are indeed in communication with each other, then the NAS control node may determine whether these two devices are close enough to each other, and if so, the NAS control node would initiate the D2D communication to be arranged between these two devices (for their specific connections) by sending notifications and/or related information to these devices either directly or indirectly.

In the disclosure and all of the embodiments, when the D2D communication is established between the caller and the callee, the original cellular communication and/or connection(s) may be released or may still remain.

In the disclosure and all of the embodiments, a connection may be identified/stored by a connection ID. Connection ID may be SRB (signaling radio bearer) ID, DRB (dedicated radio bearer) ID, EPS bearer ID, TCP/IP connection ID, an application connection ID, e.g. SIP session ID, or any other identity for connection identification.

In the disclosure of all the embodiments, whenever an ID is mentioned, it could be implemented as MSISDN or IMSI or IMEI or C-RNTI or S-TMSI or an application identity or an IP address or an identity used for device-to-device communication or an identity used in other layer as Table 1 could be apply. Also, when a control node checks whether two IDs are equivalent, the control node may adopt means such as an identity mapping table to check the ID equivalence based on ID mapping.

In the disclosure and all of the embodiments, a control node may broadcast or send dedicated information indicating whether the control node supports automatic D2D communication so that UEs devices may use the system information to decide whether to carry D2D related information, such as the callee ID, during the connection establishment. In another embodiment, the UEs themselves may send information to a control node to indicate whether the UEs would supports D2D and/or the locations of the UEs so that the control node has more information to decide whether to perform automatic D2D communication. In addition, the device may send an explicit indication to the control node to indicate whether an ID search should be performed by the control node in order to arrange D2D communication. In this way, the control node may not need to search for a caller ID every time a callee ID is received as the indication would decide whether an ID search should be performed. If a UE chooses not to use D2D communication, the UE may signal the refusal with the explicit indication.

In the disclosure and all of the embodiments, when the control node receives and/or stores the D2D related information, such as the callee ID and/or the establishment cause and/or the connection ID corresponding to some device, the control node may retain the D2D related information during the time when the established connection is maintained, or the control node may only retain the D2D related information over a fixed time interval or over a variable time interval based on the connection properties and/or the device conditions, such as mobility and/or locations.

In the disclosure and all of the embodiments, when the control node finds that automatic D2D communication may be performed, the control node may perform D2D communication for devices directly or/and the control node may send information to the devices, including the caller and/or the callee, to indicate the possible D2D availability, and/or the probability that D2D communication could be established successfully, and/or the location of the devices including the caller and/or the callee. When the devices receive the information, it may display the information in its user interfaces so that users may know the information and may decide whether to perform D2D communication.

In the disclosure and all of the embodiments, no element, act, or instruction used in the description of the present application should be construed as absolutely critical or essential to the present disclosure unless explicitly described as such. Also, as used herein, each of the indefinite articles "a" and "an" is intended to exclude more than one item. If only one item is intended, the terms "a single" or similar languages could be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

In view of the aforementioned descriptions, the present disclosure is able to implement a D2D communication method in which a network could automatically trigger a D2D communication without requiring a user's awareness and without an explicit indication from the user to use D2D communication such that a user could make a call without even being aware that the connection is switched to the D2D mode, which could in turn enhance signaling efficiencies and reduce radio links transmission delays.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A control node comprising a transmitter and a receiver for respectively transmitting and receiving wireless data, a storage medium for storing information of a first device and a second device, and a processing circuit coupled to the transmitter, the receiver, and the storage medium and is configured for executing:
   establishing with the first device a first radio resource control (RRC) connection, and receiving from the first device a caller indicator and a D2D identification (ID) of the second device during establishing the first RRC connection, wherein the D2D ID of the second device is embedded in a first RRC message after the first device completes setup of the first RRC connection;
   establishing with the second device a second RRC connection, and receiving from the second device a callee indicator and the D2D ID of the second device during establishing the second RRC connection, wherein the D2D ID of the second device is embedded in a second RRC message after the second device completes setup of the second RRC connection;
   requesting service from a network;
   searching for the first device with the caller indicator and the D2D ID of the second device; and
   arranging a device to device (D2D) communication between the first device and the second device based on at least the caller indicator and the callee indicator when a first condition has been satisfied.

2. The control node of claim 1, wherein after receiving from the first device the caller indicator and the D2D ID of the second device, the processing circuit is further configured for:
   storing the caller indicator and the D2D ID of the second device into the storage medium; and
   linking the caller indicator and the D2D ID of the second device with the first device.

3. The control node of claim 1, wherein after receiving from the second device the callee indicator and the D2D ID of the second device, the processing circuit is further configured for:
   storing the callee indicator and the D2D ID of the second device into the storage medium; and
   linking the callee indicator and the D2D ID of the second device with the second device.

4. The control node of claim 1 wherein the caller indicator is a Mobile Originating establishment cause, and the callee indicator is a Mobile Terminating establishment cause in accordance with a version of a radio resource control (RRC) protocol.

5. The control node of claim 1, wherein the processing circuit is configured for arranging a device to device (D2D) communication between the first device and the second device based on at least the caller indicator and the callee indicator further comprising: arranging a D2D communication between the first device and the second device based on the D2D ID of the second device when the first condition is satisfied.

6. The control node of claim 1, wherein the first condition comprising whether the first device is found, and the first device is found when the processing circuit finds the first device having the caller indicator and the D2D ID of the second device and matching the callee indicator and the D2D ID of the second device.

7. The control node of claim 1, wherein the first condition further comprising whether the first device and the second device are within radio ranges of each other.

8. The control node of claim 6 further comprising:
   arranging the first device and the second device to revert back to the non-D2D cellular communication during a D2D communication session.

9. The control node of claim 1, wherein the control node is one of a base station, an evolved node B (eNB), a repeater, a gateway, a server, or a mobile management entity (MME).

10. The control node of claim 9, wherein when one of the first device and the second device is not attached to the same control node, the control node is a MME.

11. The control node of claim 1, wherein the processing circuit is further configured for:
   receiving from the first device a connection ID of the first RRC connection; and
   receiving from the second device a connection ID of the second RRC connection.

12. The control node of claim 1, wherein the processing circuit is configured for arranging the D2D communication between the first device and the second device only for a specific connection, wherein the specific connection is one of a radio resource control (RRC) connection, a radio bearer (RB) connection, a dedicated RB connection, and a EPS RB connection.

13. The control node of claim 1, wherein if the first device cannot be found when the processing circuit is configured for searching for the first device with the caller indicator and the D2D ID of the second device, the processing circuit is further configured for:
   querying a second control node to locate the first device; and
   exchanging information from the storage medium with the second control node.

14. The control node of claim 13, wherein the processing circuit is further configured for:
coordinating with the second control node through an S1 or X2 interface in accordance with a specification of LTE communication system to arrange the D2D communication between the first device and the second device.

15. The control node of claim 1, wherein the processing circuit is further configured for:
receiving a query for a third device from a third control node; and
transmitting a query response comprising information of the third device to the third control node if the information of the third device is found from the storage medium.

16. The control node of claim 1, wherein the processing circuit is further configured for:
transmitting system information to the first device and/or the second device to indicate that the D2D communication is available.

17. The control node of claim 1, wherein the control node receives from the first device the caller indicator and the D2D identification (ID) of the second device, the processing circuit is further configured for receiving an D2D ID of the first device from the first device.

18. The control node of claim 1, wherein after receiving from the first device the caller indicator and the D2D identification (ID) of the second device, the processing circuit is further configured for:
requesting an access from a network; and
receiving an incoming call from the network after the access has been granted by the network.

19. A method for device to device (D2D) communication, adapted for a control node in a network to arrange for D2D communication between a first device and a second device, and the method comprising:
establishing with a first device a first radio resource control (RRC) connection, and receiving from the first device a caller indicator and an D2D identification (ID) of the second device during establishing the first RRC connection, wherein the D2D ID of the second device is embedded in a first RRC message after the first device completes setup of the first RRC connection;
establishing with the second device a second RRC connection, and receiving from the second device a callee indicator and the D2D ID of the second device during establishing the second RRC connection, wherein the D2D ID of the second device is embedded in a second RRC message after the second device completes setup of the second RRC connection;
finding a first device associated with a caller indicator and the D2D ID of the second device; and
if the first device is found, arranging the D2D communication between the first device and the second device.

20. The method of claim 19, wherein the control node is one of a base station, an evolved node B (eNB), a repeater, a gateway, a server, or a mobile management entity (MME).

21. The method of claim 19 further comprising:
storing the caller indicator and the D2D ID of the second device in the control node after the caller indicator and the D2D ID of the second device are received from the first device;
associating the caller indicator and the D2D ID of the second device with the first device;
storing the callee indicator and the D2D ID of the second device in the control node after the callee indicator and the D2D ID of the second device are received from the second device; and
associating the callee indicator and the D2D ID of the second device with the second device.

22. The method of claim 21, wherein the step of associating the caller indicator and the first information of the first device with the second device comprises:
associating the callee indicator and the first information of the first device with a first connection ID of the first RRC connection of the first device.

23. The method of claim 21 further comprising:
associating a first RRC connection ID of the first RRC connection with the first device; and
associating a second RRC connection ID of the second RRC connection with the second device.

24. The method of claim 19, wherein the step of arranging the D2D communication automatically between the first device and the second device comprises:
arranging the first device and the second device to communicate directly when the first device and the second device are within a radio range of each other.

25. The method of claim 19 wherein the step of arranging the D2D communication automatically between the first device and the second device comprises:
arranging the first device and the second device to communicate directly when a D2D channel between the first device and the second device is better than a non-D2D cellular channel between the control and at least one of the first device and the second device.

26. The method of claim 19, wherein the caller indicator and the callee indicator are respectively a mobile originating establishment cause and a mobile terminating establishment cause.

27. The method of claim 19, wherein the step of arranging the D2D communication automatically between the first device and the second device further comprises only arranging D2D communication automatically between the first device and the second device for a specific connection.

28. The method of claim 19, wherein if the first device and the second device are attached to different base stations, the control node is a mobile management entity MME.

29. The method of claim 19, wherein if the second device cannot be found, claim 19 further comprises:
querying a second control node to locate the second device; and
exchanging stored information with the second control node.

30. The method of claim 29 further comprising:
coordinating with the second control node through an interface to automatically arrange the D2D communication between the first device and the second device.

31. The method of claim 19 further comprising:
receiving a query for a third device from a third control node; and
transmitting a query response comprising information of the third device to the third control node if the information of the third device is found in the control node.

32. The method of claim 19 further comprising:
if the D2D communication between the first device and the second device cannot be arranged, arranging a non-D2D cellular communication between the first device and the second device.

33. The method of claim 19 further comprising:
transmitting to the first device and/or the second system information which indicates that D2D communication is supported by the network.

34. The method of claim 19 wherein the step of performing the second data connection during which the caller indicator and the first information of the first device are received from the second device further comprising:
receiving from the second device an ID of the second device.

35. A method for arranging device to device (D2D) communication in a wireless network between a first device initiating a communication session with a second device, and the method comprising:
the first device establishing with the network a first radio resource control (RRC) connection during which a caller indicator and an D2D identification (ID) of the second device are transmitted to the network by the first, wherein the D2D ID of the second device is embedded in a first RRC message after the first device completes setup of the first RRC connection;
the second device establishing with the network a second RRC connection during which a callee indicator and the D2D ID of the second device are transmitted to the network by the second device, wherein the D2D ID of the second device is embedded in a second RRC message after the second device completes setup of the second RRC connection;
at least one of the first device and the second device receiving from the network a first information to perform D2D communication; and
the first device and the second device performing D2D communication with each other based on a first information.

36. The method of claim 35, wherein the first information comprising necessary network related information to perform D2D communication.

37. The method of claim 36, wherein the first device and the second device are served by the same control node.

38. The method of claim 36, wherein the D2D communication between the first device and the second device are coordinated by between two different control nodes.

39. The method of claim 37, wherein the control node is one of a base station, an evolved node B (eNB), a repeater, a gateway, a server, or a mobile management entity (MME).

40. The method of claim 35, wherein each of the first RRC connection and the second RRC connection is one of a radio resource control (RRC) connection, a radio bearer connection, a EPS radio bear connection, and an application layer connection.

41. The method of claim 36 wherein the caller indicator is a mobile originating establishment cause, and the callee indicator is mobile terminating establishment cause.

42. The method of claim 36, wherein the step of performing D2D communication between the first device and the second device based on the first information is only performed when the first RRC connection and the second RRC connection belong to a specific connection.

43. The method of claim 36 wherein the step of performing D2D communication between the first device and the second device based on the first information further comprising:
if the D2D communication between the first device and the second device is unsuccessful, the first device and the second device engage in a non-D2D cellular communication.

44. The method of claim 36 further comprising:
receiving by the first device and the second device system information which indicates that the network supports D2D communication.

* * * * *